United States Patent
Kubo

(10) Patent No.: US 8,097,188 B2
(45) Date of Patent: Jan. 17, 2012

(54) METHOD OF MANUFACTURING OPTICAL FILM

(75) Inventor: Nobuo Kubo, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 735 days.

(21) Appl. No.: 11/880,985

(22) Filed: Jul. 25, 2007

(65) Prior Publication Data

US 2008/0023881 A1  Jan. 31, 2008

(30) Foreign Application Priority Data

Jul. 31, 2006  (JP) .................................. 2006-207639

(51) Int. Cl.
*B29D 11/00* (2006.01)

(52) U.S. Cl. ......... 264/1.1; 264/1.34; 264/216; 264/217

(58) Field of Classification Search .................. 264/1.1, 264/1.34, 216, 217, 1.31, 1.32, 2.6, 2.7
See application file for complete search history.

(56) References Cited

U.S. PATENT DOCUMENTS 7,786,191 B2 * 8/2010 De Koning et al. ........... 523/351

FOREIGN PATENT DOCUMENTS

| EP | 1 715 365 A1 | 10/2006 |
|---|---|---|
| EP | 1 930 750 A1 | 6/2008 |
| JP | 61-094725 A | 5/1986 |
| JP | 62-37113 A | 2/1987 |
| JP | 2006-057109 A | 3/2006 |

OTHER PUBLICATIONS

Communication dated Oct. 13, 2010 in EP 07 79 0610 (10 pages), including Supplementary Partial European Search Report.

* cited by examiner

*Primary Examiner* — Mathieu D. Vargot

(74) *Attorney, Agent, or Firm* — Holtz, Holtz, Goodman & Chick PC

(57) ABSTRACT

A method of producing and optical film, comprises the steps of: mixing a resin and grains, heating a mixture of the resin and the grains and kneading the heated melted mixture, thereby preparing a mixture material of the resin and the grains; dissolving the mixture material in a solvent, thereby preparing a resin solution; and casting the resin solution so as to form an optical film.

9 Claims, 1 Drawing Sheet

METHOD OF MANUFACTURING OPTICAL FILM

CROSS-REFERENCE TO RELATED APPLICATION

This application is based on Japanese Patent Application No. 2006-207639 filed on Jul. 31, 2006, in Japanese Patent Office, the entire content of which is hereby incorporated by reference.

BACKGROUND OF THE INVENTION

The present invention relates to a manufacturing method of optical films, optical films, and polarization plates and image display apparatuses employing these.

Optical films used in image display apparatuses are required to have durability towards changes in the environment in addition to having high performance and high quality. Large sizing has progressed recently in image display apparatuses, and improving these characteristics is being demanded more and more.

Particularly in liquid crystal display apparatuses, when said optical film is being used as the polarization plate protective film, it sometimes causes striations in the image display due to variations in the environment, particularly when that polarization plate protective film includes cellulose resin, it was desired to improve the dimensional stability of the film due to environmental variations.

When grains are present in a film, since the strength increases due to the dispersion of stress applied to the film or due to the presence of materials that are harder than the resin, as a consequence, it is expected to obtain an optical film having improved dimensional stability of the film with respect to environmental variations.

In order to improve slipping (anti-blocking) of cellulose resin film such as cellulose acetate film or to improve its resistance scratching, including or coating various types of grains has been known as is described in Japanese Unexamined Patent Application Publication No. Sho 62-37113, Japanese Unexamined Patent Application Publication No. Sho 61-94725, and Japanese Unexamined Patent Application Publication No. 2006-57109.

However, for improvement of dimensional stability of the film, if an attempt is made to compound the grains in the resin that forms the optical film, it is difficult to obtain the desired dispersion state in the film matrix, and very often the grains were agglomerating. When grains are added with the purpose of giving improvement in the film quality or improvement in the display performance, if the desired dispersion state is not obtained, it is not possible to realize the functions and effects expected from adding grains, but on the other hand the presence of grains may even have bad effect on the film quality. In particular, a big problem is the generation of haze or bright point impurities.

The following methods can be considered for compounding grains in a film.

In general, to begin with, a liquid with grains dispersed in it is prepared, and next, addition of the grain dispersed liquid is made either in the batch mode or in the inline mode during the process of manufacturing the optical film by the solution casting method.

In order to stabilize the dispersion of the grains, it is common to feed the dispersed liquid that has grains as a dispersed liquid (including emulsions and suspensions) in which the grains have been stabilized in the solvent by at least one of the dispersion stabilization methods of adding dispersing agents, surfactants, or carrying out surface treatment, etc., on the grains. In this case, since a dispersed liquid having grains is used, some times the grains in the dispersed liquid either got settled down or got agglomerated, and the grains could not be compounded uniformly in the resin and it was not possible to realize the desired functions. In particular, if an optical film is manufactured by the solution casting method using a dispersed liquid having agglomerated grains, very often bright points or introduction of foreign matter is seen that are caused by agglomerated grains in the obtained optical film.

Further, it is necessary to restrict the deadline for use of these dispersed liquids or to carry out control of the storage conditions, and became a factor causing variations in the quality during processing. Further, in a factory in which the solvent is being recovered in the solution casting method, bringing in dispersed liquid from the outside would increase the amount of solvent caused by the dispersed liquid, and sometimes there was a load on the solvent recovery capacity. In addition, in a factory that is recycling the solvent, since solvent is being brought in to the factory apart from that being recycled, it becomes necessary to strengthen the function of the solvent recovery equipment, or else, if the amount of accumulated solvent increases the upper limit, it is necessary to increase the storage tanks, or to dispose of the solvent that is brought in.

On the other hand, as a different method of adding grains to resin is that of adding the grains to the resin and kneading them. There is the method of powdering after mixing a solid material based on resin powder or resin pellets with the grains, and also, there is the method of mixing the solid material with the grains and then palletizing the melted resin material.

Incidentally, there may be considered the method of heating a solid material based on resin powder or resin pellets and taking it into the melted state and then mixing grains with it and kneading it, and the method of palletizing the melted material. However, in these methods, it may be considered that thermal dissociation takes place of at least a part of the mixed and kneaded material at the time of heating and melting, and it may be estimated that the molecular weight of the resin goes down, and the strength of the optical film prepared from this goes down becoming brittle, and the mechanical strength as an optical film sometimes become insufficient. In addition, it may be estimated that thermal dissociation of the mixed and kneaded material occur during heating and melting, it may get colored which is not desirable as an optical film, or noise may be generated. Therefore, in order to avoid thermal dissociation, it may be considered desirable to carryout mixing and kneading at as low a temperature as possible.

In general, while a plasticizer is added to the mixed and kneaded material for the purpose of controlling the moisture permeability of the optical film, as another effect of adding a plasticizer is that it is possible to heat and melt and knead at a lower temperature than the, melting point of the resin itself. However, the following points are estimated that when a film is prepared by solvent casting using these mixed and kneaded materials, because of additional heat being applied, the strength as an optical film decreases, the plasticizer may solve out at high temperature and high humidity, thereby becoming an impediment to reaching the quality required of an optical film.

SUMMARY

Therefore, a purpose of the present invention is to provide a method of manufacturing uniformly and in large quantity an optical film that has excellent dimensional stability with respect to haze or bright point foreign matter, humidity, and heat.

In particular, a purpose of the present invention is to provide a method of manufacturing optical films having cellulose resin used desirably in large sized image display apparatuses, an optical film, and a polarizing plate and image display apparatus using it.

The above purpose of the present invention can be achieved by methods and structures described in the following Items.
1. A method of producing an optical film, comprises the steps of:
   mixing a resin and grains, heating a mixture of the resin and the grains and kneading the heated melted mixture, thereby preparing a mixture material of the resin and the grains;
   dissolving the mixture material in a solvent, thereby preparing a resin solution; and
   casting the resin solution so as to form an optical film.
2. The method described in Item 1, wherein when Tg1 represents a glass transition temperature (° C.) of the optical film and Tg2 represents a glass transition temperature (° C.) of the mixture material, the following relationship is satisfied.

Tg1>Tg2

3. The method described in Item 1 or 2, wherein the resin is a cellulose resin.
4. The method described in any of Items 1 to 3, wherein the resin solution contains another in addition to the mixture material.
5. The method described in any of Items 1 to 4, wherein the resin solution contains a plasticizer.
6. The method described in any of Items 1 to 5, wherein when Tg1 represents a glass transition temperature (° C.) of the optical film and Tg2 represents a glass transition temperature (° C.) of the mixture material, the plasticizer is added such that the following relationship is satisfied.

Tg1>Tg2

7. The method described in any of Items 1 to 6, wherein the mixture material is shaped in a pellet having a size of from (1 mm×1 mm×1 mm) to (20 mm×20 mm×20 mm).
8. The method described in any of Items 1 to 7, wherein the mixture material contains a compound represented by Formula (1),

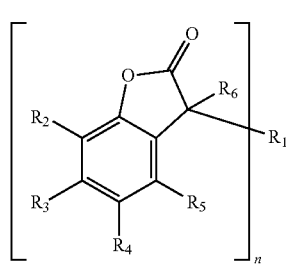

Formula (1)

wherein $R_2$ through $R_5$ independently represent a hydrogen atom or a substituent; $R_6$ represents a hydrogen atom or a substituent; and n is 1 or 2, when n is 1, $R_1$ represents a substituent, and when n is 2, $R_1$ represents a divalent linkage group.
9. The method described in any of Items 1 to 7, wherein the mixture material contains a compound represented by Formula (2) and including a acrylate group or a methacrylate group and a phenolic hydroxyl group in the same molecule,

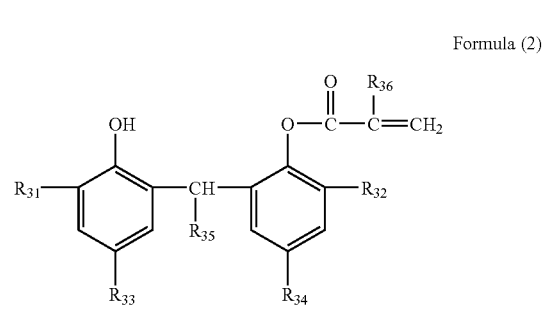

Formula (2)

where $R_{31}$ to $R_{35}$ are the same to or different from each other, and a hydrogen atom or an alkyl group having a carbon number of 1 to 10.
10. An optical film produced by the method described in any one of Items 1 to 9.
11. A polarizing plate, comprising:
    a polarizer; and
    the optical film described in Item 10 and provided on at least one surface of the polarizer.
12. An image display device, comprising:
    an image display panel, and
    the optical film described in Item 10 or the polarizing plate described in Item 11 which is provided on at least one surface of the image display panel.

By the present invention, it is possible to provide a method of manufacturing optical films having cellulose resin used desirably in large sized image display apparatuses, an optical film, and a polarizing plate and image display apparatus using it.

In particular, it is possible to provide a method of manufacturing optical films having cellulose resin used desirably in large sized image display apparatuses, an optical film, and a polarizing plate and image display apparatus using it.

DETAILED DESCRIPTION OF THE PREFERRED EMBODIMENTS

Figure 1:
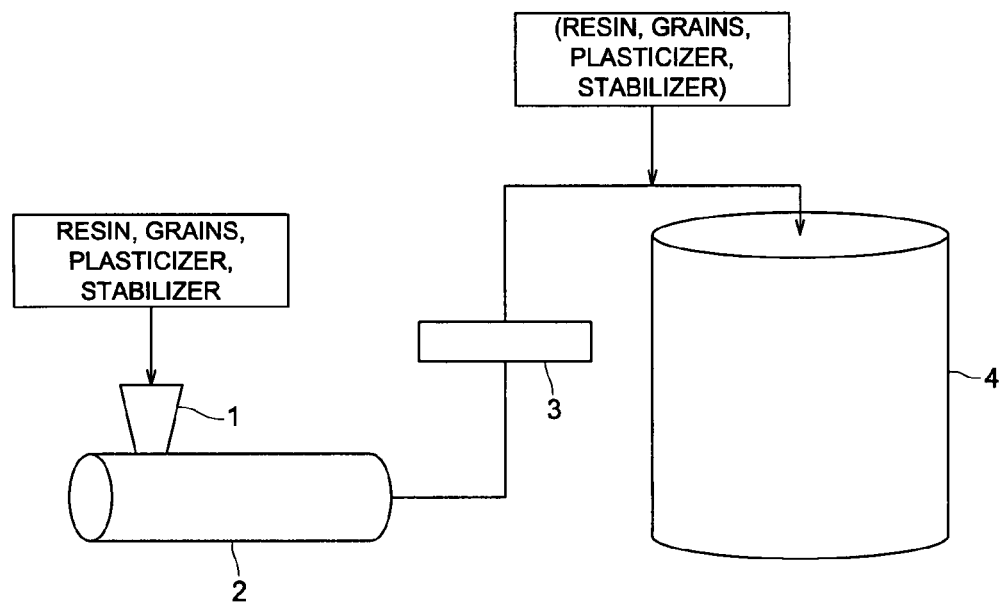
FIG. 1 is a conceptual diagram showing the heated melted material, pellet preparation, and dope preparation according to the present invention.

While some preferred embodiments of the present invention are described below, the present invention shall not be limited to these.

The method of manufacturing an optical film according to the present invention has the feature that it uses the solution casting method, and in addition has the feature that a resin and grains are heated, melted, mixed, and kneaded thereby preparing a heated melted material which means a mixture material of the resin and the grains, said mixture material of the resin and the grains of the heated melted material is dissolved in a solvent thereby preparing a resin solution, and by making that resin solution into an optical film using the solution casting method.

The optical film according to the present invention is a film in which a resin and grains are compounded together. The grains are used for the purposes of suppressing variations in the physical characteristics of the film due to environmental changes, and for the purpose of strengthening the mechanical physical characteristics of the film. In the present invention, the grains may also have optical action. The optical film according to the present invention is suitable for use as a polarization plate protective film.

The average grain diameter of the grains used in the present invention can be selected according to the purpose of the optical film. In this field, since it is being used as an optical film, it is desirable that it has grains with a grain diameter of 10 nm or more but 500 nm or less. It is desirable that the average grain diameter is in the range 10 nm to 300 nm if the grains are used for controlling the refractive index or the polarization of the film and the type of grains can be one type or can be two or more types. Here, "two or more types" refers not only to merely the types but also includes grains with different shapes, refractive indices, and materials.

At this time, it is desirable that the refractive index of the grains is close to or equal to the refractive index of the resin that is present in the surroundings of the grains because it increases the transparency.

On the other hand, it is possible to adjust according to the purpose by carrying out design that intentionally makes the refractive index of the grains to be different from the refractive index of the resin that is present in the surroundings of the grains, or to make the difference between them small. Because of this, it is possible to control the transmission, reflection, dispersion or diffusion, and phase shift of light. Although the optical film of the present invention can be designed to have characteristics of light reflection, dispersion, or diffusion, for the purpose of the present invention, it is desirable that the film is an optical film with a high transparency.

The resin in the heated and melted material of the present invention is required to have thermal plasticity characteristics. If the thermal plasticity characteristic of the resin is insufficient, the thermal plasticity is speeded up by heating the plasticizer used in the invention after mixing with the resin, and then preparing the heated and melted material. This is carried out to avoid thermal dissociation due to heating.

Further, materials other than the resin or the grains in the optical film are required to be soluble in the solvent used at the time of manufacture by solvent casting from the point of view of uniformity of the optical film. This solvent can be a single solvent or can be a mixture of several solvents.

The optical film of the present invention has a glass transition temperature (Tg1). In this case, if there are several glass transition temperatures when measured using a differential scanning calorimeter, the temperature region with the largest amount of absorbed heat is defined as the glass transition temperature Tg1.

Further, when several of the glass transition temperatures (Tg2) of the heated and melted material are present when the glass transition temperature is measured using a differential scanning calorimeter, the temperature region with the largest amount of absorbed heat is defined as the glass transition temperature Tg2.

In the above, "the temperature region with the largest amount of absorbed heat" corresponds to the amount of heat absorbed by the material in the resin in the optical film or the heated and melted material that dominates the thermal characteristics.

In the present invention, in order to obtain a more stable film, it is desirable that it exhibits the relationship of Tg1 (° C.) >Tg2 (° C.). For example, by allocating the material, among the materials constituting an optical film, that makes Tg1 (° C.)>Tg2 (° C.) to the side of the heated and melted material, it is possible to obtain a heated and melted material that has less dissociated material or no dissociated material. This means that it is possible to reduce or avoid coloring or changes in the material characteristics due to dissociation, and also, it is either possible to suppress the reduction in the molecular weight or to maintain the molecular weight within a range in which there is no effect on the physical characteristics as a film.

The measurement of the glass transition temperature Tg1 or Tg2 can be done by enclosing 10 mg of the material in an aluminum sample pan, drying it in vacuum for 24 hours, thereafter, increasing the temperature at 20° C./min in a differential scanning calorimeter (DSC) (Model DSC8230 manufactured by Rigaku Co., Ltd.), and obtaining the extrapolated glass transition starting temperature obtained by the DSC curve as the glass transition temperature.

Further explanations are given here about the method of obtaining said relationship Tg1 (° C.)>Tg2 (° C.).

The resin in the optical film according to the present invention is taken as polymer-1 and the resin in the heated and melted material is taken as polymer-2. It is possible to use one or more types as polymer-1 and polymer-2. In the present invention, polymer-1 that is present in the optical film, in order to include polymer-2 that is present in the heated and melted material, regarding the resin, polymer-1 becomes either the same as polymer-2 or a compound having polymer-2. It is desirable for usage as an optical film that the resin polymer-1 that has polymer-2 and the resin polymer-2 are mutually compatible.

In the present invention, in order to make Tg1 (° C.)>Tg2 (° C.), for example, either polymer-1 and polymer-2 are the same, or even in case they are different, it is possible to adjust using the plasticizer that is added.

In the present invention, even when polymer-1 and polymer-2 are polymers having the same glass transition temperature when polymer-1 and polymer-2 are of the same or different types, or a compound of these, it is possible to make Tg1 (° C.)>Tg2 (° C.) if the ratio of the plasticizer to polymer-2 that constitutes the heated and melted material is higher than the ratio of the plasticizer to polymer-1 that constitutes the optical film. In other words, if more of the plasticizer required for constituting an optical film is allocated in the heated and melted material, it is possible to adjust so as to make Tg1 (° C.)>Tg2 (° C.).

Further, even if the ratio of the plasticizer to polymer-2 that constitutes the heated and melted material is equal to or lower than the ratio of the plasticizer to polymer-1 that constitutes the optical film, it is possible to make Tg1 (° C.)>Tg2 (° C.) by selecting in said heated and melted material at least one or more types of a plasticizer having the capacity to reduce the glass transition temperature. When the glass transition temperature of polymer-1 is higher than the glass transition temperature of polymer-2, the resin present in the heated and melted material may contain a plasticizer or may not contain a plasticizer.

When the glass transition temperature of polymer-1 is lower than the glass transition temperature of polymer-2, it is possible to make Tg2 less than Tg1 by adding a plasticizer to the resin present in the heated and melted material. In order to obtain an optical film, for the quantity of the plasticizer brought in due to the heated and melted material, it is possible either to add or to not add thereafter the same or a different plasticizer.

In the present invention, it is particularly desirable to select polymer-1 and polymer-2 of the same type. Here, "of the same type" means that the framework of the main chain of the polymer is the same and desirably the molecular weight is the same. Further, it is also possible to select polymers of the same type with different molecular weights, and in this case, it is desirable to select a combination in which the molecular weight of polymer-2 is lower than the molecular weight of polymer-1. When a resin with a low molecular weight is selected with the purpose of avoiding thermal dissociation at the time of obtaining the heated and melted material, it is possible to manufacture either by adding a resin with a high molecular weight for compensating the physical characteristics as an optical film at the time of carrying out solution casting, or by dividing the share of the resin used at the time of heating and melting relative to the amount of resin added at the time of solution casting.

In the present invention, in order to achieve the purpose of the present invention, it is desirable that the material used at the time of heating, mixing, and kneading for obtaining the heated and melted material or the dissociated material does not evaporate or sublimate. If they evaporate or sublimate, the amount of material contained in the manufactured optical film becomes different, thereby causing fluctuations in the quality, and there is the possibility of causing variations between different lots of the optical film.

Further, in the film at the time of solution casting, it is desirable that the materials constituting the optical film do not evaporate or sublimate. This is because, if the solvent evaporates at the time of solution casting, it will lead to the production line getting contaminated due to the evaporation or sublimation of the material constituting the optical film. As a result, the surface quality of the optical film, particularly the flatness may deteriorate. Further, when the film is manufactured as a long roll of film, it is not desirable that the materials constituting the optical film fluctuate from the beginning half of the roll to the ending half of the roll, or along the width of the roll, and for this point of view, it is desirable that the materials constituting the optical film do not evaporate or sublimate at the time of solution casting.

The materials that are relatively volatile or can sublime are generally low molecular weight compounds rather than resins, and are plasticizers, stabilizers, UV absorber, etc. From the point of view of avoiding such evaporation or sublimation, while it is desirable to select as the materials other than the resin those materials that, in their molecular design, have introduction of dimers, trimers, or ballast radicals, or materials that have been polymerized, but there is not particular limitation.

In the following, detailed explanation is given about the different constituents.

Plasticizer:

In the present invention, adding a compound known as a plasticizer is desirable from the point of view of improving the quality of the film such as, improving the mechanical properties, providing resistance to moisture absorption, reduction of the moisture permeability, etc.

Further, it is possible to use this for the purpose of reducing the melting temperature of the materials constituting the film, within a region in which the purpose of the present invention is satisfied. In addition, in a material constituting the film that includes a plasticizer, it is possible to reduce the heating, mixing, and kneading temperature and to adjust the melt viscosity at the time of heating, mixing, and kneading with the grains.

The resin, at temperatures lower than the glass transition temperature, does not exhibit the fluidity necessary for forming it into a film. However, for this resin, at temperatures above the glass transition temperature, the elasticity or the viscosity decreases due to the absorption of some quantity of heat, and hence fluidity appears due to heating. In order to melt the material constituting the film, it is desirable that the plasticizer has a lower melting point than the glass transition temperature of the resin.

When using cellulose resin as the resin, ester phosphate derivates and ester carbonate derivatives are used desirably as the plasticizer according to the present invention. Further, ethylene based unsaturated monomers with weight average molecular weight is 500 or more and 10000 or less as disclosed in Japanese Unexamined Patent Application Publication No. 2003-12859, acrylic type polymers, acrylic type polymers having an aromatic ring as a side chain, or acrylic type polymers having a cyclohexyl radical as a side chain, etc., are used desirably.

The phosphoric acid ester derivative is exemplified by triphenyl phosphate, tricresyl phosphate and phenyldiphenylphosphate.

The carboxylic acid ester derivative is exemplified by phthalic acid ester and citric acid ester. The phthalic acid ester derivative is exemplified by dimethylphthalate, diethylphthalate, dicyclohexyl phthalate, dioctylphthalate and diethylhexylphthalate. The citric acid ester is exemplified by citric acid acetyl triethyl and citric acid acetyl tributyl.

Other substances preferably used for the aforementioned purpose are butyl oleate, methylacetyl ricinoleate, dibutyl sebacate, triacetin, trimethylol propane tribenzoate and others. Alkylphthalylalkylglycolate is also used for this purpose. The alkyl of the alkylphthalyl alkylglycolate is an alkyl group containing 1 through 8 carbon atoms. The alkylphthalyl alkylglycolate is exemplified by methylphthalyl methylglycolate, ethylphthalyl ethylglycolate, propylphthalyl propylglycolate, butylphthalyl butylglycolate, octylphthalyl octylglycolate, methylphthalyl ethylglycolate, ethylphthalylmethyl glycolate, ethylphthalylpropyl glycolate, propylphthalyl ethylglycolate, methylphthalyl propylglycolate, methylphthalyl butylglycolate, ethylphthalylbutyl glycolate, butylphthalyl methylglycolate, butylphthalyl ethylglycolate, propyl phthalyl butylglycolate, butylphthalyl propylglycolate, methylphthalyl octylglycolate, ethylphthalyloctyl glycolate, octylphthalyl methylglycolate and octylphthalyl ethylglycolate. Methylphthalyl methylglycolate, ethylphthalyl ethylglycolate, propylphthalyl propylglycolate, butylphthalyl butylglycolate and octylphthalyl octylglycolate are preferably used. In particular, ethylphthalyl ethylglycolate is preferably used. Further, two or more of the alkylphthalyl alkylglycolate and others can be mixed for use.

The amount of these compounds to be added can be adjusted for the purpose of achieving the aforementioned object.

The aforementioned plasticizer is preferred not to generate a volatile component at the time of heating and melting. To put it more specifically, the nonvolatile phosphoric acid ester described in the Japanese Non-Examined Patent Application Publication (Tokuhyohei) 6-501040 can be mentioned as an example. The arylene bis(diaryl phosphate) ester and trimethylol propane tribenzoate as the above illustrated compound can be preferably used, without being restricted thereto. When the volatile component results from the pyrolysis of the aforementioned plasticizer and the pyrolysis temperature Td (1.0) of the aforementioned plasticizer is defined as the temperature when reduced 1.0% by mass, then the pyrolysis temperature Td (1.0) is preferably higher than the temperature at the time of heating to get the heated and melted material of the present invention. In the case of a material other than plasticizer, the volatilization of the materials constituting the film deteriorates the quality of the film to be produced. Accordingly, it is preferred to use the method of dissolution at a temperature for minimizing pyrolysis or to make a concurrent use of the stabilizer that reduces pyrolysis.

The pyrolysis temperature Td (1.0) can be measured using the aforementioned differential thermogravimetric analyzer (TG-DTA).

When it is possible to predict in advance the evaporation, sublimation, or dissociation during mixing, heating, and kneading of any of the materials preparing the heated and melted material, for example, the moisture that was absorbed, or a solvent that is mixed either before the materials were purchased or during synthesis, it is possible to reduce the volatile component by carrying out preliminary heating before preparing the heated and melted material thereby causing their evaporation, sublimation, or dissociation. When the volatile component is moisture or a solvent, it is desirable to remove before heating, mixing, and kneading the volatile components typified by said moisture or said solvent, etc. It is possible to apply the widely known drying methods as the method of such removal, and it is possible to carry this out by the heating method, the pressure reducing method, or the heating and pressure reducing method, and it is possible to carry this out in air or in the atmosphere of nitrogen selected as the inert gas. When carrying out these widely known drying methods, it is desirable to carry it out in a temperature region in which the materials of the heated and melted material do not dissociate from the point of quality in obtaining the optical film according to the present invention.

It is desirable from the point of view of obtaining stable film in manufacturing to make the moisture or solvents present residually after being removed in said drying process is 20% by mass or less of the total mass of the materials that are heated, mixed, and kneaded, or the total mass of the materials other than the solvents added during solution casting, more desirably 10% or less by mass, yet more desirably 5% or less by mass, and still more desirably 1% or less by mass.

Regarding the temperature during drying in this case, by drying before preparing the film, it is possible to reduce the generation of volatile components, and it is possible to dry the resin independently, or by dividing into one or more types of mixtures of the heated and melted material. The desirable temperature as typified for moisture is 100° C. or more, and it is desirable to carry out the drying at a temperature that is less than the Tg of the resin material to be dried and also at a temperature less than the thermal dissociation temperature.

Further, the desirable drying timed is from 0.5 to 24 hours, more desirably from 1 to 18 hours, and still more desirably 1.5 to 12 hours. If lower than these ranges, either the rate of removal of the volatile components is low, or too much drying time is taken, and when a Tg is present for the material being dried, if heating is done to a drying temperature higher than Tg, the material may get adhered and the handling may become difficult.

It is also possible to divide the drying process into two or more stages, for example, it is possible to store the material in a preliminary drying process, and when obtaining a heated and melted material, the film can be manufactured via a drying process between immediately before preparing the films by solution casting to one week before. Further, regarding the material for preparing films by solution casting, it is possible to manufacture the film via a drying process between immediately before preparing the films by solution casting to one week before.

In the present invention, in the heated and melted material, it is desirable to add at least one type of stabilizer before heating and melting said cellulose resin or at the time of heating and melting. It is required that the stabilizer functions without itself dissociating at the melting temperature for film preparation.

<<Stabilizer>>

Although the stabilizer can be, for example, an anti-oxidant agent, oxygen capturing agent, hindered amine light stabilizer, ultraviolet ray absorber, peroxide decomposer, radical capturing agent, metal deactivating agent, etc., but it is not necessary to limit to these. These have been mentioned in Japanese Unexamined Patent Publication No. Hei. 3-199201, Japanese Unexamined Patent Publication No. Hei 5-1907073, Japanese Unexamined Patent Publication No. Hei 5-194789, Japanese Unexamined Patent Publication No. Hei 5-271471, and Japanese Unexamined Patent Publication No. Hei 6-107854. It is desirable that at least one type selected from among these is included in the film forming material.

In the present invention, into the heated and melted material, it may be preferable to add the compound represented by Formula (1).

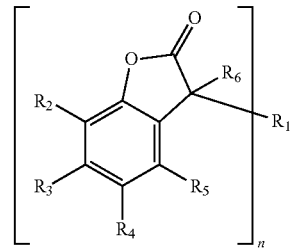

Formula (1)

wherein $R_2$ through $R_5$ independently represent a hydrogen atom or a substituent; $R_6$ represents a hydrogen atom or a substituent; and n is 1 or 2, provided that when n is 1, $R_1$ represents a substituent, and when n is 2, $R_1$ represents a divalent linkage group.

In Formula (1), examples of the substituent represented by formula $R_{22}$ through $R_{25}$ include an alkyl group (for example, a methyl group, an ethyl group, a propyl group, an isopropyl group, a t-butyl group, a pentyl group, a hexyl group, an octyl group, a dodecyl group, or a trifluoromethyl group), a cycloalkyl group (for example, a cyclopentyl group or a cyclohexyl group), an aryl group (for example, a phenyl group, or a naphthyl group), an acylamino group (for example, an acetylamino group, or a benzoylamino group), an alkylthio group (for example, a methylthio group, or an ethylthio group), an arylthio group (for example, a phenylthio group or a naphthylthio group), an alkenyl group (for example, a vinyl group, 2-propenyl group, a 3-butenyl group, a 1-methyl-3-propenyl group, a 3-pentenyl group, a 1-methyl-3-butenyl group, a hexenyl group or a cyclohexenyl group), a halogen atom (for example, fluorine, chlorine, bromine, iodine), an alkinyl group (for example, a propargyl group), a heterocyclic group (for example, pyridyl group, a thiazolyl group, an oxazolyl group or an imidazolyl group), an alkylsulfonyl group (for example, a methylsulfonyl group or an ethylsulfonyl group), an arylsulfonyl group (for example, a phenylsulfonyl group or a naphthylsulfonyl group), a sulfinyl group (for example, a methylsulfinyl group), an arylsulfonyl group (a phenylsulfinyl group), a phosphono group, an acyl group (for example, an acetyl group, a pivaloyl group or a benzoyl group), a carbamoyl group (for example, an aminocarbonyl group, a methylaminocarbonyl group, a dimethylaminocarbonyl group, a butylaminocarbonyl group, a cyclohexylaminocarbonyl group, a phenylaminocarbonyl group, or a 2-pyridylaminocarbonyl group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group or a 2-pyridylaminosulfonyl group), a sulfonamide group (for example, a methanesulfonamide group or a benzene sulfonamide group), a cyano group, an alkoxy group (for example, a methoxy group, an ethoxy group, or a propoxy group), an aryloxy group (for example, a phenoxy group or a naphthyloxy group), a heterocycleoxy group, a silyloxy group, an acyloxy group (for example, an acetyloxy group, or a benzoyloxy group), a sulfonic acid group, a sulfonate group, an aminocarbonyloxy group, an amino group (for example, an amino group, an ethylamino group, a dimethylamino group, a butylaminocarbonyl group, a cyclopentylamino group, a 2-ethylhexylamino group, or a dodecylamino group), an anilino group (for example, a phenylammino group, a chlorophenylammino group, a toluidino group, an anisidino group, a naphthylamino group or a 2-pyridylamino group), an imino group, a ureido group (for example, a methylureido group, an ethylureido group, a pentylureido group, a cyclohexylureido group, an octylureido group, a dodecylureido group, a phenylureido group, a naphthylureido group, or a 2-pyridylureido group), an alkoxycarbonylamino group (for example, a methoxycarbonylamino group or a phenoxycarbonylamino group), an alkoxycarbonyl group (for example, a methoxycarbonyl group or an ethoxycarbonyl group), an aryloxycarbonyl group (for example, a phenoxycarbonyl group), a heterocyclicthio group, a thioureido group, a carboxyl group, a carboxylate group, a hydroxyl group, a mercapto group, and a nitro group. These substituents may further have the substituent as described above.

In Formula (1), $R_2$ through $R_5$ are preferably a hydrogen atom or an alkyl group.

In Formula (1), $R_6$ represents a hydrogen atom or substituents, and the substituents represented by $R_6$ is the same as those denoted in $R_2$ through $R_5$ above.

In Formula (1), $R_6$ is preferably a hydrogen atom.

In Formula (1), n is 1 or 2.

In Formula (1), when n is 1, $R_1$ is a substituent, and when n is 2, $R_1$ is a divalent linkage group. When $R_1$ is a substituents, examples of the substituent include the same substituents denoted in $R_{22}$ through $R_{25}$ above. When $R_1$ is a divalent linkage group, examples of the divalent linkage group include a substitued or unsubstituted alkylene group, a substituted or ubsubtituted arylene group, an oxygen atom, a nitrogen atom, a sulfur atom or a combination thereof.

In Formula (1), n is preferably 1, at that time, $R_1$ is preferably a substituted or unsubstituted phenyl group, more preferably a alkyl group-substituted phenyl group.

Examples of the compound represented by formula 1 will be listed below, but the invention is not limited thereto.

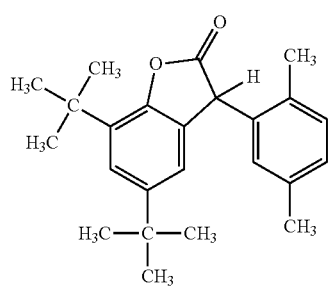

101

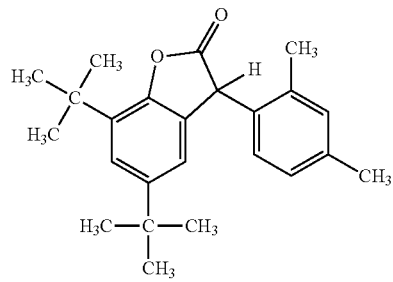

102

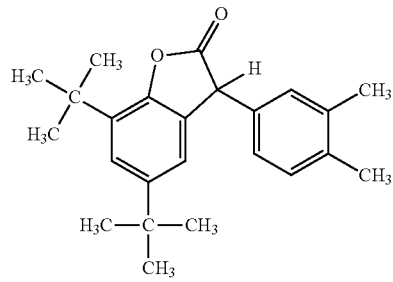

103

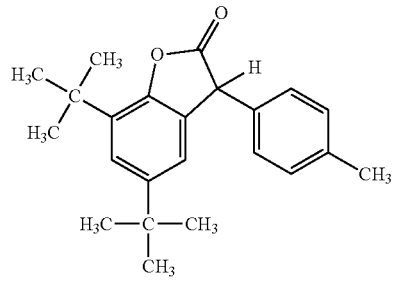

104

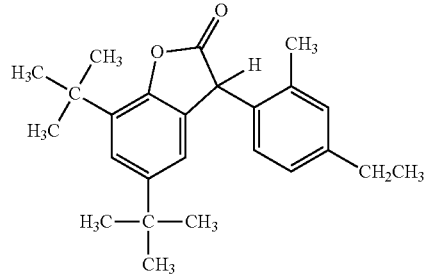

105

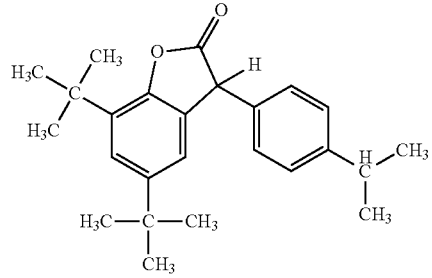

106

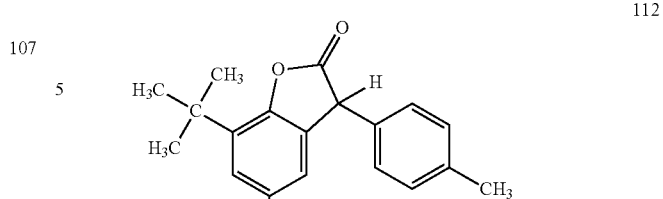
107
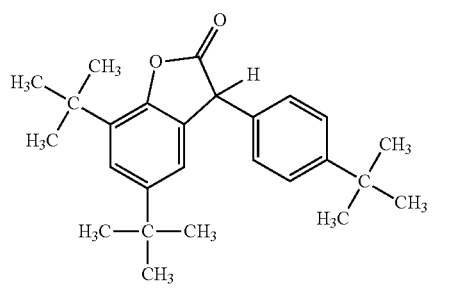
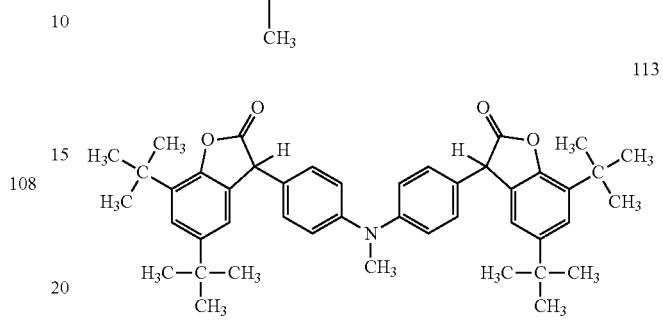
108
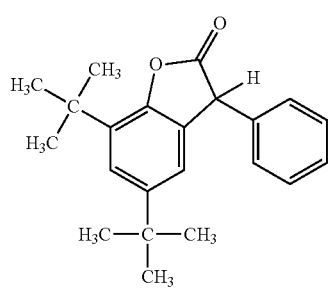
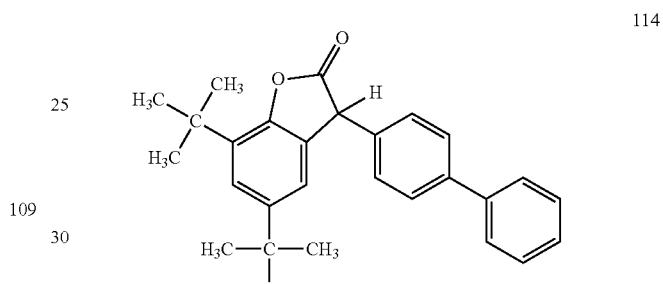
109
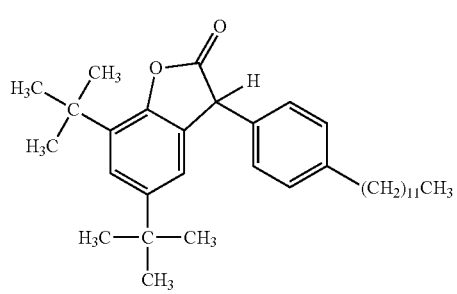
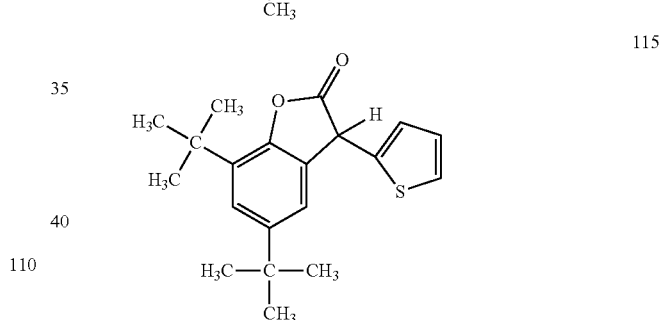
110
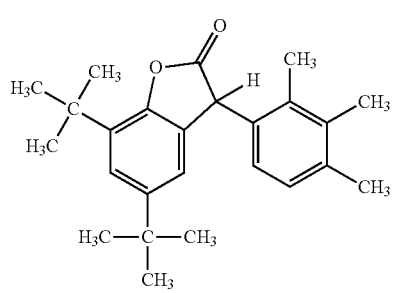
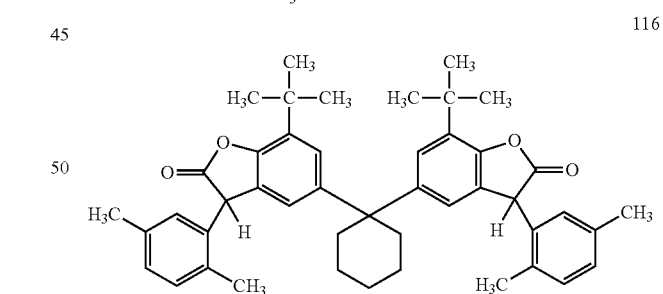
111
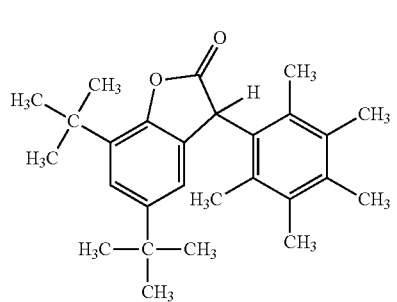
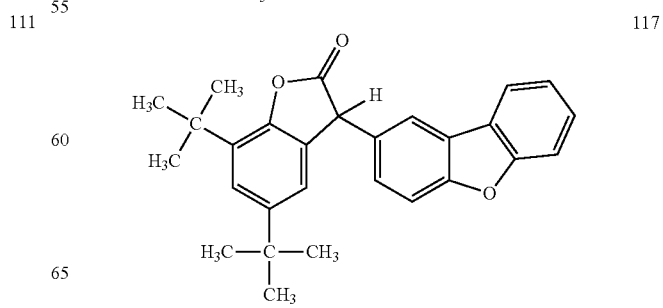
112
113
114
115
116
117

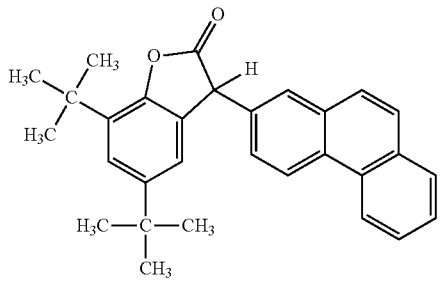

118

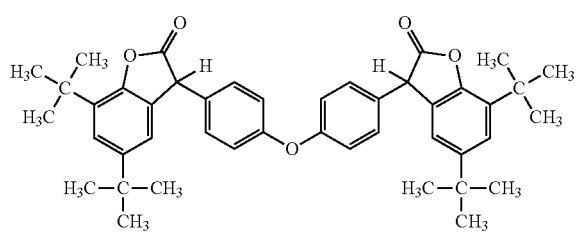

119

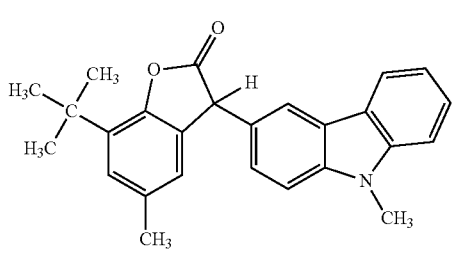

120

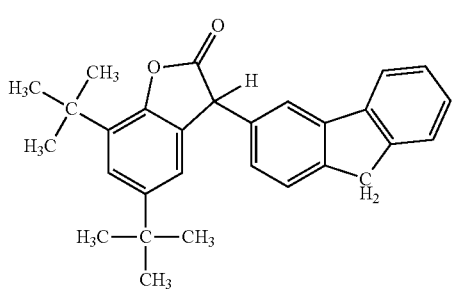

121

These compounds can be used singly or as an admixture of two or more kinds thereof. The added amount of the compound may appropriately selected from a range with which the object of the present invention is no spoiled, however, it is preferably from 0.001 to 10.0 parts by weight and more preferably from 0.01 to 5.0 parts by weight, and still more preferably from 0.1 to 3.0 parts by weight, base on 100 parts by weight of cellulose ester.

The most preferably examples of the compounds represented by Formula (1) is a compound represented by the following formula and manufactures in the name of HP-136 by Ciba Specialty Chemicals Co.

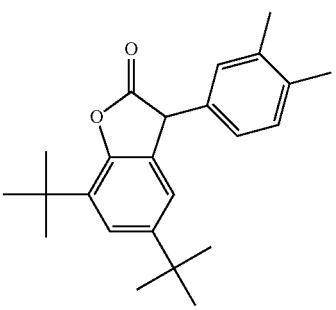

Fw: 351

The heated molted material of the present invention preferably contains a compound represented by Formula (2) which includes a acrylate group or a methacrylate group and a phenolic hydroxyl group in the same molecule.

Formula (2)

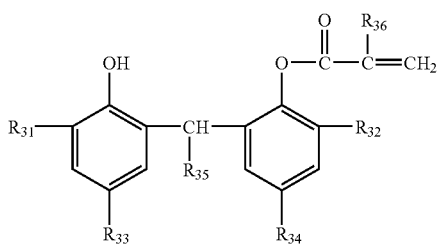

In the compound represented by Formula (2) which includes a acrylate group or a methacrylate group and a phenolic hydroxyl group in the same molecule, $R_{31}$ to $R_{35}$ are the same or different, a hydrogen atom or an alkyl group having a carbon number of 1 to 10, preferably an alkyl group having a carbon number of 1 to 5. The alkyl group may be selected with consideration the effect as a stabilizer and the easiness manufacturing. Concrete examples of the alkyl group represented by $R_{31}$ to $R_{35}$, include a methyl group, an ethyl group, a n-propyl group, an isopropyl group, a n-butyl group, a sec-butyl group, an isobutyl group, a tert-butyl group, 1,1-dimethyl propyl group. Especially as $R_{31}$ and $R_{32}$, an alkyl group such as an isopropyl group, a sec-butyl group, a tert-butyl group, 1,1-dimethyl propyl group which is high bulky to become a steric hindrance may be preferably in the points of the stabilization effect and the easiness in manufacturing. Among them, a tert-butyl group, 1,1-dimethyl propyl group is especially desirable. As $R_{33}$ and $R_{34}$, a methyl group, an ethyl group, a n-propyl group, an isopropyl group, a n-butyl group, a sec-butyl group, an isobutyl group, a tert-butyl group, 1,1-dimethyl propyl group is usable from a viewpoint of the easiness in manufacturing, however, when the generation reaction of the quinoid type structure accompanying hydrogen-drawing-out is taken into consideration, a tert-butyl group, 1,1-dimethyl propyl group may be preferable as $R_{35}$, an alkyl group such as a methyl group, an ethyl group, a propyl group, and a n-butyl group which rarely become steric hindrance, is desirable from a viewpoint of manufacturing. $R_{36}$ is a hydrogen atom or a methyl group.

Examples of the compound represented by formula 2 will be listed below, but the invention is not limited thereto.

17
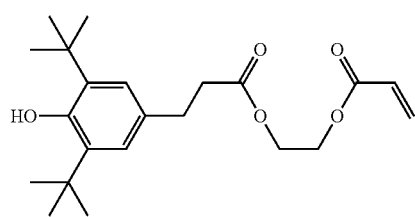
1
18
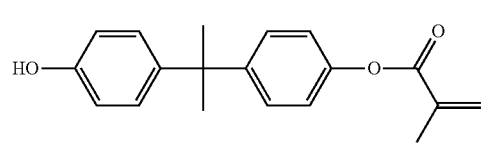
2
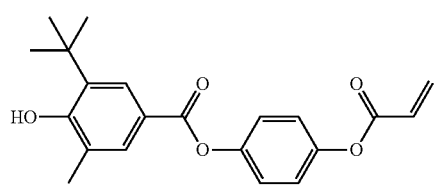
3
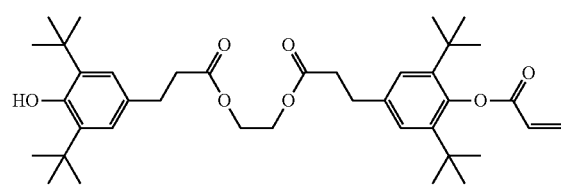
4
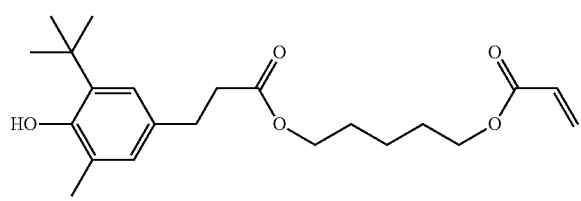
5
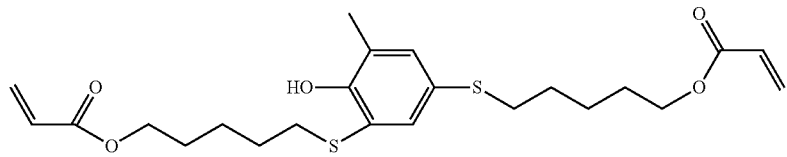
6
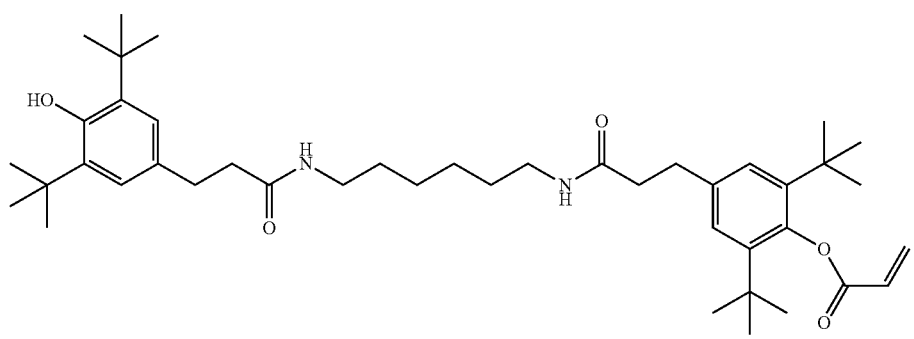
7
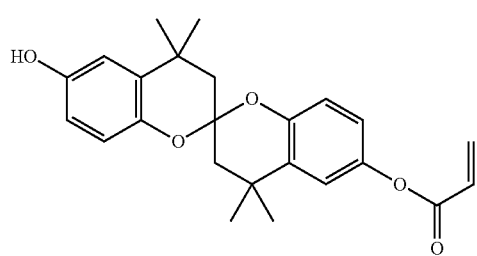
8
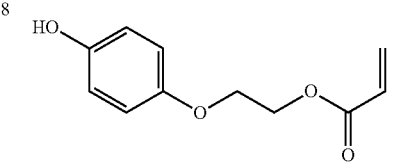
9

-continued
10
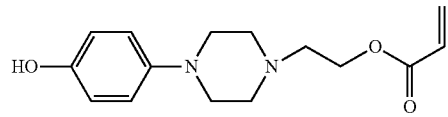
11
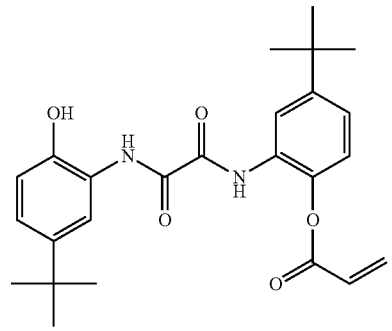
12
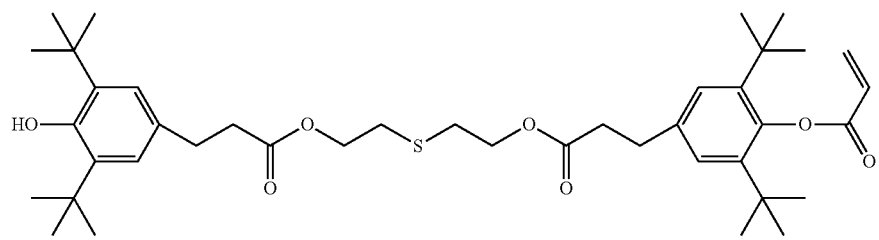
13
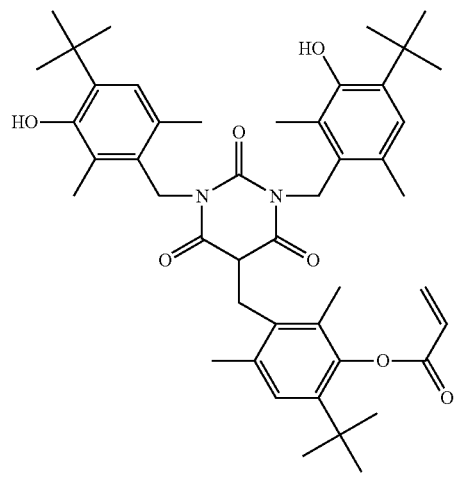
14
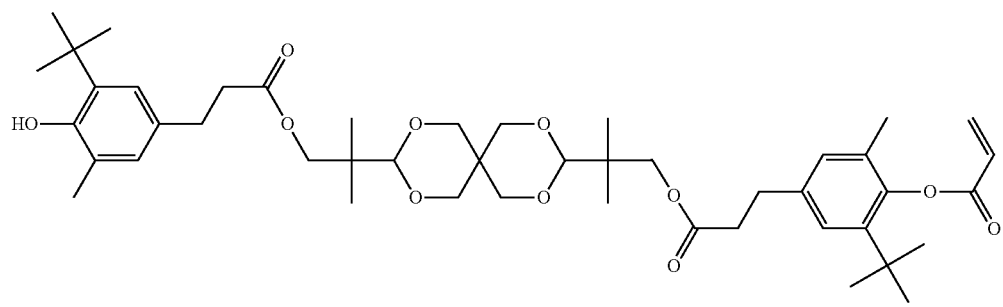
15
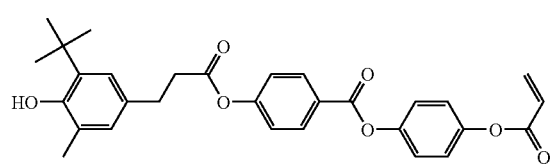
16
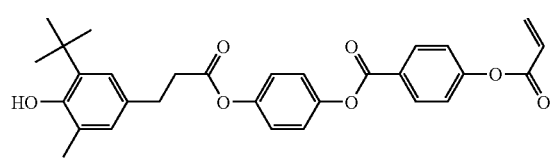

17
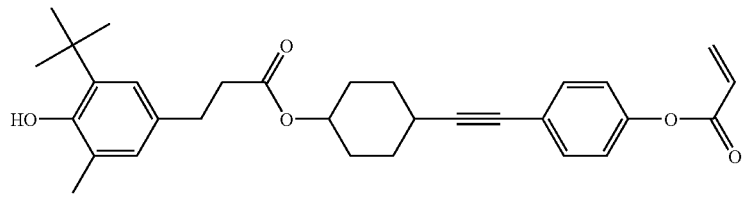
18 19
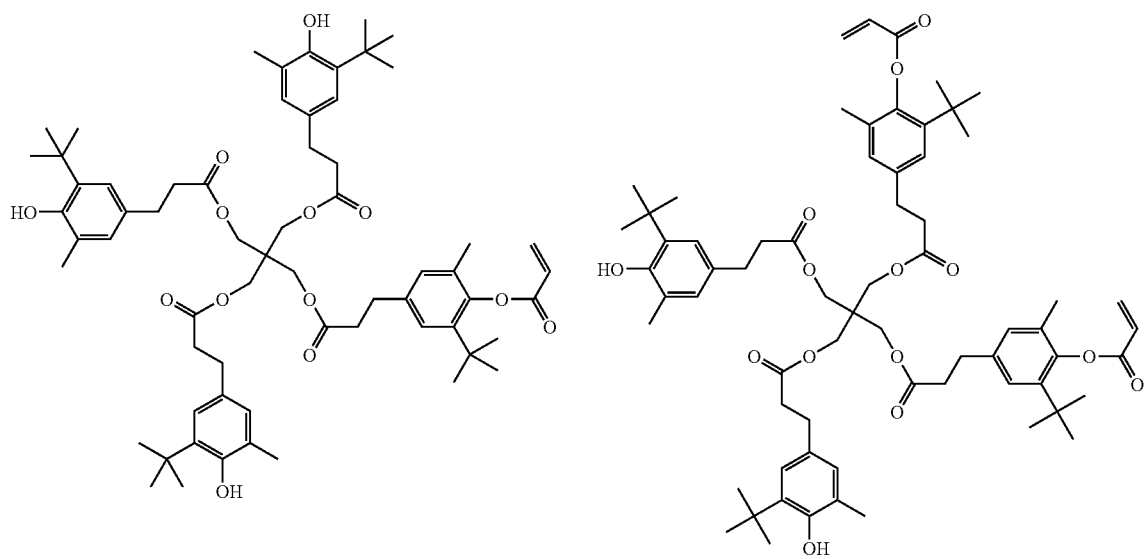
20
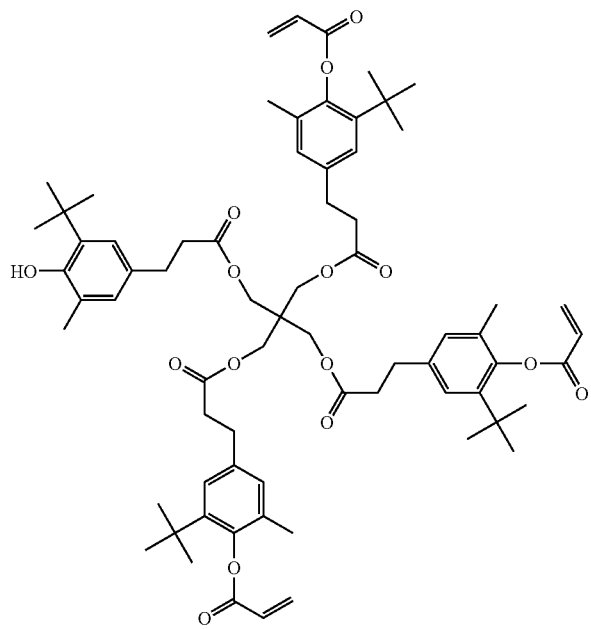

Typical examples of compounds include "Sumilizser GS" (trade name), "Sumilizser GM" (trade name), each being available from Sumitomo Kagaku Kogyo Co., Ltd.

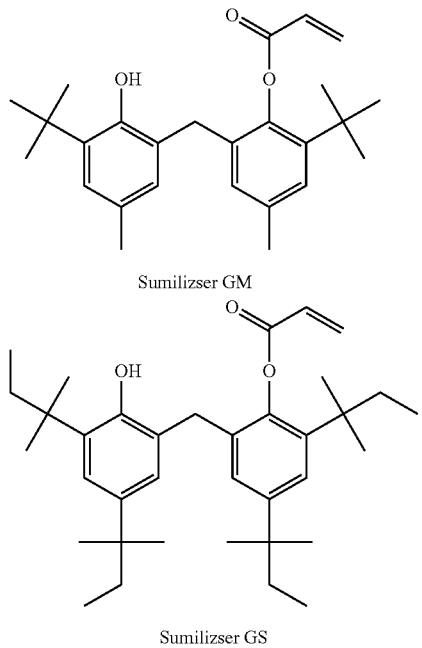

Sumilizser GM

Sumilizser GS

The compound represented by Formula (2) which includes a acrylate group or a methacrylate group and a phenolic hydroxyl group in the same molecule is preferably used in an amount of 0.01 to 5 parts by weight for 100 parts by weight of cellulose ester. In order to obtain an excellent effect of the present invention, it is preferably contained in an amount of 0.1 to 3 parts by weight in the composition, more preferably 0.5 to 1 parts by weight.

Further, separately from the above compounds, a hindered phenol type compound mentioned later is preferably used together.

In this invention, it is also desirable to use at least one kind of a phenyl benzonate ester compound. Among them, it is more desirable to add the phenyl benzonate ester compound represented by Formula (3) in a heated molted material.

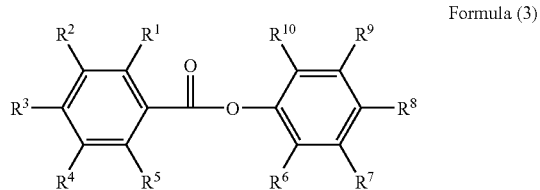

Formula (3)

In Formula (3), $R^2$, $R^3$, $R^4$, $R^5$, $R^6$, $R^7$, $R^9$, and $R^{10}$ each independently represent a hydrogen atom or a substituent. At least one of $R^1$, $R^2$, $R^3$, $R^4$, and $R^5$ represents an electron donating group.

$R^8$ represents a hydrogen atom, an alkyl group having 1 to 4 carbon atoms, an alkynyl group having 2 to 12 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group, a carbonyl group or a halogen atom.

In Formula (3), $R^1$, $R^2$, $R^3$, $R^4$, $R^5$, $R^6$, $R^7$, $R^9$, and $R^{10}$ each independently represent a hydrogen atom or a substituent while substituent T which will be described below is applicable as the substituent.

At least one of $R^1$, $R^2$, $R^3$, $R^4$ and $R^5$ is an electron donating group, more preferably, one of $R^1$, $R^3$ and $R^5$ is an electron donating group, and, further more preferably, $R^3$ is an electron donatinging group.

An electron donating group means that σp value of Hammet is zero or less. The electron donating groups exhibiting σp value of zero or less described in Chem. Rev., 91, 165 (1991) are applicable and more preferable are those exhibiting σp value of −0.85-0. Examples of such electron donating group include: an alkyl group, an alkoxy group, an amino group and a hydroxyl group.

Preferable as an electron donating group are, for example, an alkyl group and an alkoxy group and more preferable is an alkoxy group (preferably having 1 to 12 carbon atoms, more preferably 1 to 8 carbon atoms, further more preferably 1 to 6 carbon atoms and specifically more preferably 1 to 4 carbon atoms).

As $R^1$, preferable is a hydrogen atom or an electron donating group; more preferable is an alkyl group, an alkoxy group, an amino group or a hydroxyl group; further more preferable is an alkyl group having 1 to 4 carbon atoms, an alkoxy group having 1 to 12 carbon atoms or a hydroxyl group; specifically more preferable is an alkoxy group (preferably having 1 to 12 carbon atoms, more preferably 1 to 8 carbon atoms, further more preferably 1 to 6 carbon atoms and specifically more preferably 1 to 4 carbon atoms); and most preferable is a methoxy group.

As $R^2$, preferable is a hydrogen atom, an alkyl group, an alkoxy group, an amino group or a hydroxyl group; more preferable is a hydrogen atom, an alkyl group or an alkoxy group, further more preferable is a hydrogen atom, an alkyl group (preferably having 1 to 4 carbon atoms and more preferably a methyl group) or an alkoxy group (preferably having 1 to 12 carbon atoms, more preferably 1 to 8 carbon atoms, further more preferably 1 to 6 carbon atoms, still more preferably 1 to 4 carbon atoms); specifically preferable is a hydrogen atom, a methyl group or a methoxy group; and most preferable is a hydrogen atom.

As $R^3$, preferable is a hydrogen atom or an electron donating group; more preferable is a hydrogen atom, an alkyl group, an alkoxy group, an amino group or a hydroxyl group; further more preferable is an alkyl group or an alkoxy group; specifically more preferable is an alkoxy group (preferably having 1 to 12 carbon atoms, more preferably 1 to 8 carbon atoms, further more preferably 1 to 6 carbon atoms, still more preferably 1 to 4 carbon atoms); and most preferable is an n-propoxy group, an ethoxy group or a methoxy group.

As $R^4$, preferable is a hydrogen atom or an electron donating group; more preferable is a hydrogen atom, an alkyl group, an alkoxy group, an amino group or a hydroxyl group; further more preferable is a hydrogen atom, an alkyl group having 1 to 4 carbon atoms or an alkoxy group having 1 to 12 carbon atoms (preferably having 1 to 8 carbon atoms, more preferably 1 to 6 carbon atoms, still more preferably 1 to 4 carbon atoms); specifically more preferable is a hydrogen atom, an alkyl group having 1 to 4 carbon atoms or an alkoxy group having 1 to 4 carbon atoms; most preferable is a hydrogen atom, a methyl group or a methoxy group.

As $R^5$, preferable is a hydrogen atom, an alkyl group, an alkoxy group, an amino group or a hydroxyl group; more preferable is a hydrogen atom, an alkyl group or an alkoxy group, further more preferable is a hydrogen atom, an alkyl group (preferably having 1 to 4 carbon atoms and more preferably a methyl group) or an alkoxy group (preferably having 1 to 12 carbon atoms, more preferably 1 to 8 carbon atoms, further more preferably 1 to 6 carbon atoms, still more preferably 1 to 4 carbon atoms); specifically preferable is a hydrogen atom, a methyl group or a methoxy group.

As each of $R^6$, $R^7$, $R^9$, and $R^{10}$, preferable is a hydrogen atom, an alkyl group having 1 to 12 carbon atoms, an alkoxy group having 1 to 12 carbon atoms or a halogen atom; more preferable is a hydrogen atom or a halogen atom; and further more preferable is a hydrogen atom.

$R^8$ represents a hydrogen atom, an alkyl group having 1 to 4 carbon atoms, an alkynyl group having 2 to 12 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group, a carbonyl group or a halogen atom, which may further have a substituent, if possible, and the substituent may be one of the substituent T which will be described below. Moreover, the substituent may further has a substituent.

As $R^8$, preferable is an alkyl group having 1 to 4 carbon atoms, an alkynyl group having 2 to 12 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group, more preferable is an alkynyl group having 2 to 7 carbon atoms, an aryl group of 6 to 12 carbon atoms, an alkoxycarbonyl group of 2 to 6 carbon atoms, an acylamino group having 2 to 7 carbon atoms or a cyano group, and specifically preferable is a phenyl ethynyl group, a phenyl group, a p-cyanophenyl group, a p-methoxyphenyl group, a benzoylamino group, a n-propoxy carbonyl group, an ethoxycarbonyl group, a methoxycarbonyl group or a cyano group.

Among compounds represented by Formula (3), preferable is a compound represented by Formula (3-A).

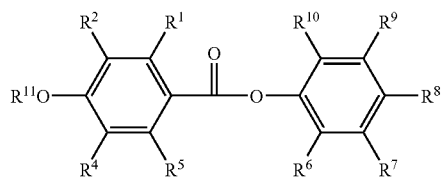

Formula (3-A)

In formula (3-A), $R^1$, $R^2$, $R^4$, $R^5$, $R^6$, $R^7$, $R^8$, $R^9$, and $R^{10}$ have the same meaning as those respectively, in Formula (3), and the preferable ranges thereof are also the same.

$R^{11}$ represents an alkyl group having 1 to 12 carbon atoms. The alkyl group represented by $R^{11}$ may be of a linear chain or a branched chain, and, also, may have a substituent. $R^{11}$ is preferably an alkyl group having 1 to 12 carbon atoms, more preferably an alkyl group having 1 to 8 carbon atoms, further more preferably an alkyl group having 1 to 6 carbon atoms, and specifically preferably an alkyl group having 1 to 4 carbon atoms (for example, a methyl group, an ethyl group, an n-propyl group, an iso-propyl group, an n-butyl group, an iso-butyl group and a tert-butyl group) thereof are also the same.

Among compounds represented by Formula (3), preferable is a compound represented by Formula (3-B).

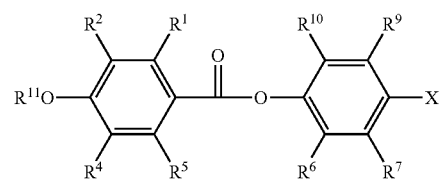

Formula (3-B)

In formula (3-B), $R^1$, $R^2$, $R^4$, $R^5$, $R^6$, $R^7$, $R^8$, $R^9$, and $R^{10}$ have the same meaning as those, respectively, in Formula (3), and the preferable ranges thereof are also the same.

$R^{11}$ has the same meaning as $R^{11}$ in Formula (3-A), and the preferable ranges thereof are also the same.

X represents an alkyl group having 1 to 4 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxy carbonyl group having 2 to 12 carbon atoms, an acylamino group having 2 to 12 carbon atoms, a cyano group, or a halogen atom.

In the case that all of $R^1$, $R^2$, $R^4$, $R^5$ are hydrogen atoms, X represents desirably an alkyl group, an alkynyl group, an aryl group, an alkoxy group, or an aryloxy group, more preferably, an aryl group, an alkoxy group, or an aryloxy group, still more preferably, an alkoxy group (preferably having 1 to 12 carbon atoms, more preferably having 1 to 8 carbon atoms, still more preferably having 1 to 6 carbon atoms, specifically preferably having 1 to 4 carbon atoms), specifically preferably a methoxy group, an ethoxy group, n-propoxy group, an iso-propoxy group, or a n-butoxy group.

In the case that at least one of $R^1$, $R^2$, $R^4$, $R^5$ is a substituent, X is desirably an alkynyl machine, an aryl group, an alkoxy carbonyl group or a cyano group, more preferably an aryl group (preferably having 6 to 12 carbon atoms), a cyano group, an alkoxy carbonyl group (preferably having 2 to 12 carbon atoms), still more preferably an aryl group (preferably an aryl group having 6 to 12 carbon atoms, more preferably a phenyl group, a p-cyano phenyl group, or p-methoxy phenyl group), an alkoxy carbonyl group (preferably having 2 to 12 carbon atoms, more preferably having 2 to 6 carbon atoms, still more preferably having 2 to 4 carbon atoms, still more preferably a methoxy carbonyl group, an ethoxy carbonyl group or a n-propoxy carbonyl group), a cyano group, specifically preferably a phenyl group, a methoxy carbonyl group, an ethoxy carbonyl group, a n-propoxy carbonyl group, or a cyano group.

Among compositions represented by Formula (3), more preferable compositions are compositions represented by the following Formula (3-C).

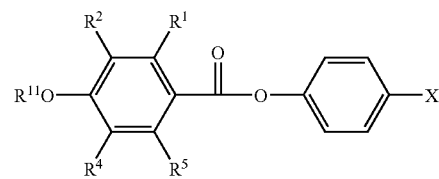

Formula (3-C)

In formula (3-C), $R^1$, $R^2$, $R^4$, $R^5$, $R^{11}$, and X have the same meaning as those, respectively, in Formula (3-B), and the preferable ranges thereof are also the same.

Among compositions represented by Formula (3), more preferable compositions are compositions represented by the following Formula (3-D).

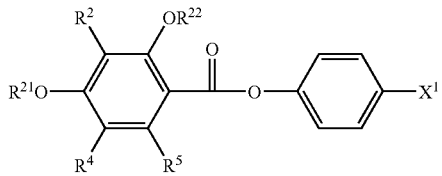

Formula (3-D)

In formula (3-D), $R^2$, $R^4$, and $R^5$ have the same meaning as those, respectively, in Formula (3-C), and the preferable ranges thereof are also the same. $R^{21}$, $R^{22}$ represents independently an alkyl group having 1 to 4 carbon atoms. $X^1$ represents an aryl group having 6 to 12 carbon atoms, an alkoxy carbonyl group having 2 to 12 carbon atoms, or a cyano group.

$R^{21}$ represents an alkyl group having 1 to 4 carbon atoms, preferably an alkyl group having 1 to 3 carbon atoms, more preferably an ethyl group or a methyl group.

$R^{22}$ represents an alkyl group having 1 to 4 carbon atoms, preferably an alkyl group having 1 to 3 carbon atoms, more preferably an ethyl group or a methyl group, still more preferably a methyl group.

$X^1$ represents an aryl group having 6 to 12 carbon atoms, an alkoxy carbonyl group having 2 to 12 carbon atoms, or a cyano group, preferably an aryl group having 6 to 10 carbon atoms, an alkoxy carbonyl group having 2 to 6 carbon atoms, or a cyano group, more preferably a phenyl group, a p-cyano phenyl group, a p-methoxy phenyl group, a methoxy carbonyl, an ethoxy carbonyl group, a n-propoxy carbonyl group, or a cyano group, still more preferably a phenyl group, a methoxy carbonyl group, an ethoxy carbonyl group, a n-propoxy carbonyl group, or a cyano group.

Among compositions represented by Formula (3), more preferable compositions are compositions represented by the following Formula (3-E).

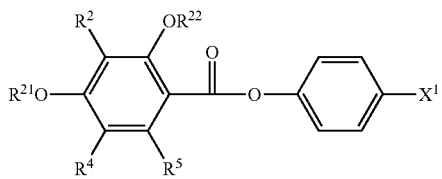

Formula (3-E)

In formula (3-E), $R^2$, $R^4$, and $R^5$ have the same meaning as those, respectively, in Formula (3-D), and the preferable ranges thereof are also the same. However, at least one of them represents a group represented by —$OR^{13}$. Here, $R^{13}$ represents an alkyl group having 1 to 4 carbon atoms. $R^{21}$, $R^{22}$, and X have the same meaning as those, respectively, in Formula (3-D), and the preferable ranges thereof are also the same.

Preferably, at least one of $R^4$ and $R^5$ represents a group represented by —$OR^{13}$, more preferably, $R^4$ represents a group represented by —$OR^{13}$.

$R^{13}$ represents an alkyl group having 1 to 4 carbon atoms, preferably an alkyl group having 1 to 3 carbon atoms, more preferably an ethyl group or a methyl group, still more preferably a methyl group.

The above-mentioned substituent T will now be described.

Examples of substituent T include: an alkyl group (preferably having 1 to 20 carbon atoms, more preferably having 1 to 12 carbon atoms, further more preferably having 1 to 8 carbon atoms, and examples of an alkyl group include: a methyl group, an ethyl group, an iso-propyl group, a tert-butyl group, an n-octyl group, an n-decyl group, an n-hexadecyl-group, a cyclopropyl group, a cyclopentyl group and a cyclohexyl group); an alkenyl group (preferably having 2 to 20 carbon atoms, more preferably having 2 to 12 carbon atoms, further more preferably having 2 to 8 carbon atoms, and examples of an alkenyl group include: a vinyl group, an allyl group, a 2-butenyl group and a 3-pentenyl group); an alkynyl group (preferably having 2 to 20 carbon atoms, more preferably 2 to 12 carbon atoms, further more preferably having 2 to 8 carbon atoms, and examples of an alkynyl group include: a propargyl group and a 3-pentinyl group); an aryl group (preferably having 6 to 30 carbon atoms, more preferably having 6 to 20 carbon atoms, further more preferably having 6 to 12 carbon atoms, and examples of an aryl group include: a phenyl group, a p-methylphenyl group and a naphthyl group); a substituted or non-substituted amino group (preferably having 0 to 20 carbon atoms, more preferably having 0 to 10 carbon atoms, further more preferably having 0 to 6 carbon atoms, and examples of an amino group include: an amino group, a methylamino group, a dimethylamino group, a diethylamino group and a dibenzylamino group); an alkoxy group (preferably having 1 to 20 carbon atoms, more preferably having 1 to 12 carbon atoms, further more preferably having 1 to 8 carbon atoms, and examples of an alkoxy group include: a methoxy group, an ethoxy group and a butoxy group); an aryloxy group (preferably having 6 to 20 carbon atoms, more preferably having 6 to 16 carbon atoms, further more preferably having 6 to 12 carbon atoms, and examples of an aryloxy group include: a phenyloxy group and a 2-naphthyloxy group); an acyl group (preferably having 1 to 20 carbon atoms, more preferably having 1 to 16 carbon atoms, further more preferably having 1 to 12 carbon atoms, and examples of an acyl group include: an acetyl group, a benzoyl group, a formyl group and a pivaloyl group); an alkoxycarbonyl group (preferably having 2 to 20 carbon atoms, more preferably having 2 to 16 carbon atoms, further more preferably having 2 to 12 carbon atoms, and examples of an alkoxycarbonyl group include: a methoxycarbonyl group and an ethoxycarbonyl group); an aryloxycarbonyl group (preferably having 7 to 20 carbon atoms, more preferably having 7 to 16 carbon atoms, further more preferably having 7 to 10 carbon atoms, and examples of an aryloxycarbonyl group include: a phenyloxycarbonyl group); an acyloxy group (preferably having 2 to 20 carbon atoms, more preferably having 2 to 16 carbon atoms, further more preferably having 2 to 10 carbon atoms, and examples of an acyloxy group include: an acetoxy group and a benzoyloxy group); an acylamino group (preferably having 2 to 20 carbon atoms, more preferably having 2 to 16 carbon atoms, further more preferably having 2 to 10 carbon atoms, and examples of an acylamino group include: an acetylamino group and a benzoylamino group); an alkoxycarbonylamino group (preferably having 2 to 20 carbon atoms, more preferably having 2 to 16 carbon atoms, further more preferably having 2 to 12 carbon atoms, and examples of an alkoxycarbonylamino group include: a methoxycarbonylamino group); an aryloxycarbonylamino group (preferably having 7 to 20 carbon atoms, more preferably having 7 to 16 carbon atoms, further more preferably having 7, to 12 carbon atoms, and examples of an aryloxycarbonylamino group include: a phenyloxycarbonylamino group); a sulfonylamino group (preferably having 1 to 20 carbon atoms, more preferably having 1 to 16 carbon atoms, further more preferably having 1 to 12 carbon atoms, and examples of a sulfonylamino group include: a methanesulfonylamino group and abenzenesulfonylamino group); a sulfamoyl group (preferably having 0 to 20 carbon atoms, more preferably having 0 to 16 carbon atoms, further more preferably having 0 to 12 carbon atoms, and examples of a sulfamoyl group include: a sulfamoyl group, a methylsulfamoyl group, a dimethylsulfamoyl group and a phenylsulfamoyl group); a carbamoyl group (preferably having 1 to 20 carbon atoms, more preferably having 1 to 16 carbon atoms, further more preferably having 1 to 12 carbon atoms, and examples of a carbamoyl group include: a carbamoyl group, a methylcarbamoyl group, a diethylcarbamoyl group and a phenylcarbamoyl group); an alkylthio group (preferably having 1 to 20 carbon atoms, more preferably having 1 to 16 carbon atoms, further more preferably having 1 to 12 carbon atoms, and examples of an alkylthio group include: a methylthio group and an ethylthio group); an arylthio group (preferably having 6 to 20 carbon atoms, more preferably having 6 to 16 carbon atoms, further more preferably having 6 to 12 carbon atoms, and examples of an arylthio group include: a phenylthio group); a sulfonyl group (preferably having 1 to 20 carbon atoms, more preferably having 1 to 16 carbon atoms, further more preferably having 1 to 12 carbon atoms, and examples of an sulfonyl group include: a mesyl group and a tosyl group); a sulfinyl group (preferably having 1 to 20 carbon atoms, more preferably having 1 to 16 carbon atoms, further more preferably having 1 to 12 carbon atoms, examples of a sulfinyl group include: a methane sulfinyl group and a benzene sulfinyl group); an ureido group (preferably having 1 to 20 carbon atoms, more preferably having 1 to 16 carbon atoms, further more preferably having 1 to 12 carbon atoms, examples of an ureido group include: an ureido group, a methylureido group and a phenylureido group); a phosphoric acid amido group (preferably having 1 to 20 carbon atoms, more preferably having 1 to 16 carbon atoms, further more preferably having 1 to 12 carbon atoms, examples of a phosphoric acid amido group include: a diethyl phosphoric acid amido group and a phenyl phosphoric acid amide); a hydroxy group; a mercapto group; a halogen atom (for example, a fluorine atom, a chlorine atom, a bromine atom and an iodine atom); a cyano group; a sulfo group; a carboxyl group; a nitro group; a hydroxamic acid group; a sulfino group; a hydrazino group; an imino group; a heterocycle group (preferably having 1 to 30 carbon atoms, more preferably having 1 to 12 carbon atoms, examples of a hetero atom include: a nitrogen atom, an oxygen atom and a sulfur atom, and concrete examples include: an imidazolyl group, a pyridyl group, a quinolyl group, a furyl group, a piperidyl group, a morpholino group, a benzooxazolyl group, a benzimidazol group and a group benzthiazolyl); and a silyl group (preferably having 3 to 40 carbon atoms, more preferably having 3 to 30 carbon atoms and specifically preferably 3-24, and examples of a silyl group include: a trimethylsilyl group, a triphenylsilyl group). These substituents may further be substituted.

Two or more substituents, if any, may be the same or different from each other. Further, they may form a ring through mutual bondage wherever possible.

The following describes the specific examples of the compounds represented by Formula (3), however, the present invention is not limited thereto.

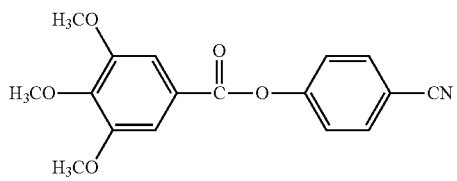

A-1

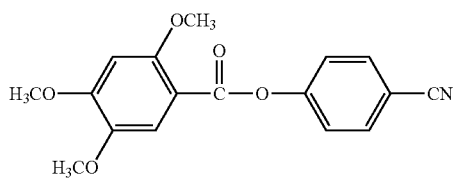

A-2

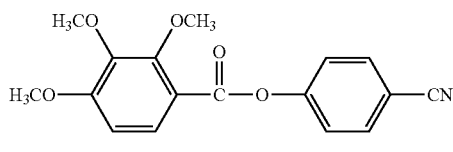

A-3

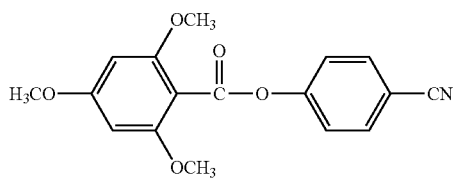

A-4

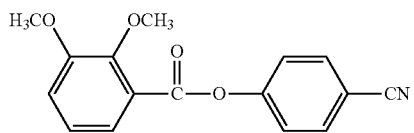

A-5

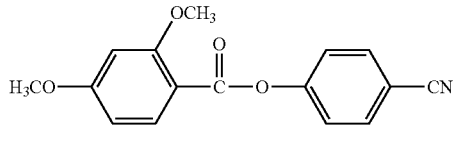

A-6

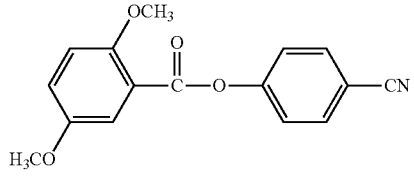

A-7

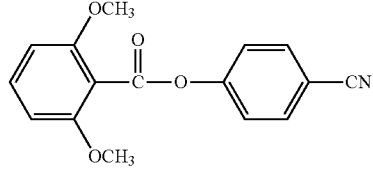

A-8

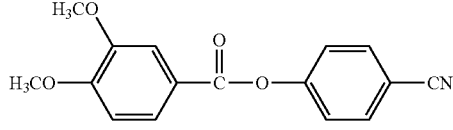

A-9

A-10
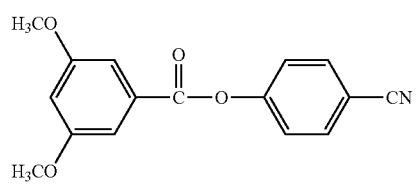
A-11
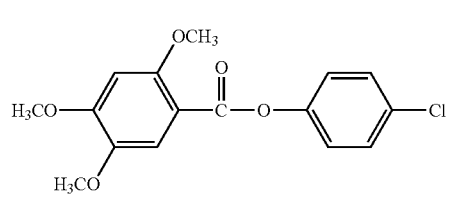
A-12
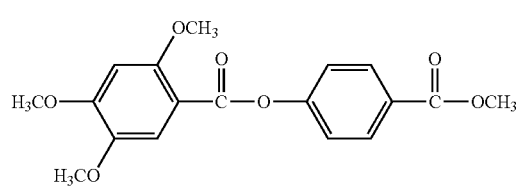
A-13
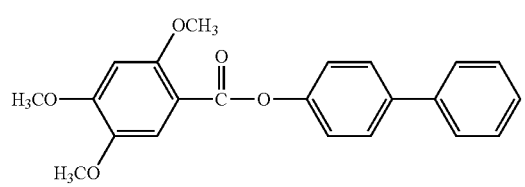
A-14
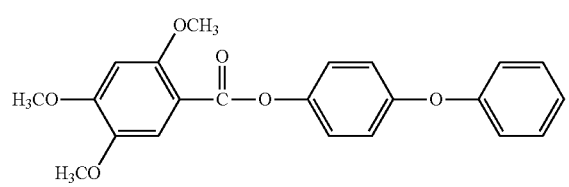
A-15
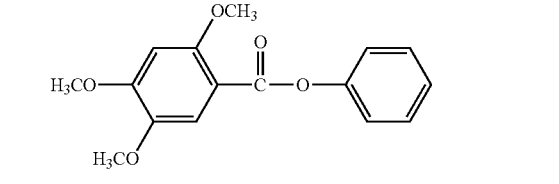
A-16
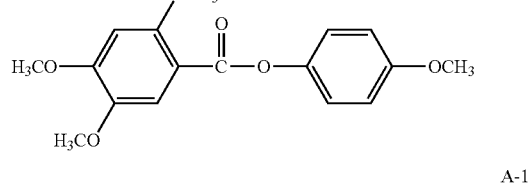
A-17
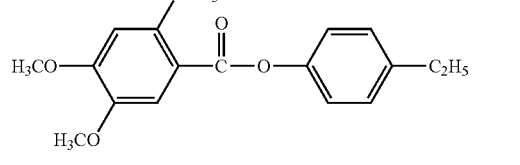
A-18
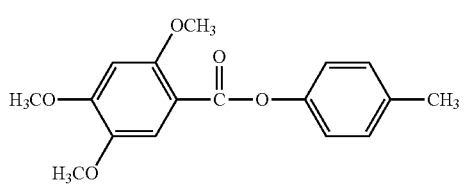
A-19
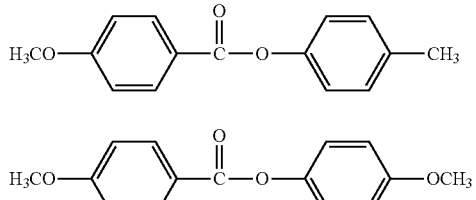
A-20
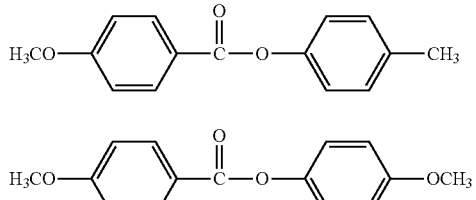
A-21
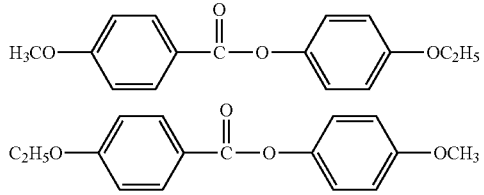
A-14
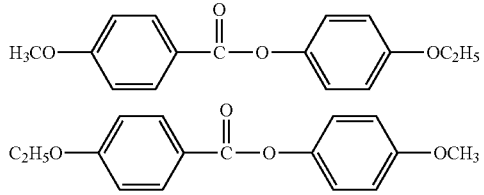
A-15
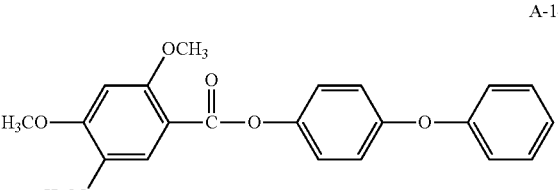
A-16
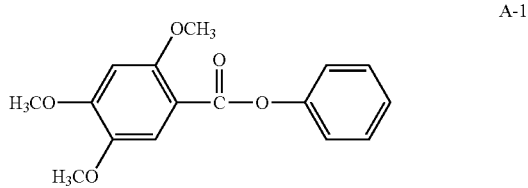
A-17
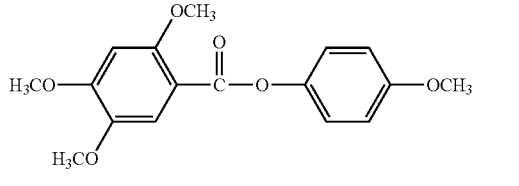
A-18
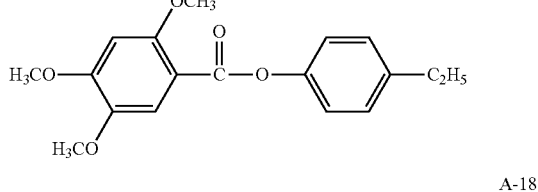

-continued
A-19
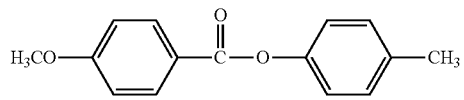
A-20
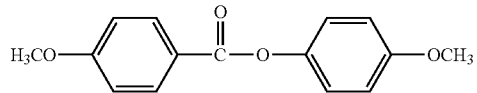
A-21
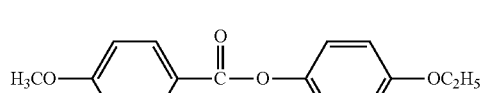
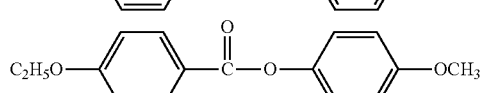
A-22
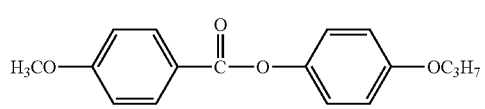
A-23
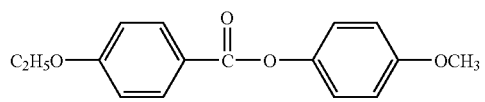
A-24
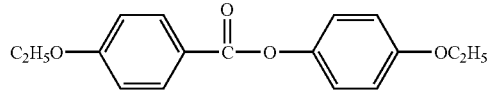
A-25
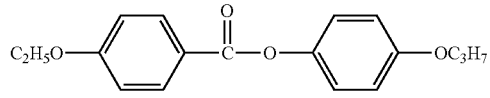
A-26
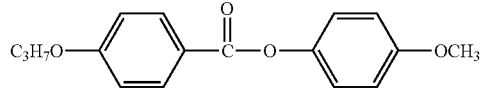
A-27
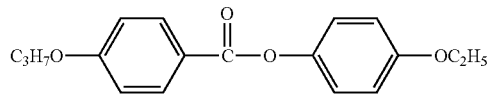
A-28
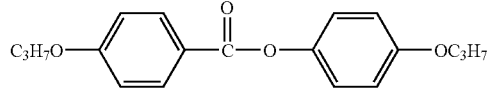
A-29
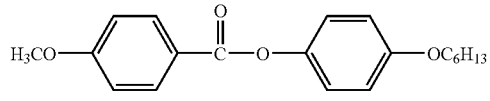
A-30
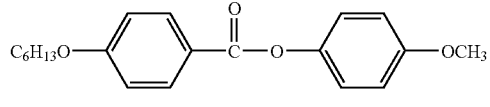
-continued
A-31
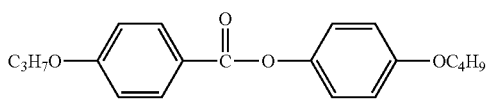
A-32
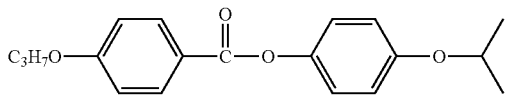
A-33
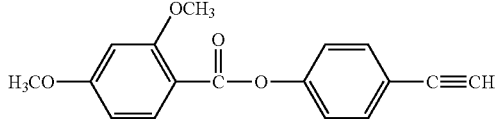
A-34
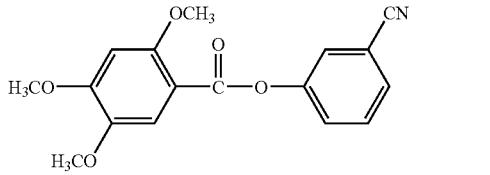
A-35
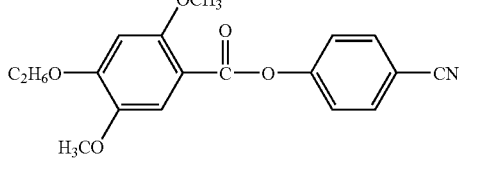
A-36
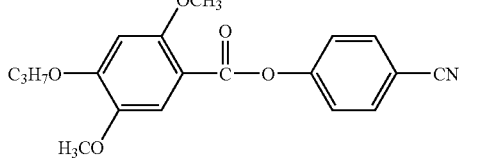
A-37
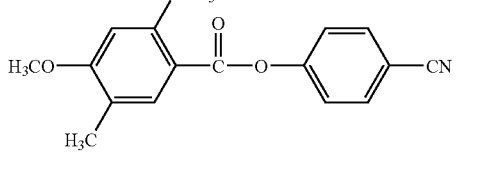
A-38
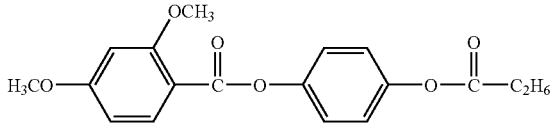
A-39
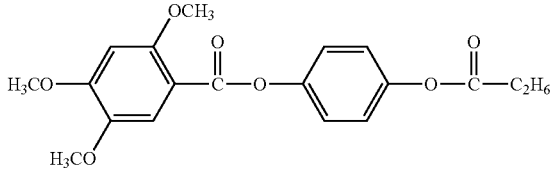

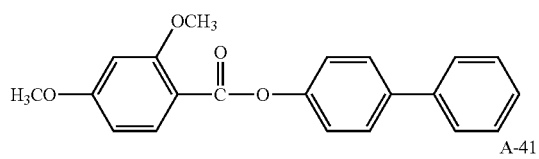
A-40

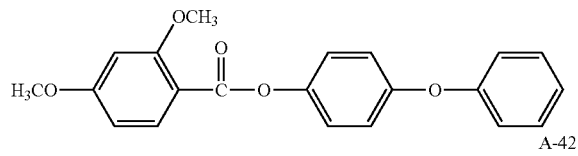
A-41

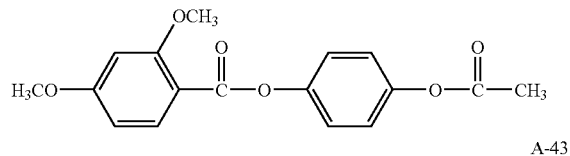
A-42

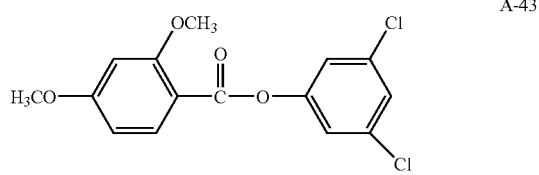
A-43

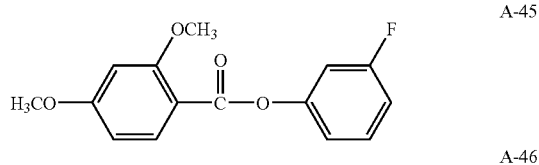
A-45

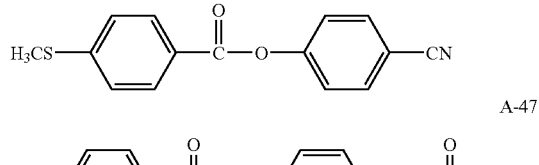
A-46

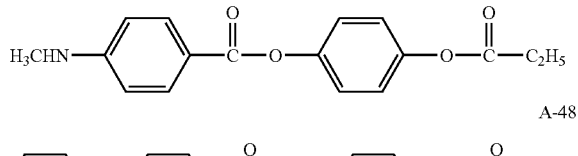
A-47

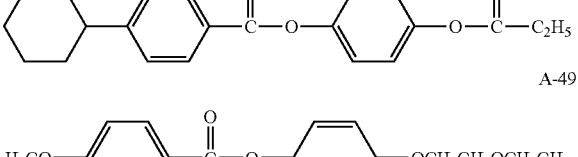
A-48

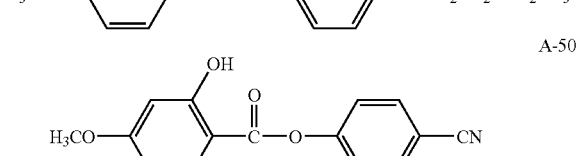
A-49

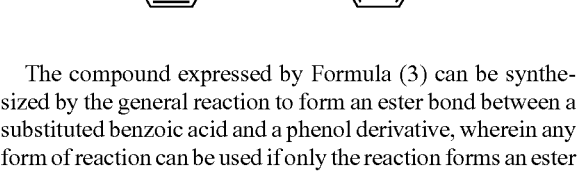
A-50

The compound expressed by Formula (3) can be synthesized by the general reaction to form an ester bond between a substituted benzoic acid and a phenol derivative, wherein any form of reaction can be used if only the reaction forms an ester bond. For example, it is possible to use the method for condensation with phenol subsequent to functional conversion of the substituted benzoic acid into an acid halide. Further, it is also possible to use the method for dehydration and condensation of the substituted benzoic acid and phenol derivative utilizaing a condensing agent or catalyst.

When the manufacturing process is taken into account, it is preferred to use the method for condensation with phenol subsequent to functional conversion of the substituted benzoic acid into an acid halide.

A hydrocarbon based solvent (preferably toluene and xylene), ether based solvent (preferably dimethyl ether, tetrahydrofuran, dioxane), ketone based solvent, ester based solvent, acetonitryl, dimethylformamide, and dimethyl acetoamide can be used as a reaction solvent. These solvents can be used independently or as a mixture. The preferable reaction solvents include toluene, acetonitryl, dimethylformamide and dimethylacetoamide.

The reaction temperature is preferably 0° C. through 150° C., more preferably 0° C. through 100° C., still more preferably 0° C. through 90° C., and particularly 20° C. through 90° C.

It is preferred in this reaction that a base is not used. However, when a base is used, either an organic or inorganic base can be employed. Of these, the organic base is preferably used, and is exemplified by pyridine and tertiary alkylamine (preferably triethylamine and ethyl diisopropylamine).

Incidentally, it may be preferable to contain the phenyl benzoate ester compound in an amount of from 0.1 to 15 parts by weight based on 100 parts by weight of the cellulose ester.

<<Antioxidant>>

Since decomposition of cellulose ester is accelerated not only by heat but also by oxygen, it is preferable to incorporate an antioxidant as a stabilizer in a polarizing plate protective film of the present invention.

Specifically, under a high temperature environment such as in a melt casting process, decomposition of the material for forming a cellulose ester film is accelerated by heat and oxygen, accordingly, an antioxidant is preferably incorporated in the film forming material.

As a useful antioxidant in the present invention, a compound which restrains deterioration of the material for forming a cellulose ester film due to oxygen can be utilized without limitation, however, examples of a useful compound include: phenol, hindered amine, a phosphorus-containing compound, a sulfur-containing compound, a heat resistant processing stabilizer and an oxygen scavenger. Specifically preferable among them are phenol, hindered amine and a phosphorus-containing compound. By blending such a compound, it is possible to prevent coloration and strength decrease of a cellulose ester film while keeping the transparency or heat resistance of the film. These antioxidants each can be utilized alone or in combination of at least two types.

<<Phenol Type Compound>>

A phenol type compound is a compound well known in the art and is described, for example, in columns 12-14 of U.S. Pat. No. 4,839,405 including 2,6-dialkylphenol-derivative compounds. Among these compounds, examples of a preferable compound include those represented by Formula (A).

Formula (A)

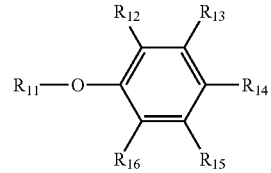

In Formula (A), $R_{11}$-$R_{16}$ each represent a substituent. Examples of the substituent include: a hydrogen atom, a halogen atom (for example, a fluorine atom and a chlorine atom), an alkyl group (for example, a methyl group, an ethyl group, an isopropyl group, a hydroxyethyl group, a methoxy methyl group, a trifluoro methyl group and a t-butyl group), a cycloalkyl group (for example, a cyclopentyl group and a cyclohexyl group), an aralkyl group (for example, a benzyl group and a 2-phenethyl group), an aryl group (for example, a phenyl group, a naphthyl group, p-tolyl group and a p-chlorophenyl group), an alkoxy group (for example, a methoxy group, an ethoxy group, an isopropoxy group and a butoxy group), an aryloxy groups (for example, a phenoxy group), a cyano group, an acylamino group (for example, an acetylamino group and a propionylamino group), an alkylthio group (for example, a methylthio group, an ethylthio group and a butylthio group), an arylthio group (for example, a phenylthio group), a sulfonylamino group (for example, a methanesulfonylamino group and a benzene sulfonyl amino group), an ureido group (for example, a 3-methylureido group, a 3,3-dimethylureido group and a 1,3-dimethylureido group), a sulfamoylamino group (for example, a dimethylsulfamoyl amino group), a carbamoyl group (for example, a methylcarbamoyl group, an ethylcarbamoyl group and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group, (for example, a phenoxycarbonyl group), a sulfonyl group (for example, a methanesulfonyl group, a butane sulfonyl group and a phenylsulfonyl group), an acyl group (for example, an acetyl group, a propanoyl group and a butyroyl group), an amino group (for example, a methylamino group, an ethylamino group and a dimethylamino group), a cyano group, a hydroxy group, a nitro group, a nitroso group, an amineoxide group (for example, a pyridine oxide group), an imide group (for example, a phthalimide group), disulfide group (for example, a benzene disulfide group and a benzothiazolyl-2-disulfide group), a carboxyl group, a sulfo group and a heterocycle group (for example, a pyrrole group, a pyrrolidyl group, a pyrazolyl group, an imidazolyl group, a pyridyl group, a benzimidazolyl group, a benzthiazolyl group and a benzoxazolyl group). These substituents may be further substituted.

Further, $R_{11}$ is preferably a hydrogen atom, and R12 and R16 each are preferably a t-butyl group which is a phenol compound. Examples of the phenol compound include: n-octadecyl-3-(3,5-di-t-butyl-4-hydroxyphenyl)propionate, n-octadecyl-3-(3,5-di-t-butyl-4-hydroxyphenyl)acetate, n-octadecyl-3,5-di-t-butyl-4-hydroxybenzoate, n-hexyl-3,5-di-t-butyl-4-hydroxyphenylbenzoate, n-dodecyl-3,5-di-t-butyl-4-hydroxyphenylbenzoate, neo-dodecyl-3-(3,5-di-t-butyl-4-hydroxyphenyl)propionate, dodecyl-β-(3,5-di-t-butyl-4-hydroxyphenyl)propionate, ethyl-α-(4-hydroxy-3,5-di-t-butylphenyl)isobutyrate, octadecyl-α-(4-hydroxy-3,5-di-t-butylphenyl)isobutyrate, octadecyl-α-(4-hydroxy-3,5-di-t-butyl-4-hydroxyphenyl)propionate, 2-(n-octylthio)ethyl-3,5-di-t-butyl-4-hydroxy-benzoate, 2-(n-octylthio)ethyl-3,5-di-t-butyl-4-hydroxyphenylacetate, 2-(n-octadecylthio) ethyl-3,5-di-t-butyl-4-hydroxyphenylacetate, 2-(n-octadecylthio)ethyl-3,5-di-t-butyl-4-hydroxybenzoate, 2-(2-hydroxyethylthio)-ethyl-3,5-di-t-butyl-4-hydroxybenzoate, diethylglycol-bis-(3,5-di-t-butyl-4-hydroxyphenyl)propionate, 2-(n-octadecylthio)ethyl-3,5-di-t-butyl-4-hydroxyphenyl)-propionate, stearamide-N,N-bis-[ethylene-3-(3,5-di-t-butyl-4-hydroxyphenyl)propionate], N-butylimino-N, N-bis-[ethylene-3-(3,5-di-t-butyl-4-hydroxyphenyl) propionate], 2-(2-stearoyloxyethylthio)ethyl-3,5-di-t-butyl-4-hydroxybenzoate, 2-(2-stearoyloxyethylthio)ethyl-7-(3-methyl-5-t-butyl-4-hydroxyphenyl)heptanoate, 1,2-propyleneglycol-bis-[3-(3,5-di-t-butyl-4-hydroxyphenyl) propionate], ethyleneglycol-bis-[3-(3,5-di-t-butyl-4-hydroxyphenyl)propionate], neopentylglycol-bis-[3-(3,5-di-t-butyl-4-hydroxyphenyl)propionate], ethyleneglycol-bis-(3, 5-di-t-butyl-4-hydroxyphenylacetate), glycerol-1-n-octadecanoate-2,3-bis-(3,5-di-t-butyl-4-hydroxyphenylacetate), pentaerythritoltetrakis[3-(3',5'-di-t-butyl-4'-hydroxyphenyl)propionate], 1,1,1-trimethylolethane-tris-[3-(3,5-di-t-butyl-4-hydroxyphenyl) propionate], sorbitol-hexa-[3-(3,5-di-t-butyl-4-hydroxyphenyl)propionate], 2-hydroxyethyl-7-(3-methyl-5-t-butyl-4-hydroxyphenyl)propionate, 2-stearoyloxyethyl-7-(3-methyl-5-t-butyl-4-hydroxyphenyl)heptanoate, 1,6-n-hexanediol-bis-[(3',5'-di-butyl-4-hydroxyphenyl)propionate] and pentaerythritoltetrakis(3,5-di-t-butyl-4-hydroxyhydrocinnamate). Above phenol compounds have been commercialized, for example, as "Irganox1076" and "Irganox1010" from Ciba Specialty Chemicals, Inc.

Incidentally, it may be preferable to contain the phenol type compound in an amount of from 0.2 to 2.0 parts by weight based on 100 parts by weight of the cellulose ester.

(Phosphorus-Containing Compound)

A compound having a substructure represented by Formula (B-1), (B-2), (B-3), (B-4) or (B-5) is preferably used as one of the preferable antioxidants in the present invention.

Formula (B-1)

In Formula (B-1), $Ph_1$ and $Ph'_1$ each represent a substituent. As a substituent, it means the same as the substituents represented by $R_{11}$-$R_{15}$ in Formula (E). More preferably, $Ph_1$ and $Ph'^1$ each represent a phenylene group, and the hydrogen atom of the phenylene group may be replaced with a phenyl group, an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_1$ and $Ph'_1$ may be mutually the same, or may be different. X represents a single bond, a sulfur atom, or a —CHR6-group. R6 represents a hydrogen atom, an alkyl group having 1 to 8 carbon atoms, or a cycloalkyl group having 5 to 8 carbon atoms. Further, these groups may be substituted with one of the substituents which are common to the substituents $R_{11}$-$R_{15}$ described in Formula (A).

Formula (B-2)

$Ph_2$ and $Ph'_2$ each represent one of the substituents which are common to the substituents $R_{11}$-$R_{15}$ described in Formula (A). $Ph_2$ and $Ph'_2$ may be mutually the same or may be different, and $Ph_2$ and $Ph'_2$ may further be substituted with one of the substituents which are common to the substituents $R_{11}$-$R_{15}$ described in Formula (A).

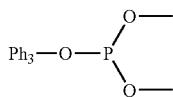

Formula (B-3)

Ph₃ represents one of the substituents which are common to the substituents $R_{11}$-$R_{15}$ described in Formula (A). More preferably, Ph₃ represents a phenyl group or a biphenyl group. The hydrogen atom of the phenyl group or the biphenyl group may be replaced with an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. Ph₃ may further be substituted with one of the substituents which are common to the substituents $R_{11}$-$R_{16}$ described in Formula (E).

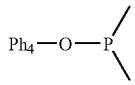

Formula (B-4)

Ph₄ represents one of the substituents which are common to the substituents $R_{11}$-$R_{15}$ described in Formula (A). More preferably, Ph₄ represents an alkyl group or a phenyl group each having 1 to 20 carbon atoms. The alkyl group or the phenyl group may further be substituted with one of the substituents which are common to the substituents $R_{11}$-$R_{15}$ described in Formula (A).

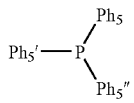

Formula (B-5)

Ph₅, Ph'₅, and Ph"₅ each represent a substituent. Example of the substiture are common to the substituents $R_{11}$-$R_{15}$ described in Formula (A). More preferably, Ph₅, Ph'₅, and Ph'₅ each represent an alkyl group or a phenyl group each having 1 to 20 carbon atoms. The alkyl group or the phenyl group may further be substituted with one of the substituents which are common to the substituents $R_{11}$-$R_{15}$ described in Formula (A).

Specific examples of a phosphorus-containing compound include: mono-phosphite compounds such as triphenyl phosphate,diphenylisodecyl phosphate,phenyldiisodecyl phosphate,tris(nonylphenyl)phosphate,tris(dinonylphenyl) phosphate,tris(2,4-di-t-butylphenyl)phosphite,10-(3,5-di-t-butyl-4-hydroxybenzyl)-9,10-dihydro-9-oxa-10-phosphaphenanthrene-10-oxide, 6-[3-(3-t-butyl-4-hydroxy-5-methylphenyl)propoxy]-2,4,8,10-tetra-t-butyldibenz[d,f][1.3.2]dioxaphosphepin and tridecyl phosphite; diphosphite compounds such as 4,4'-butylidene-bis(3-methyl-6-t-butylphenyl-di-tridecyl phosphite) and 4,4'-isopropylidene-bis(phenyl-di-alkyl (C12-C15)phosphite); phosphonite compounds such as triphenyl phosphonite, tetrakis(2,4-di-tert-butylphenyl)[1,1-biphenyl]-4,4'-diylbisphosphonite and tetrakis(2,4-di-tert-butyl-5-methylphenyl)[1,1-biphenyl]-4,4'-diylbisphosphonite; phosphinite compounds such as triphenyl phosphinite and 2,6-dimethylphenyldiphenyl phosphinite; and phosphine compounds such as triphenyl phosphine and tris(2,6-dimethoxyphenyl) phosphine. Specifically preferable are phosphonite compounds. Examples of above-mentioned commercially available phosphorus-containing compounds include: "Sumilizer GP" from Sumitomo Chemical Co., Ltd.; "ADK STAB PEP-24", "ADK STAB PEP-36" and "ADK STAB 3010" from ADEKA Corp.; "IRGAFOS P-EPQ" from Ciba Specialty Chemicals, Inc.; and GSY-P101 from SAKAI CHEMICAL INDUSTRY CO., LTD.

Also, the following compounds are cited.

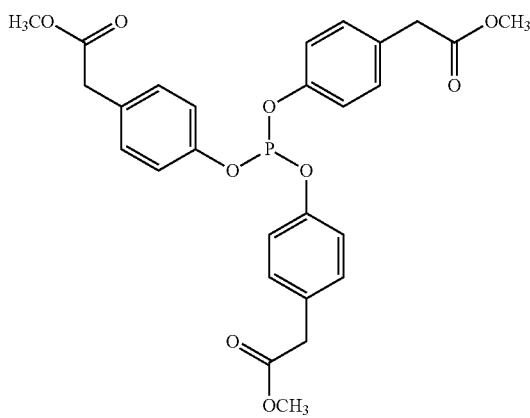

P1

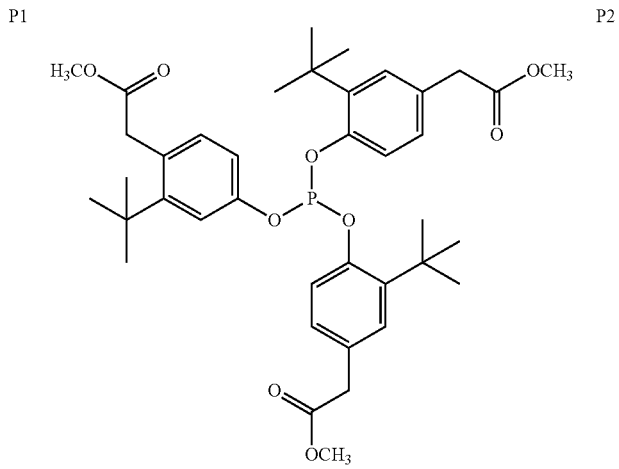

P2

-continued
P3
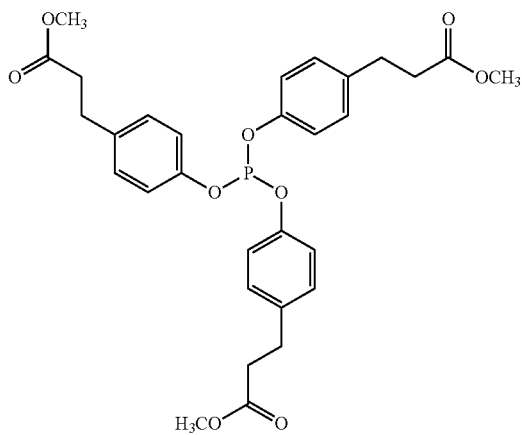
P4
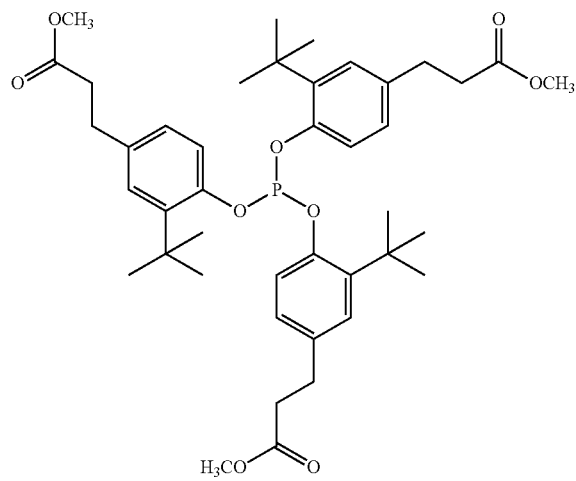
P5
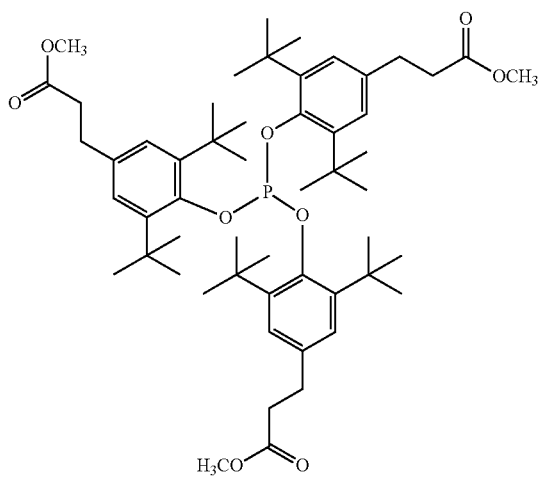
P6
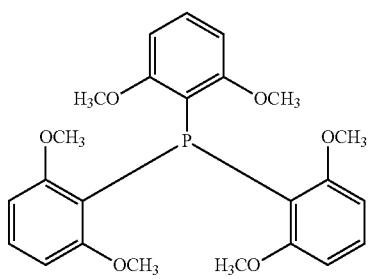
P7
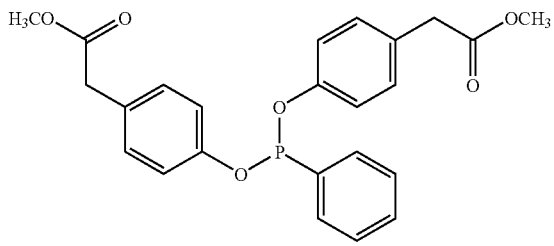
P8
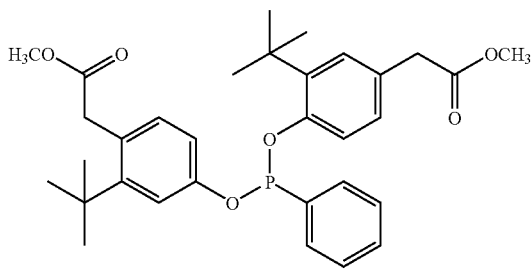
P9
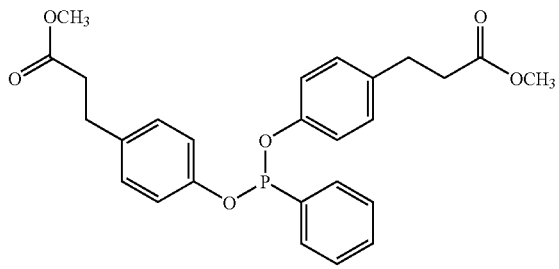
P10
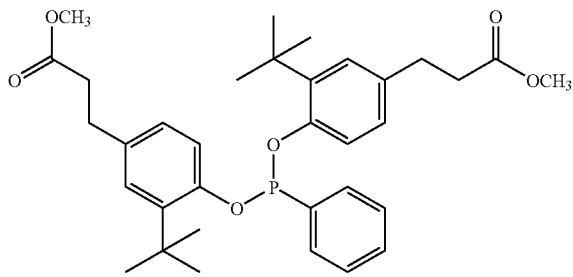

-continued
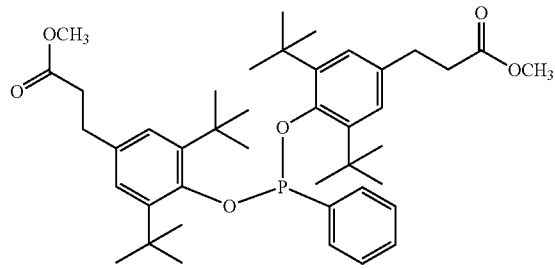 P11
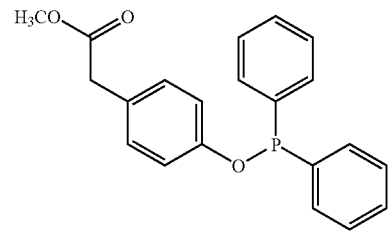 P12
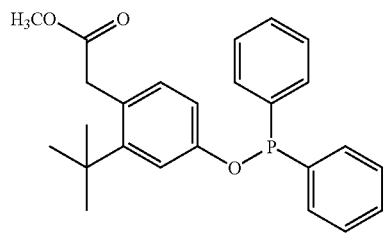 P13
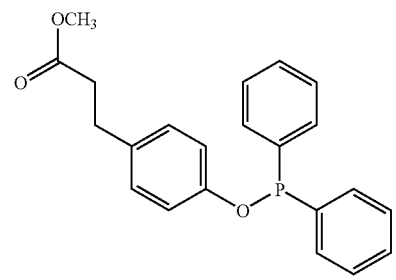 P14
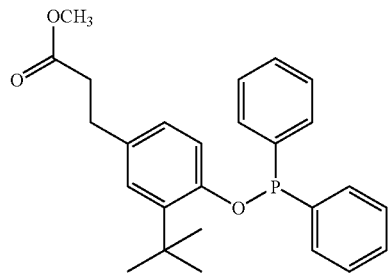 P15
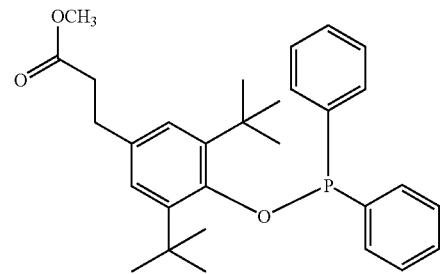 P16
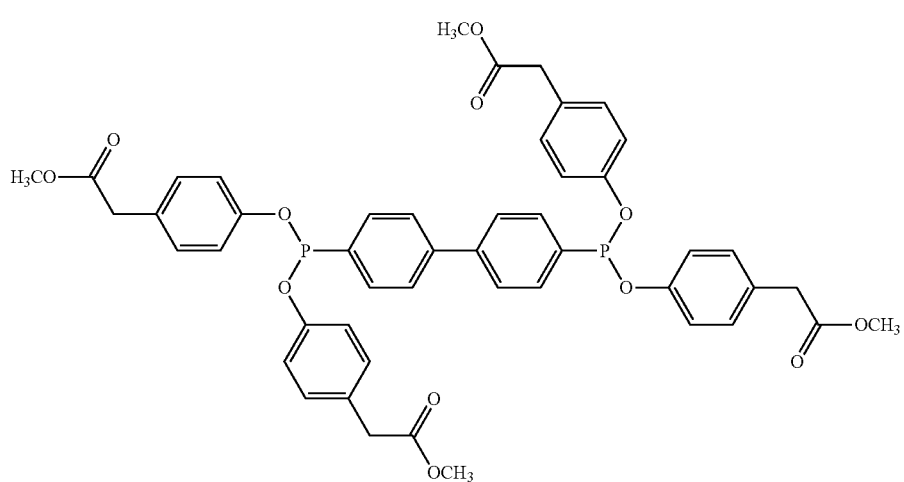 P17

P18
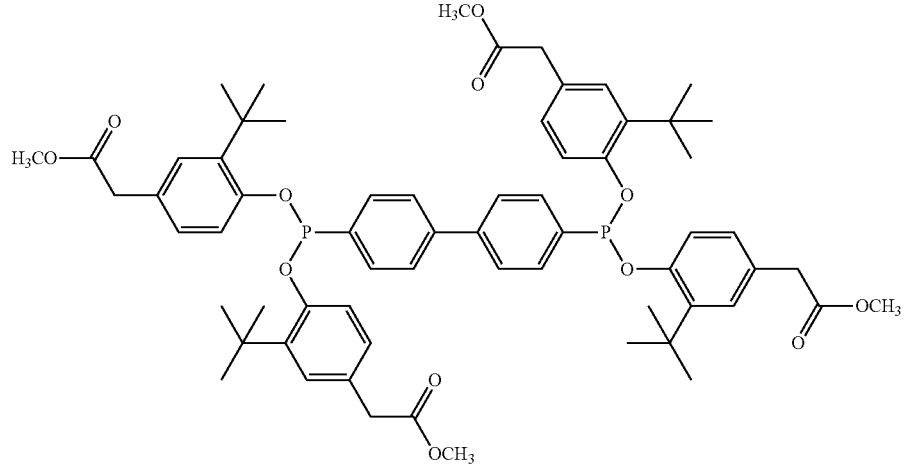
P19
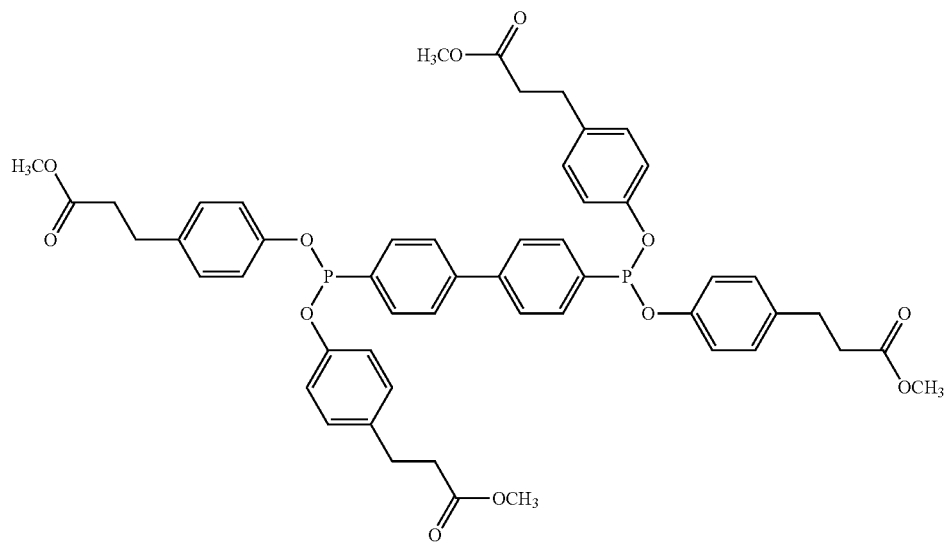
P20
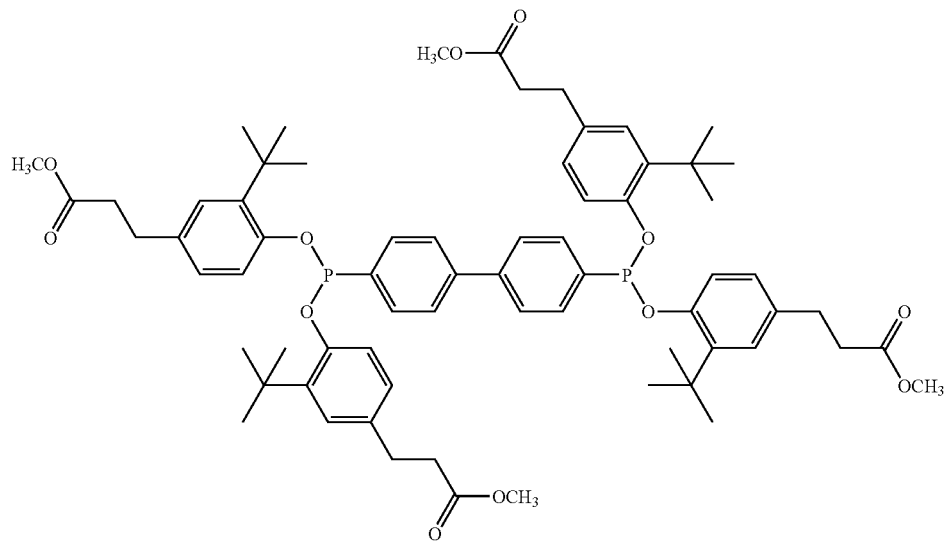

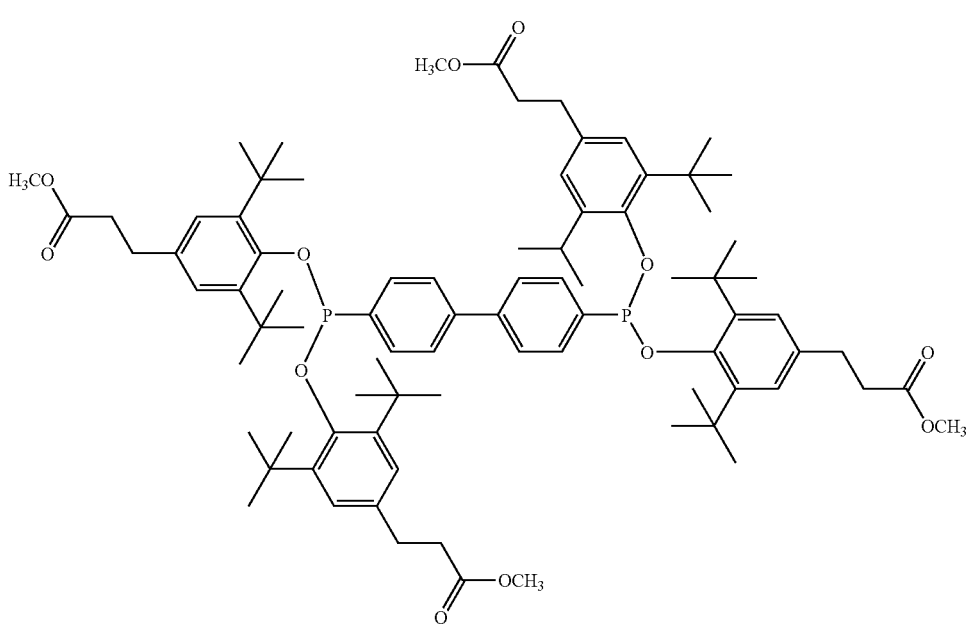

P21

Incidentally, it may be preferable to contain the phosphorous-containing compound in an amount of from 0.1 to 1.0 parts by weight based on 100 parts by weight of the cellulose ester.

<<Hindered Amine Compound>>

In the present invention, a hindered amine compound represented by Formula (C) is preferably used as one of the useful antioxidants.

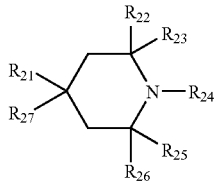

Formula (C)

In Formula (C), $R_{21}$-$R_{27}$ each represent a substituent. Examples of the substituent are common to the substituents $R_{11}$-$R_{16}$ described for Formula (A). $R_{24}$ is preferably a hydrogen atom or a methyl group, $R_{27}$ is preferably a hydrogen atom and $R_{22}$, $R_{23}$, $R_{25}$ and $R_{26}$ each are preferably a methyl group.

Examples of a hindered amine compound include: bis(2,2,6,6-tetramethyl-4-piperidyl)sebacate,bis(2,2,6,6-tetramethyl-4-piperidyl)succinate,bis(1,2,2,6,6-pentamethyl-4-piperidyl)sebacate,bis(N-octoxy-2,2,6,6-tetramethyl-4-piperidyl)sebacate, bis(N-benzyloxy2,2,6,6-tetramethyl-4-piperidyl)sebacate, bis(N-cyclohexyloxy-2,2,6,6-tetramethyl-4-piperidyl)sebacate,bis(1,2,2,6,6-pentamethyl-4-piperidyl)-2-(3,5-di-t-butyl-4-hydroxybenzyl)-2-butylmalonate,bis(1-acroyl-2,2,6,6-tetramethyl-4-piperidyl)-2,2-bis(3,5-di-t-butyl-4-hydroxybenzyl)-2-butylmalonate,bis(1,2,2,6,6-pentamethyl-4-piperidyl) decanedioate,2,2,6,6-tetramethyl-4-piperidylmethacrylate, 4-[3-(3,5-di-t-butyl-4-hydroxyphenyl) propionyloxy]-1-[2-(3-(3,5-di-t-butyl-4-hydroxyphenyl) propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl)propioneamide,tetrakis(2,2,6,6-tetramethyl-4-piperidyl)-1,2,3,4-butanetetracarboxylate and tetrakis(1,2,2,6,6-pentamethyl-4-piperidyl)-1,2,3,4-butanetetracarboxylate.

Also, a polymer compound is preferable, examples of which include: N,N',N'',N'''-tetrakis [4,6-bis-[butyl(N-methyl-2,2,6,6-tetramethylpiperidine-4-yl)amino]-triazine-2-yl]-4,7-diazadecane-1,10-diamine; a polycondensation compound of dibutylamine, 1,3,5-triazine N,N'-bis(2,2,6,6-tetramethyl-4-piperidyl)-1,6-hexamethylenediamine and N-(2,2,6,6-tetramethyl-4-piperidyl)butylamine; a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazine-2,4-diyl} {(2,2,6,6-tetramethyl-4-piperidyl)imino}hexamethylene{(2,2,6,6-tetramethyl-4-piperidyl)imino}]; a polycondensation compound of 1,6-hexanediamine-N,N'-bis(2,2,6,6-tetramethyl-4-piperidyl) and morpholine-2,4,6-trichloro-1,3,5-triazine; a high molecular weight HALS in which plurality of piperidine rings are combined via a triazine moiety, such as poly[(6-morpholino-s-triazine-2,4-diyl)[(2,2,6,6-tetramethyl-4-piperidyl)imino]-hexamethylene [(2,2,6,6-tetramethyl-4-piperidyl)imino]]; a polymer of dimethyl succinate and 4-hydroxy-2,2,6,6-tetramethyl-1-piperidineethanol; and a compound in which a piperizine ring is combined via a ester bond, such as a mixed ester compound of 1,2,3,4-butanetetracarboxylic acid, 1,2,2,6,6-pentamethyl-4-piperizinol and 3,9-bis(2-hydroxy-1,1-dimethylethyl)-2,4,8,10-tetraoxaspiro[5,5]undecane, however, the present invention is not limited thereto.

Among these compounds, preferable are, for example, a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}]; and a polymer of dimethyl succinate and 4-hydroxy-2,2,6,6-tetramethyl-1-piperidine ethanol, which have a number average molecular weight (Mn) of 2,000-5,000.

Above hindered-phenol compounds have been commercialized, for example, as "Tinuvin144" and "Tinuvin770" from Ciba Specialty Chemicals, Inc.; and as "ADK STAB LA-52" from ADEKA Corp.

<<Sulfur-Containing Compound>>

In the present invention, a sulfur-containing compound represented by Formula (D) is preferably used as one of the useful antioxidants.

$$R_{31}—S—R_{32} \qquad \text{Formula (D)}$$

In Formula (D), $R_{31}$ and $R_{32}$ each represent one of the substituents which are common to the substituents $R_{11}$-$R_{15}$ described in Formula (A).

Examples of a sulfur-containing compound include: dilauryl-3,3-thio-dipropionate, dimyristyl-3,3'-thiodipropionate, distearyl-3,3-thio-dipropionate, laurylstearyl-3,3-thio-dipropionate, pentaerythritol-tetrakis (β-lauryl-thio-propionate), 3,9-bis(2-dodecylthioethyl)-2,4,8,10-tetra-oxaspiro[5,5]undecane.

The above sulfur-containing compounds have been commercialized, for example, as "Sumilezer TPL-R" and "Sumilezer TP-D" from Sumitomo Chemical Co., Ltd.

Similarly to the case of the aforementioned cellulose ester, the antioxidant is preferably treated to remove the impurities such as residual acid, inorganic salt and organic low-molecule compound that have been carried over from the process of manufacturing, or that have occurred during preservation. The antioxidant has more preferably a purity of 99% or more. The amount of residual acid and water is preferably 0.01 through 100 ppm. This reduces thermal deterioration in the melt-casting film formation of the cellulose ester, and improves the film formation stability, film optical property and mechanical property.

The adding amount of the antioxidant is preferably 0.1-10% by weight, more preferably 0.2-5% by weight, and still more preferably 0.5-2% by weight, based on the weight of cellulose ester. Two or more types of antioxidants may be used in combination.

If the amount of the antioxidant to be added is too small, expected advantages cannot be achieved due to lower stabilizing effect at the time of melting. If the amount to be added is too much, transparency of the film may be reduced from the viewpoint of compatibility with the cellulose ester, and the film may become brittle, which is not preferred.

<<Acid Scavenger>>

Under a high temperature condition where melt-casting film formation of cellulose ester is carried out, decomposition of cellulose ester may also be accelerated with an acid. Accordingly, an acid scavenger is preferably contained as one of the stabilizers in the film for a display of the present invention. As the acid scavenger, any compound which react with an acid to inactivate the acid can be used without limitation in the present invention. Of these, preferable is, for example, a compound having an epoxy group as disclosed in U.S. Pat. No. 4,137,201. Such epoxy compounds as the acid acavenger have been known in the field of the art, and examples thereof include glycidyl ether of various polyglycols, particularly a polyglycol driven by condensation of approximately 8 to 40 moles of ethylene glycol per mole of the polyglycol, diglycidyl ether of glycerol, an metal epoxy compound (for example, ones usually used in a vinyl chloride polymer composition, or one usually used together with a vinyl chloride polymer composition), an epoxide ether condensate, diglycidyl ether of bisphenol A (namely, 4,4'-dihydroxydiphenyldimethylmethane), an epoxide unsaturated fatty acid ester (specifically, an ester of alkyl having 2-4 carbon atoms of a fatty acid having 2-22 carbon atoms such as butyl epoxystearate), and a triglyceride of one of various epoxide long chain fatty acids (for example, an epoxide soybean oil composition. The examples further include an epoxide of plant oil or another unsaturated natural oil. The epoxide oils are sometimes called as epoxide of natural glyceride or epoxide of unsaturated fatty acid and these fatty acids are each contains 12-22 carbon atoms. As an epoxy group-containing epoxide resin compound available on the market, EPON 815C, and an epoxide ether oligomer condensation product represented by Formula (E) are preferably employed.

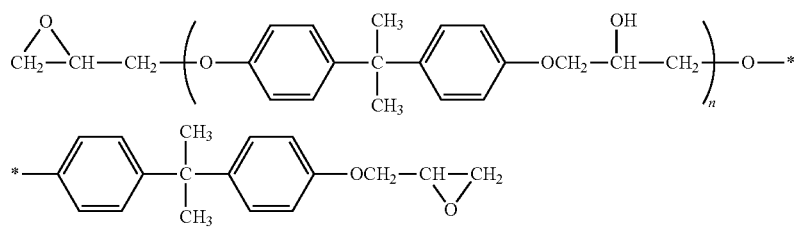

Formula (E)

In the above formula, n represents an integer of 0-12. Further employable acid scavenger includes those disclosed in JP-A No. 5-194788, paragraphs 87 to 105.

The adding amount of the acid scavenger is preferably 0.1-10% by weight, more preferably 0.2-5% by weight, and still more preferably 0.5-2% by weight, based on the weight of cellulose ester. Two or more types of acid scavengers may be used in combination.

An acid scavenger is also referred to as an acid remover, an acid trapping agent, an acid catcher, however, in the present invention, any of these agents are usable regardless of the difference in the address term.

With the purpose of avoiding changes in the properties of the material and preventing moisture absorption, the heated and melted material can be stored after dividing it into one or more types of pellets. Pelletizing is desirable because it is possible to improve the mixing character of melted materials at the time of heating, or to acquire optical uniformity of the obtained film.

When heating and melting the heated and melted material, the presence of the above stabilizer is superior in suppressing the deterioration in the strength of the film due to deterioration of dissociation of the material, or from the point of view of maintaining the strength unique to the material.

<<Addition of Grains>>

The time of adding grains when obtaining the heated and melted material in the present invention can be mixing the grains when any material in the heated and melted material other than the grains is a solid, or the grains are mixed when any material in the heated and melted material other than the grains is heated and melted, and thereafter they are mixed and kneaded to obtain the heated and melted material.

Further, when obtaining the heated and melted material in the present invention, it is also possible to mix beforehand the grains at the time of synthesizing any material in the heated and melted material other than the grains or at the time of mixing several of them after synthesizing, and to obtain the heated and melted material by mixing and kneading in a manner similar to that described above.

While the grains used in the present invention are the following, it is not necessary to limit to these. Further, in the present invention, when adding grains to a resin, it is also possible to include a function to give slipping. Grains can be grains of an inorganic material or grains of an organic material, and it can also be grains of compounds of organic and inorganic materials.

Grains are exemplified by inorganic grains and crosslinking polymer grains of silicon dioxide, titanium dioxide, aluminum oxide, zirconium oxide, calcium carbide, karyon, talc, sintered calcium silicate, hydrated calcium silicate, aluminum silicate, magnesium silicate and calcium phosphate. When the resin is a cellulose, it is possible to use the grains formed by surface treatment of the grains of silicon dioxide and others using the organic substance (to be described later) and silicon based materials. The grains subjected to surface treatment are preferably used because the object of the present invention can be achieved while the haze of the optical film is maintained.

The surface-treated organic substance preferably used is exemplified by halosilane, alkoxy silane, silazane and siloxane.

Grains having a greater average grainsize provide greater sliding effects, and grains having a smaller average grainsize provides greater transparency. The average grainsize of the grains used in the present invention is preferably 10 nm through 500 nm, more preferably 10 nm through 300 nm.

The grain of silicon dioxide is exemplified by AEROSIL 200, 200V, 300, R972, R972V, R974, R202, R812, RX200, OX50, and TT600 (by Nippon Aerosil Co., Ltd.). Of these, AEROSIL 200V, R972, R972V, R974, R202, R821 and RX200 are preferably used. Two or more of these grains can be used. When two or more of these grains are used, they can be mixed for use in a desired mixing ratio. In this case, the mass ratio of the grains having different average grainsize and different materials, for example, the mass ratio of AEROSIL 200V and R972V is 0.1 to 99.9 through 99.9 to 0.1 is preferred for use.

The following grains can be added to control the optical film refractive index: The inorganic grains that can be added are silicon oxide, titanium oxide, aluminum oxide, zirconium oxide, magnesium oxide, calcium carbonate, talc, clay, baked karyon, baked calcium silicate, hydrated calcium silicate, aluminum silicate, magnesium silicate and calcium phosphate. Especially silicon oxide, titanium oxide, aluminum oxide, zirconium oxide, and magnesium oxide are preferably utilized. It is also preferred to use the hollow spherical silica grains having an outer shell layer and a porous or hollow interior disclosed in the Unexamined Japanese Patent Application Publications Nos. 2001-167637, 2001-233611 and 2002-79616. The hollow spherical grains include (I) composite grains made up of porous grains and coating layer provided on the surface of the aforementioned porous grains or (II) hollow grains that contain a hollow interior filled with a solvent, gas or porous substance. In this case, either (I) composite grains or (II) hollow grains may be contained, or both (I) composite grains and (II) hollow grains may be contained.

It should be noted, however, that hollow grains have a hollow interior and the hollow portion is enclosed by grain walls.

Although the amount of addition of grains is not particularly restricted, it is desirable for realizing the purpose of the present invention that the compounding is done so that it is 0.01 to 55% by mass relative to the optical film, and it is still more desirable that the compounding is done so that it is 0.1 to 50% by mass relative to the optical film. If the amount of grains is more than these ranges, the transparency of the optical film may decrease, or the film may become too brittle. On the other hand, if the amount of the grains added is less than these ranges, it may be difficult to detect the effect of the present invention, and the meaning of utilizing grains decreases.

<<Modifying the Grain Surface>>

Grains are preferably surface-modified for the purpose of preventing coagulation among grains and intensifying bondage between the resin matrix and grains. A conventionally known surfactant can be selected in conformity to the type of the resin matrix. For example, a fatty acid such as stearic acid, various types of surface active agents, phosphoric acid esters, silane coupling agent, titanate coupling agent, aluminate coupling agent, zirco aluminate coupling agent can be used in response to the type of the inorganic grains and the degree of polymerization. The details are found in Adhesion Technology, Vol. 17, No. 3, (1987), pp. 54-59.

A block copolymer containing a group having an affinity for grains and a group having an affinity for resins can be preferably used as described in the journal of the Japan Society Of Adhesion Engineers, Vol. 38, No. 2, (2002), p. 39.

The higher fatty acid used as a surface modifier is exemplified by the fatty acid containing 16 through 20 carbon atoms, such as palmitic acid, stearic acid, oleic acid, linolic acid, linolenic acid. Surface treatment should be provided so that a volatile substance will not be emitted when the resin and grains are kneaded.

Preneact Series including KR-TTS, KR-138S, KR-ET and KR-44 manufactured by Ajinomoto Fine-Techno. Co. Inc. can be used as a titanate coupling agent.

Although these surface-modified agents can be added at any stage immediately after grain forming to mixing and in and kneading with the resin, from the point of view of preventing agglomeration of grains, it is also possible to add immediately after grain formation.

It is possible to select the amount of addition of the surface-modified agent as any value from 0.1 to 20% by mass with respect to the grain powder. In particular, when the volume average grainsize of the grains is 10 nm or more but 300 nm or less, it is desirable to have an amount of addition of 1 to 30% by mass.

When using organic grains as the grains, the concrete materials that can be used are, acrylic resin, acrylonitrile resin, polyurethane, polyvinyl chloride, polystyrene, poly acrylonitrile, polyamide, etc. Among these, it is desirable to use acrylic resin which has a high transparency, and in the case of grains that are constituted from resin material that either dissolves or gets swelled in the solvent used for solution casting, it is possible to maintain the form of the grains by having a cross-linked or core-shell structure.

As the shapes of these grains, although not particularly restricted, it is possible to use, for example, ball shaped, pillar shaped, cube shaped, spindle shaped, plate shaped, scale shaped, and fiber shaped grains, although not limited to these.

<<Average Grain Size>>

The average grain size (diameter) is measured using the following method in the present invention.

The prepared film is photographed using a transmission electron microscope, that image is read in by a scanner thereby making it possible to process it by image processing. Although the magnification during photography can be any thing as long as the grains can be observed, a magnification of about 50, 000 to 100, 000 is desirable.

The scanner for reading in images can be any type as long as it is an ordinary scanner that can read reflected documents, it is desirable that the resolution is 300 dpi (here, dpi expresses the number of dots per 2.54 centimeters) and can record 256 gradations or more. In the present invention, CanoScan FB 636U manufactured by Canon was used.

The image read in by the scanner is loaded into an image processing software, and the longitudinal long diameter, short diameter, and diameter of a circle with the same area are obtained for the grains. Next, number average values of these quantities are obtained respectively, the long diameter, short diameter, and average grain diameter are calculated, and used as the average grain diameter in the present patent specification.

<<UV Absorber>>

In the present invention, it is possible to add an ultraviolet (UV) ray absorber to the resin. At the time of adding to the heated and melted material of the resin, mixing and kneading is possible by heating. It is also possible to add the UV absorber to the solution at the time of preparing the film by solution casting. Further, it is also possible to add a separate UV absorber at the time of preparing the film. It is also possible to add the UV absorber in the inline mode using a widely known method separately at the time of preparing the film.

A UV absorbent (an ultraviolet light absorber) preferably has excellent ultraviolet light absorbance for wavelengths of 370 nm or less in view of preventing deterioration of the polarizer film or the display device due to ultraviolet light, and from the viewpoint of the liquid crystal display it is preferable that there is little absorbance of visible light having wavelengths of 400 nm or more. Examples of the UV absorbent include: oxybenzophenone compounds, benzotriazole compounds, salicylic acid ester compounds, benzophenone compounds, cyano acrylate compounds nickel complex compounds, and triazine compounds. Of these, preferable are benzophenone compounds, benzotriazole compounds which exhibit little coloration and triazine compounds. In addition, UV absorbents disclosed in JP-A Nos. 10-182621 and 8-337574, and polymer UV absorbents disclosed in JP-A Nos. 6-148430 and 20003-113317 are also applicable.

Specific examples of the benzotriazole UV absorbents include 2-(2'-hydroxy-5'-methylphenyl)benzotriazole,2-(2'-hydroxy 3',5'-di-tert-butylphenyl)benzotriazole,2-(2'-hydroxy-3'-tert-butyl-5'-methylphenyl)benzotriazole,2-(2'-hydroxy 3',5'-di-tert-butylphenyl)-5-chlorobenzotriazole,2-(2'-hydroxy-3'-(3", 4", 5",6"-tetrahydrophthalimide methyl)-5'-methylphenyl)benzotriazole,2,2-methylenebis(4-(1,1,3,3,-tetramethylbutyl)-6-(2H-benzotriazole-2-yl) phenyl),2-(2'-hydroxy-3'-tert-butyl-5'-methylphenyl)-5-chlorobenzotriazole, 2-(2H-benzotriazole-2-yl)-6-(straight chain or side chain dodecyl)-4-methylphenol,2-(2'-hydroxy-3',5'-di-(1-methyl-1-phenylethyl)-phenyl)benzotriazole,6-(2-benzotriazole)-4-t-octyl-6'-t-butyl-4'-methyl-2,2'-methylenebisphenol, a mixture of octyl-3-[3-tert-butyl-4-hydroxy-5-(chloro-2H-benzotriazole-2-yl)phenyl]propionate and 2-ethylhexyl -3-[3-tert-butyl-4-hydroxy-5-(5-chloro-2H-benzotriazole-2-yl) phenyl)propionate and 2-(2'-hydroxy-3'-(1-methyl-1-phenylethyl)-5'-(1,1,3,3-tetramethylbutyl)-phenyl) benzotriazole. However, the present invention is not limited thereto.

As commercially available UV absorbents, TINUVIN 171, TINUVIN 234, and TINUVIN 360, TINUVIN 928 and TINUVIN 109 (all of which are manufactured by Chiba Specialty Chemical Co., Ltd.); LA31 (manufactured by ADEKA Corp.); JAST-500 (manufactured by JOHOKU CHEMICAL Co., Ltd.); and Sumisorb 250 (manufactured by Sumitomo Chemical Co., Ltd.) are cited.

Examples of the benzophenone compound include: 2,4-dihydroxy benzophenone,2,2'-dihydroxy-4-methoxy benzophenone,2-hydroxy-4-methoxy-5-sulfobenzophenone,bis(2-methoxy-4-hydroxy-5-benzoylphenylmethane), however, the present invention is not limited thereto.

The amount of the UV absorbent used in the present invention is preferably 0.1-5 weight %, and more preferably 0.2-3 weight %, and still more preferably 0.5-2 weight %, based on the weight of cellulose ester. Two or more UV absorbents may be used in combination.

Also, these benzotriazole structure or benzophenone structure may be partially or regularly pendant to a polymer, or may be introduced in a part of the molecular structure of an additive such as a plasticizer, an antioxidant or an acid scavenger.

<<Resin>>

The resin used in the method of manufacture of an optical film according to the present invention, when using a thermoplastic material with which it is possible to obtain a heated and melted material such as that described above, there are no particular restrictions on the type of resin.

Examples include polycarbonate, polymer containing an alicyclic structure, polyvinyl alcohol, polyamide, polyimide and cellulose resin. Of these substances, the cellulose resin and polymer containing an alicyclic structure are preferably utilized.

Preferred cellulose resins are cellulose acetate propionate as a mixed fatty acid ester, cellulose acetate butylate and cellulose acetate propionate butylate.

In an optical film, it is desirable that the resin is non-crystalline or its crystallinity is very low because then there is no bad effect on image display.

When a Norbornene type resin is used as the thermoplastic resin, it is possible to obtain optical films with superior optical characteristics because the intrinsic multiple refractive index is low and also the photoelastic coefficient is small.

The aforementioned norbornane resin is exemplified by hydrogenated ring opening polymer norbornane monomer, addition polymer of norbornane monomer and olefin, addition polymer of norbornane monomers, and the derivatives thereof. One or more types of these norbornane resins can be used.

The aforementioned norbornane monomer is exemplified by bicyclo [2,2,1]hepto-2-ene(norbornane),6-methyl bicyclo [2,2,1]hepto-2-ene, 5,6-dimethyl bicyclo [2,2,1)hepto-2-ene, 1-methyl bicyclo [2,2,1]hepto-2-ene,6-ethyl bicyclo [2,2,1] hepto-2-ene,6-n-butylbicyclo [2,2,1]hepto-2-ene,6-isobutyl-bicyclo [2,2,1]hepto-2-ene,7-methyl bicyclo [2,2,1]hepto-2-ene, and other related norbornane derivatives.

The aforementioned hydrogenated ring opening polymer of norbornane monomer widely used is prepared by the steps of subjecting the norbornane monomer to ring opening polymerization according to the conventionally known technique, and hydrogenating the remaining double bond thereafter. In this case, the hydrogenated ring opening polymer can be an independent polymer of norbornane monomer or a copolymer of norbornane monomer and other cyclic olefin monomer.

The addition polymer of the aforementioned norbornane monomer and olefin is exemplified by a copolymer of norbornane monomer and α-olefin. There is no particular restriction to α-olefin, which is exemplified by α-olefin containing 2 through 20, preferably 2 through 10 carbon atoms, such as ethylene, propylene, 1-butene, 3-methyl-1-butene, 1-pentene, 3-methyl-1-pentene, 4-methyl-1-pentene, 1-hexene, 1-octene, 1-decene, 1-dodecene, 1-tetradecene and 1-hexadecene. Among them, ethylene is preferably employed for its excellent copolymerization features. Further, when the other α-olefin is copolymerized with the norbornane monomer, presence of ethylene improves the copolymerization feature.

The aforementioned norbornane resin is conventionally known and is commercially available. The conventionally known norbornane resin is shown by the examples disclosed in the Unexamined Japanese Patent Application Publication No. Hei. 1-240517. Commercially available norbornane resins are "Arton" series (trade name) of JSR, "Zeonoa" series of Nippon Zeon Co., Ltd., "TOPAS" series of TICONA Inc. and "Apel" series of Mitsui Petrochemical Industries, Ltd.

The polymer containing alicyclic structure can be defined as the polymer which contains an alicyclic structure in the repeating units. The alicyclic structure can be either a principal chain or a side chain. Cycloalkane structure, cycloalkene structure can be mentioned as the alicyclic structure. The cycloalkane structure is preferably used for its excellent thermal stability.

The polymer containing the alicyclic structure can be obtained by the method wherein a monomer containing a norbornane ring structure or a monomer containing the monocyclic olefin, cyclic conjugate diene, vinyl aromatic compound and vinyl alicyclic hydrocarbon compound is polymerized by the conventionally known polymerization technique such as metathesis ring opening polymerization or addition polymerization, and is hydrogenated by carbon-carbon unsaturated bonding as required.

When a polycarbonate resin is used as a thermoplastic resin, there is no particular restriction to the type of the optical film to be used. Preferably used one is an aromatic polycarbonate made up of aromatic divalent phenol component and carbonate component.

The aromatic divalent phenol compound is exemplified by 2,2-bis(4-hydroxy phenyl)propane, 2,2-bis(4-hydroxy-3,5-dimethyl phenyl)propane, bis(4-hydroxy phenyl)methane, 1,1-bis(4-hydroxy phenyl)ethane, 2,2-bis(4-hydroxy phenyl)butane, 2,2-bis(4-hydroxy-3,5-dimethyl phenyl)butane, 2,2-bis(4-hydroxy-3,5-dipropyl phenyl)propane, and 1,1-bis(4-hydroxy phenyl)cyclohexane. They can be used independently or two or more substances can be used in combinations. Among them, 2,2-bis(4-hydroxy phenyl)propane, 1,1-bis(4-hydroxy phenyl)cyclohexane, and 1,1-bis(4-hydroxy phenyl)-3,3,5-trimethyl cyclohexane are preferably employed. The polycarbonate containing the units of 2,2-bis (4-hydroxy phenyl)propane is used independently due to excellent manifestation of double curvature characterized by excellent processability and transparency. It is preferred to make a concurrent use of the unit of 1,1-bis (4-hydroxyphenyl)-3,3,5-trimethyl cyclohexane in addition to the unit of this 2,2-bis(4-hydroxy phenyl) propane.

The carbonate component is exemplified by phosgene, bischloroformate of the aforementioned divalent phenol, diphenyl carbonate, di-p-tolylcarbonate, phenyl-p-tolylcarbonate, di-p-chlorophenyl carbonate and dinaphthyl carbonate. Among them, phosgene and diphenyl carbonate are preferably utilized.

Polyether sulfone, polysulfone and polyamide can be used as other resins. Two more of these resins can be blended for use.

In the method of manufacture of optical films according to the present invention, in order to make the solution casting method its feature, it is desirable to select a resin that has solubility in the above solvents. It is possible to select from among the above thermoplastic resins, or it is possible to dissolve a resin that does not have thermoplasticity in a solvent as a heated and melted material, and to prepare it as a solution for solution casting method of film preparation.

Their preferred examples are polyvinyl acetal, polyvinyl butyral, polymethyl methacrylate, acryl resin represented by the copolymer thereof, polystyrene, the copolymer thereof, styrene-acryl copolymer, polyacrylonitrile, the copolymer thereof, polyvinyl chloride, vinyl chloride-vinyl acetate copolymer, cycloolefin resin, and cellulose resin. These resins can be used independently, in combination or in a modified form. Through the manufacturing steps of the present invention, the aforementioned high molecular resin is formed into a film according to the solution casting method, whereby high-quality optical film is produced.

Of the resins mentioned above, the cellulose resin is preferably used in particular.

Further, after the film is prepared, the parts that are cut off at the ends and that are not used as optical films, or the parts that did not become a product are used again after dissolving. Using this returned material at the time of manufacturing the film can contribute to reduction of waste materials in terms of the environmental considerations. In the method of manufacturing according to the present invention, from this point of view, it is desirable that the resin used is of the same type.

(Cellulose Resin)

Examples of a resin usable in the present invention include a cellulose resin, especially a cellulose ester may be preferably used.

There is no restriction to the cellulose ester constituting an optical film, if it is a cellulose ester that can be melted to form a film. When the film properties obtained such as optical properties are taken into account, the lower fatty acid ester of cellulose is preferably used. In the present invention, the lower fatty acid in lower fatty acid ester cellulose is defined as a fatty acid containing 5 or less carbon atoms. Cellulose acetate, cellulose propionate, cellulose butylate and cellulose pivalate can be mentioned as preferable lower fatty acid esters of cellulose. Although the cellulose ester replaced by the fatty acid containing six or more carbon atoms has a good melt film formation property, the cellulose ester film having been obtained therefrom has poor dynamic characteristics. This cellulose ester can hardly be used as an optical film. To ensure compatibility between the dynamic characteristics and melt film formation property, it is preferred to use a mixed fatty acid ester such as cellulose acetate propionate and cellulose acetate butylate, namely, a cellulose ester having an acyl group other than the acetyl group.

Therefore, the most preferable lower fatty acid ester of cellulose comprises an acyl group having a carbon number of 2-4 as a substituents, and, as a substitution degree by acetic acid, that is, when a substitution degree of an acetyl group is set to X and, as a substitution degree by an organic acid having 3 to 5 carbon atoms, especially as a substitution degree by an acyl group introduced from an organic acid having 3 to 5 carbon atoms, that is, when a substitution degree of an acyl group such as a propionyl group or a butyryl group is set to Y, the cellulose ester preferably satisfies the following formulas (i) and (ii) simultaneously.

$$2.6 \leq X+Y \leq 3.0 \qquad \text{Formula (i)}$$

$$0.0 \leq X \leq 2.5, \qquad \text{Formula (ii)}$$

Among them, cellulose acetate propionate is used preferably, especially, it is preferable to use a cellulose ester satisfying a condition of $1.5 \leq X \leq 2.5$, $0.1 \leq Y \leq 2.0$, further Formula (iii) $0.1 \leq Y \leq 1.5$. In disregard, a portion not substituted with an acyl group usually exists as a hydroxyl group. These can be synthesized by a well-known method.

The substitution degree of acyl group such as acetyl group, propionyl group and butyryl group can be measured according to the ASTM-D817-96.

The cellulose ester preferably used in the present invention has the ratio of the weight average molecular weight Mw to the number average molecular weight Mn is 1.0 through 5.5. This ratio is more preferably 1.4 through 5.0, still more preferably 2.0 through 3.0. Further, the Mw is preferably 100,000 through 500,000, more preferably 150,000 through 300,000.

The mean molecular weight and molecular weight distribution of cellulose ester can be measured by a gel permeation chromatography. The ratio of mass mean molecular weight (Mw) to number average molecular weight (Mn) can be calculated from the results of measurement.

The measuring condition is as follows:
<Gel Permeation Chromatography: Molecular-Weight-Measurement by GPC>

In the measuring method of the number average molecular weight by GPC, the sample was diluted with tetrahydrofuran so that the sample solid content concentration become 0.1%. Since the sample included grains, the grains were removed by the use of the filter, and the sample was measured according to the following conditions at a column temperature of 25 degrees C.

Column: TSK-gel-G5000HXL—TSK-gel-G2000HXL (manufactured by Toso KK)
    Eluate: THF (tetrahydrofuran)
    Pump: L6000 (manufactured by Hitachi KK)
    Flow: 1.0 ml/min
    Detection: RI Model 504 (GL Science Company)
    Sample concentration: 0.8%
    Standard sample, Calibration curve: Standard polystyrene STK (manufactured by Tosoh Corporation). Calibration curve using 13 samples of Mw=1,000,000 to 500. 13 samples should preferably be spaced approximately equally.

Although a wood pulp or a cotton linter is suitable as a raw material of the cellulose ester used in the present invention, and the wood pulp may be a needle-leaf tree or a broadleaf tree, the needle-leaf tree is more desirable. From a point of the peel property in the case of film production, the cotton linter is usable preferably. The cellulose ester made from these may be mixes appropriately or may be used independently.

For example, a cotton linter-originated cellulose resin: a wood-pulp (needle-leaf tree)-originated cellulose resin : a wood pulp (broadleaf tree)-originate cellulose resin may be used with a ratio of 100:0:0, 90:10:0, 85:15:0, 50:50:0, 20:80:0, 10:90:0, 0:100:0, 0:0:100, 80:10:10, 85:0:15 and 40:30:30.

The cellulose ester can be obtained by substituting hydroxyl groups in a raw material of cellulose with an acetyl group, a propionyl group and/or a butyl group within the above range with an ordinary method by using an acetic anhydride, a propionic anhydride, and/or a butyric anhydride, for example. A synthetic method of these cellulose esters is not limited to a specific one. For example, these cellulose esters may be synthesized by referring a method disclosed by JPA HEI-10-45804 or HYOU-6-501040.

From the industrial viewpoint, cellulose ester is synthesized by sulfuric acid used as a catalyst. This sulfuric acid is not completely removed, and the remaining sulfuric acid causes various forms of decomposition reaction at the time of melt film formation. This will affect the quality of the cellulose ester film to be obtained. Thus, the amount of the residual sulfuric acid contained in the cellulose ester used in the present invention is 0.1 through 40 ppm in terms of the sulfur element. They are considered to be included as salts. When the amount of the residual sulfuric acid contained therein exceeds 40 ppm, the deposition on the die lip at the time of heat-melting will increase, and therefore, such an amount is not preferred. Further, at the time of thermal stretching or slitting subsequent to thermal stretching, the material will be easily damaged, and therefore, such an amount is not preferred. The amount of the residual sulfuric acid contained therein should be reduced as much as possible, but when it is to be reduced below 0.1, the load on the cellulose ester washing process will be excessive and the material tends to be damaged easily. This should be avoided. This may be because an increase in the frequency of washing affects the resin, but the details are not yet clarified. Further, the preferred amount is in the range of 0.1 through 30 ppm. The amount of the residual sulfuric acid can be measured according to the ASTM-D817-96 in the similar manner.

The total amount of the residual amount of acid (e.g., acetic acid) is preferably 1000 ppm or less, more preferably 500 ppm or less, still more preferably 100 ppm or less.

The amount of the residual acid can be kept within the aforementioned range if the synthesized cellulose ester is washed more carefully than in the case of the solution casting method. Then, when a film is manufactured by the melt casting, the amount of depositions on the lip portion will be reduced so that a film characterized by a high degree of flatness is produced. Such a film will be further characterized by excellent resistance to dimensional changes, mechanical strength, transparency, resistance to moisture permeation, Rt value (to be described later) and Ro value. Further, the cellulose ester can be washed using water as well as a poor solvent such as methanol or ethanol. It is also possible to use a mixture between a poor solvent and a good solvent if it is a poor solvent as a result. This will remove the inorganic substance other than residual acid, and low-molecular organic impurities. The cellulose ester is washed preferably in the presence of an antioxidant such as a hindered amine and phosphorous acid ester. This will improve the heat resistance and film formation stability of the cellulose ester.

To improve the heat resistance, mechanical property and optical property of the cellulose ester, the cellulose ester is settled again in the poor solvent, subsequent to dissolution of the good solvent of the cellulose ester. This will remove the low molecular weight component and other impurities of the cellulose ester. In this case, similarly to the aforementioned case of washing the cellulose ester, washing is preferably carried out in the presence of an antioxidant.

Subsequent to re-settling of the cellulose ester, another polymer or low molecular compound may be added.

The cellulose ester used in the present invention is preferred to be such that there are few bright defects when formed into a film. The bright defect can be defined as follows: Two polarizing plates are arranged perpendicular to each other (crossed-Nicols), and a cellulose ester film is inserted between them. Light of the light source is applied from one of the surfaces, and the cellulose ester film is observed from the other surface. In this case, a spot formed by the leakage of light from the light source. This spot is referred to as a bright detect. The polarizing plate employed for evaluation in this case is preferably made of the protective film free of a bright defect. A glass plate used to protect the polarizer is preferably used for this purpose. The bright defect may be caused by non-acetified cellulose or cellulose with a low degree of acetification contained in the cellulose ester. It is necessary to use the cellulose ester containing few bright defects (use the cellulose ester with few distributions of substitution degree), or to filter the melted cellulose ester. Alternatively, the material in a state of solution is passed through a similar filtering step in either the later process of synthesizing the cellulose ester or in the process of obtaining the precipitate, whereby the bright defect can be removed. The melted resin has a high degree of viscosity, and therefore, the latter method can be used more efficiently.

The smaller the film thickness, the fewer the number of bright defects per unit area and the fewer the number of the cellulose esters contained in the film. The number of the bright defects having a bright spot diameter of 0.01 mm or more is preferably 200 pieces/cm$^2$ or less, more preferably 100 pieces/cm$^2$ or less, still more preferably 50 pieces/cm$^2$ or less, further more preferably 30 pieces/cm$^2$ or less, still further more preferably 10 pieces/cm$^2$ or less. The most desirable case is that there is no bright defect at all. The number of the bright defects having a bright spot diameter of 0.005 through 0.01 mm is preferably 200 pieces/cm$^2$ or less, more preferably 100 pieces/cm$^2$ or less, still more preferably 50 pieces/cm$^2$ or less, further more preferably 30 pieces/cm$^2$ or less, still further more preferably 10 pieces/cm$^2$ or less. The most desirable case is that there is no bright defect at all.

When the bright defect is to be removed by melt filtration, the bright defect is more effectively removed by filtering the cellulose ester composition mixed with a plasticizer, anti-deterioration agent and antioxidant, rather than filtering the cellulose ester melted independently. It goes without saying that, at the time of synthesizing the cellulose ester, the cellulose ester can be dissolved in a solvent, and the bright defect can be reduced by filtering. Alternatively, the cellulose ester mixed with an appropriate amount of ultraviolet absorber and other additive can be filtered. At the time of filtering, the viscosity of the melt including the cellulose ester is preferably 10000 P or less, more preferably 5000 P or less, still more preferably 1000 P or less, further more preferably 500 P or less. A conventionally known medium including a fluoride resin such as a glass fiber, cellulose fiber, filter paper and tetrafluoroethylene resin is preferably used as a filter medium. Particularly, ceramics and metal can be used in preference. The absolute filtration accuracy is preferably 50 μm or less, more preferably 30 μm or less, still more 10 μm or less, further more preferably 5 μm or less. They can be appropriately combined for use. Either a surface type or depth type filter medium can be used. The depth type is more preferably used since it has a greater resistance to clogging.

In another embodiment, it is also possible that the cellulose ester as a material is dissolved in a solvent at least once, and is dried and used. In this case, the cellulose ester is dissolved in the solvent together with one or more of the plasticizer, ultraviolet absorber, anti-deterioration agent, antioxidant and matting agent, and is dried and used. Such a good solvent as methylene chloride, methyl acetate or dioxolane that is used in the solution casting method can be used as the solvent. At the same time, the poor solvent such as methanol, ethanol or butanol can also be used. In the process of dissolution, it can be cooled down to −20° C. or less or heated up to 80° C. or more. Use of such a cellulose ester allows uniform additives to be formed in the melted state, and the uniform optical property is ensured in some cases.

The polarizing plate protective film of the present invention can be made of an adequate mixture of high polymer components other than the cellulose ester. The high polymer components to be mixed are preferably characterized by excellent compatibility with the cellulose ester compatibility. When formed into a film, the transmittance is preferably 80% or more, more preferably 90% or more, still more preferably 92% or more.

<<Manufacturing Method of an Optical Film>>
(Kneading for Forming a Heated Molted Material)
(1) Preheating A dried resin is put into a hopper of a melting extruding machine. At this time, when the glass transition point temperature of the resin is Tg ° C., the temperature of the hopper is adjusted from (Tg−50)° C. or more to Tg or less, whereby water adhered in the hopper is removed.

(2) Addition of Grains

Generally, grains are added in the course of conveying resin to a kneading machine. The grains may be in a form of powder or in a form of slurry in which grains are dispersed in a suitable dispersion medium, for example, water, in a concentration 5-20% by mass. In the case of powder, the power is supplied with feeders such as a screw type feeder or an electromagnetism feeder by use of a hopper different from that for polymer. Also, in the case of slurry, the slurry can be added in a fixed quantity by use of a metering pumps corresponding to high viscosity, such as a mono-pump and a tube pump.

(3) Melting, Kneading and Extruding

Resin and grains are kneaded at a melting temperature of (Tg+30) to 80° C. At this time, the melting temperature may be controlled at a constant temperature, or may be controlled at divided different temperatures. It may be preferable to make the temperature at the upstream side (hopper side) 1° C. or more to 50° C. or less higher than that at the downstream side, more preferably 2° C. or more to 30° C. or less higher, still more preferably 3° C. or more to 20° C. or less higher, so that decomposition of resin can be refrained more. Since the melting point of the material in which a resin and a plasticizer are dissolved becomes lower, it may be preferable to make the temperature at the upstream side to govern melting in order to progress the melting and to make the temperature at the downstream side lower in order to refrain the decomposition after the melting. Furthermore, it is desirable to add the above-mentioned stabilization agent in addition to a plasticizer.

The kneading time is preferably 2 minutes to 60, more preferably 3 minutes to 40 minutes, and still more preferably 4 minutes to 30. Furthermore, it is also desirable to make the inside of a melting extruder inactive gass currents (nitrogen etc.). Grains to be kneaded may be in a condition of powder, a condition of slurry, or a condition that grains are dispersed in a low boiling point organic solvent, such as an alcohol. However, when water and an organic solvent are included, it is necessary to remove them from polymer promptly during the kneading. For this reason, it is desirable to install a vacuum deairing pump in the course of the kneading machine.

Grains may be mixed with resin before kneading, may be added in a solution of resin, or may be added after resin is completely melted. In this invention, during this process, it may be desirable to make the heated kneaded material in a form of pellet from a viewpoint of preservation stability.

In order to make the pellet, it is desirable to use a pelletizer. The pellet may be made in a desirable size by adjusting the temperature, the discharge amount, and the viscosity of material by use of the pelletizer such as a strand cut type, a hot cut type, a water ring cut type, and a under water cut type. Although there is no specific restriction as for the size of a pellet, it is desirable within a range of a cube of (1 mm×1 mm×1 mm) to (20 mm×20 mm×20 mm) from viewpoints of such as solubility to a solvent and preservation stability.

<<Solution Casting>>

The manufacturing of an optical film of this invention can be conducted by a process of preparing a dope by solving in a solvent a pellet obtained by kneading extruding a heated melted material including a resin and grains, preferably a plasticizer and a stabilization agent; a process of casting the dope on an endless metal support proceeding infinitely; a process of drying the dope as a web; a process of separating the web from the metal support; a process of stretching or keeping the width of the web; a process of further drying; and a process of winding a finished film.

The process of preparing a dope is described.

FIG. 1 is a schematic drawing showing preparing a heated melted material and a pellet and preparing a dope according to this invention.

From a hopper 1, a resin, grains, a plasticizer, and a stabilization agent are introduced into a melting extruder 2, and kneaded, heated and melted, thereafter, made in a pellet and stored in a pelletizer/pellet storage 3. The pellet of the heated melted material is dissolved mixed in a solvent in a dope tank 4 to become a resin solution, at this time, a resin, grains, a plasticizer, a stabilization agent, etc. may be added further, if required when acquiring the effect of this invention.

As mentioned above, in this invention, all of film forming materials may be supplied with the above-mentioned heated melted material, and separately from the heated melted material, additives such as a resin, grains, a plasticizer, and a stabilization agent may be added and dissolved further. At this time, the additives may be the same kinds or different kinds. These concentrations can be adjusted with an added amount of pellet and an added amount of additional resin.

A higher content of resin in the dope is preferable since duration of the drying step following the flow-casting step is shortened, however, a too high content may result in loss of filtration accuracy. Preferable content of cellulose ester is from 10 to 35 percent by weight and more preferably from 15 to 25 percent.

A solvent may be used alone, however, two or more solvents may also be used together. In the case that a cellulose ester is used as the resin, a mixture of a good solvent and a poor solvent is more preferably used to increase manufacturing efficiency. A mixed solvent being rich in a good solvent is preferable to increase solubility of the cellulose ester. The preferable mixing ratios are from 70 to 98 percent by weight of a good solvent, and from 2 to 30 percent of a poor solvent. Herein, a good solvent is described as being capable of dissolving cellulose ester with a single use, and a poor solvent as being incapable of dissolving nor swelling cellulose ester even. Sometimes, a solvent works as a good solvent of a cellulose ester, and sometimes as a poor solvent depending on the average acetification degree (degree of acetyl substitution) of the cellulose ester. For example, acetone is a good solvent for an acetic ester of a cellulose ester of which the acetification degree is 2.4, as well as for an acetatepropionate of a cellulose ester, however, it is a poor solvent for an acetic ester of a cellulose of which the acetification degree is 2.8.

Good solvents used in the present invention include, for example: organic halides (such as methylene chloride), dioxolanes, acetone, methyl acetate and methyl acetoacetate, of which methylene chloride and methyl acetate are specifically preferable. However, the present invention is not specifically limited thereto.

Poor solvents used in the present invention include, for example: methanol, ethanol, n-butanol, cyclohexane and cyclohexanone, however, the present invention is not specifically limited thereto. A dope may preferably contain from 0.01 to 0.2 percent by weight of water.

In the step of preparing a dope, a cellulose ester is dissolved in a mixture of solvents using a common method. Dissolving a cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure. The following dissolving method is also preferable, in which a cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes too high. The dissolving temperature is preferably from 45 to 120° C., more preferably from 60 to 110° C. and still more preferably from 70 to 105° C. The pressure should be controlled not to allow boiling at the set temperature.

A low temperature dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily cause clogging up of the filter. The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such as polypropylene and Teflon®) as well as metal(alloy) filters (such as stainless steel) are preferable, since these materials are free from peeling of a fiber, which may occur when fibrous material is used. Impurities and, particularly, luminescent foreign materials contained in the cellulose ester are preferably diminished or entirely removed by filtering.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably less than 1.6 MPa, more preferably less than 1.2 MPa and still more preferably less than 1.0 MPa.

Casting dope (flow-casting of a dope) will be explained below:

In this process, the dope is fed to a pressure die through a liquid feeding pump (for example, a pressing type metering gear pump) and the dope is cast at a casting position on an endless metal support proceeding infinitely such as a metal belt, for example, a stainless belt, or a rotating metal drum from the pressing die slit.

It may be desirable to use a pressing die in which the shape of a slit on a head of a die can be adjusted and a layer thickness can easily made uniform. Examples of the pressing die include a coat hanger die and a T-die and either type may be used preferably. The surface of the metal support is made in a mirror surface. In order to increase a film forming speed, two pressing dies may be provided on the metal support so as to divide a dope amount and to form multi layers. Alternately, a plurality of dopes are cast simultaneously by a co-casting method so as to obtain a film having a laminated layer structure.

A metal support polished to a mirror finished surface is used in the flow-casting step. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support is preferably from 0 to 40° C. and more preferably from 5 to 30° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, the air temperature should be higher than the desired temperature of the support.

In order to obtain an optical film with a sufficient flatness, the content of residual solvent in the web when it is peeled from a metal support is preferably from 10 to 150 percent by weight, more preferably from 20 to 40 or from 60 to 130 percent by weight, and specifically more preferably from 20 to 30 or from 70 to 120 percent by weight.

The residual solvent content of the web is defined by the following formula:

Residual solvent content (% by weight)=$\{(M-N)/N\} \times 100$

Where M represents weight of a sample of the web collected in the manufacturing step or after manufacturing, and N represents weight of the same sample after it was dried at 115° C. for 1 hour.

In the drying step of an optical film, the film is peeled from a support and further dried. The content of residual solvent in the resulting film is preferably less than 1 percent, more preferably less than 0.1 percent and specifically preferably from 0 to 0.01 percent.

In a drying process of a film, two methods may be employed, i.e., a roll drying method in which a cellulose ester film is passed through many rollers placed alternatively up and down in a staggered manner, and a tenter method in which a cellulose ester film is transported while both sides of the film are clipped to put tension in the lateral direction.

It is specifically preferable that an optical film is peeled from a metal support and is immediately stretched in the transport (longitudinal) direction while the film still contains much residual solvent. The film is then preferably stretched in the lateral direction using an above described tenter method.

A film is preferably peeled from the support with a tension of larger than 210 N/m and more preferably with a tension from 220 to 300 N/m in order to stretch the film in the longitudinal direction just after peeling.

The method to dry the web is not specifically limited, however, generally, hot air, IR ray, heated rollers or microwave irradiation is used. Hot air is preferably used with respect to ease of cure and low cost.

The preferable drying temperature of a web to obtain stable film dimensions is from 40 to 200° C. and more preferably from 50 to 140° C. The temperature is preferably increased stepwise.

The thickness of an optical film is not specifically limited, however, a thickness in a range from 10 to 200 μm is preferable, specifically a thickness in a range from 20 to 100 μm is preferable. More preferably, a thickness is in a range from 30 to 90 μm, most preferably, a thickness is in a range from 40 to 80 μm.

The optical film used in the present invention has a width of 1 m through 4 m. Specifically, a width of 1.4 m through 4 m is preferably used. More preferably, a width is 1.6 to 3 m.

(Stretching Operation, Control of Refractive Index)

The retardation value Ro defined by Formula (i) is preferably in a range of 0 to 300 nm and the retardation value Rt defined by Formula (ii) is preferably in a range of −600 to 600 nm, and more preferably Ro is 0 to 80 nm and Rt is −400 to 400 nm, specifically preferably Ro is 0 to 40 nm and Rt is −200 to 200 nm.

When the optical film of this invention is used for a retardation film, the retardation value Ro is preferably 20 nm or more and 300 nm or less. The retardation value is preferably 70 nm or more and 400 nm or less.

$$Ro = (nx - ny) \times d \qquad \text{Formula (i)}$$

$$Rt = \{(nx + ny)/2 - nz\} \times d \qquad \text{Formula (ii)}$$

In these formulas, nx is a refractive index in a slow axis direction in the film plane, ny is a refractive index in a fast axis direction in the film plane, nz is a refractive index in the thickness direction of the film and d is a thickness of film (nm).

The retardation values of a film were obtained with the used of an automatic birefringent analyzer KOBRA-21ADH (manufactured by Oji Scientific Instruments) as follows: The film was kept for 24 hrs under an environment of 23° C. and 55% RH, and then the retardation of the film was measured with a wavelength of 590 nm under the same environment. Average refractive indexes and a film thickness of a film-forming material measured by an Abbe refractive index measuring device are inputted, thereby obtaining a in-plane retardation value (Ro) and a thickness direction retardation (Rt). Further, three-dimensional refractive indexes nx, ny, nz are also calculated by the above device.

In order to obtain the above retardation values Ro and Rt, an optical film has a structure of this invention and a refraction index control is conducted for the film by a stretching operation.

Stretching can be performed sequentially or simultaneously, for example, in the longitudinal direction of the film and in the direction perpendicular thereto in the same plane of the film, namely, in the lateral direction.

The magnification of stretching in the biaxial directions perpendicular to each other are finally 1.0 to 2.0 times in a casting direction and 1.01 to 2.5 times in a widthwise direction respectively, more preferably 1.01 to 1.5 times in the casting direction and 1.05 to 2.0 times in the widthwise direction.

The method for stretching the web is not particularly limited. Examples include, a method in which a plurality of rolls are caused to have differing peripheral speeds and stretching is done in the casting direction by utilizing the difference in peripheral speed between the rolls; a method in which both ends of the web are fixed with clips or pins and the spaces between the pins or clips are extended in the forward direction to thereby carry out stretching in both the casting and width directions; a method in which widening in the width direction and stretching in the width direction are performed simultaneously; and a method in which widening in the longitudinal direction and stretching in the width direction are performed simultaneously. As a matter of course, these and other methods may be used in combination. In addition, in the case of the so-called tenter method, smooth stretching can be carried out by driving the clip portion using a linear driving method, and this method is favorable because it reduces the risk of, for example, rupture of the film.

Holding the width or stretching in the width direction in the process of preparing the film is preferably performed by using a tenter, and may be performed by a pin tenter or a clip tenter.

Provided that the optical film of the present invention has a slow axis or a fast axis in the film plane and that the angle thereof between the casting direction of the film is designated as θ1, θ1 is preferably −1° or more and +1° or less, and more preferably −0.5° or more and +0.5° or less. 01 is defined as an orientation angle, and can be measured by using an automatic birefringent analyzer KOBRA-21ADH (manufactured by Oji Scientific Instruments). When θ1 meets the above condition, high luminance is obtained as well as suppressing or preventing leakage of light in a display image, and high color reproducibility is obtained in a color liquid crystal display.

The values of desirable physical-properties of the optical film of this invention are described hereafter.
(Elastic Modulus)

The elastic modulus of a sample kept under 23° C., 55% RH for 24 hours is preferably in a range of 1.5 to 5, still more preferably in a range of 2.0 to 3.5 GPa.

When the elastic modulus is lower than this value, the hardness of a film used for an optical film may be insufficient and the film may deform.

Moreover, when the elastic modulus is in the above, the film has no problem as to fragility and when producing a polarizing plate with the film, the yield increases preferably.

The elastic modulus in this invention refers to the elastic modulus measured according to the method described JIS K7127. At this time, the form of the sample is a No. 1 type test piece, and a test rate is performed at 100 mm/minutes.
(Fracture Elongation)

The fracture elongation of an optical film according to this invention by the following measurement is preferably 30 to 60%, more preferably 35 to 50%.

If the fracture elongation is lower than above value, the film used for an optical film tends to extend and deform.

Moreover, if the fracture elongation is in the above range, it becomes easy to a polarizing plate with the film without breakage.
<Measurement of Fracture Elongation>

A film containing arbitrary remaining solvents is cut into a sample having a width of 10 mm and a length of 130 mm, and the sample is kept 23° C., 55% RH for 24 hours and then the fracture elongation can be obtained by subjecting the sample to a pulling test with a pulling speed 100 mm/minutes and a distance of 100 mm between chucks. In the example mentioned later, the value was obtained by use of a sample having a thickness of 80 μm.
(Haze Value)

In the usage to require a high transparency, when an optical film of this invention has a thickness of 80 μm, the haze value is preferably 1.5%. If the haze value is higher than this value, when the film is used for an optical film, the sharpness of an image may be affected.
<Measurement of Haze Value>

It is measured according to JIS K-6714 by use of the Haze meter (a 1001DP type, produced by Nippon Denshoku Company), and is used as an index of transparency. In the example mentioned later, the value was obtained by use of a sample having a thickness of 80 μm.
(Functional Layer)

When manufacturing the optical film, a functional layer such as antistatic layer, hard coat layer, antireflection layer, lubricant layer, adhesive layer, antiglare layer, gas-barrier layer and optical compensation layer can be coated before and/or after stretching. Specifically, it is preferable that at least one selected from antistatic layer, hard coat layer, anti-reflection layer, adhesive layer, antiglare layer and optical compensation layer is provided. In this case, various forms of surface treatment such as corona discharging, plasma processing, alkali saponification treatment, chemical fluid treatment can be provided if neccessary.
<Polarizing Plate>

The optical film of the present invention can be used preferably as a polarizing plate protective film. A producing method of a polarizing plate provided with a optical film of the present invention is not limited specifically, and may be produced by a common method. A polarizer was produced such that a polyvinyl alcohol film or an ethylene modification polyvinyl alcohol film having an ethylene unit in the content of 1 to 4 mol %, a polymerization degree of 2000 to 4000, a saponification degree of 99.0 to 99.99 mol % was dipped in an iodine solution and stretched to obtain the polarizer. The optical film obtained by the present invention was subjected to an alkali treatment and pasted on both surfaces of the polarizer with a complete saponification polyvinyl-alcohol aqueous solution or pasted on one side of the polarizer directly. On the other surface, another optical film may be pasted or a commercially available cellulose ester film (for example, Konica Minolta TAC, KC8 UX, KC4 UX, KC5 UX, KC8 UCR3, KC8 UCR4, KC8 UY, KC4 UY, KC12 UR, KC4 UE, KC8 UE, KC4FR-1, KC4FR-2, KC8 UY-HA, KC8 UX-RHA, KC8 UX-RHA-N, manufactured by Konica Minolta Opt Inc.) may be used preferably.

In this regard, instead of the above alkali treatment, a simple pasting process disclosed in J.P.A (TOKKAIHEI) No. 6-94915, and No. 6-118232 may be performed to produce a polarizing plate.

The polarizing plate is structured with a polarizer and protective films to protect both surface of the polarizer or the polarizing plate is structured by pasting a protective film on one surface of the polarizer and a separate film on the opposite surface. The protective film and the separate film are used to protect the polarizing plate in the time of shipment of the polarizing plate and in the time of product inspection for the polarizing plate. At this time, the protective film is pasted for the purpose of protecting the surface of the polarizing plate such that it pasted on a surface opposite to a surface on which the polarizing plate is pasted on a liquid crystal plate. Further, the separate film is used for covering a adhesive layer pasted on the liquid crystal plate such that it is pasted on both surfaces on which the polarizing plate is pasted on a liquid crystal plate.

(Liquid Crystal Display)

Although a base board including a liquid crystal cell is generally disposed between two polarizing plates in the liquid crystal display, the optical film of the present invention can provide an excellent display ability even if the optical film is arranged at any position. Especially, since a clear hard coat layer, an anti glare layer and an anti reflection layer are provided on a optical film on the uppermost layer at the display side of the liquid crystal display, the optical film of the present invention is preferably used at this part. Further, the optical film of the present invention may be stretched to be used preferably as a retardation film to enlarge a viewing field or a light dispersing film.

The optical film of the present invention and the polarizing plate employing it are preferably used in LCD of a reflection type, a penetrated type, a half-transmission type or in LCD with various drive systems such as TN type, STN type, OCB type, HAN type, VA type (PVA type, MVA type), and IPS type (AS type, FFS type). Especially, in a display having a screen larger than 30 type, in particular, a large screen of 30 type to 54 type, white omission does not occur on peripheral sections of the screen, the effect is maintained for a long period of time, and prominent effects are observed in MVA type liquid crystal display. In particular, color unevenness, glaring and waving irregularities are little observed and effects that eyes do not get tired even with staring for a long period, are appreciated.

[Embodiment]

Although the present invention is described in concrete terms below using some preferred embodiments, the present invention shall not be restricted to these.

(Material Used)

<Resin>

(Cellulose Acetate Propionate)

C-1 (Overall acyl group replacement ratio: 2.7; acetyl group replacement ratio: 1.9; propionyl group replacement ratio of 0.8; Tg: 178° C.; number average molecular weight: 75000)

C-2 (Overall acyl group replacement ratio: 2.7; acetyl group replacement ratio: 1.4; propionyl group replacement ratio of 1.3; Tg: 155° C.; number average molecular weight: 80.000)

C-3 (Overall acyl group replacement ratio: 2.7; acetyl group replacement ratio: 0.2; propionyl group replacement ratio of 2.5; Tg: 144° C.; number average molecular weight: 70000)

(Cellulose Acetate Butylate)

C-4 (CAB 381-20 of Eastman Chemical Co., Ltd.; Tg: 135° C.: average molecular weight: 65000)

The replacement ratio of the acyl groups such as acetyl group, propionyl group and butyryl group was measured according to the provisions given in the ASTM-D817-96. The substance of C-4 was used directly.

The number average molecular weight was measured according to the following procedure:

<Gel Permeation Chromatography: Measurement of Molecular Weight by GPC>

In measuring the number average molecular weight by GPC, the sample was diluted by tetrahydrofuran so that the concentration of sample solids would be 0.1%. Grains were removed using a filter containing grains and the number average molecular weight was measured at a column temperature of 25° C. under the following conditions:

Column: TSKgelG5000HXL-TSKgelG2000H XL of Tosoh Co., Ltd.
Eluant: THF (tetrahydrofuran)
Pump: L6000 (Hitachi, Ltd.)
Flow rate: 1.0 mL/min
Detection: RI Model 504 (GL Sciences Inc.)
Sample concentration: 0.8%
Standard sample/calibration curve: standard polystyrene
STK standard polystyrene (Tosoh Corporation): calibration curve by 13 samples of Mw=1000000 through 500 is used.

<Plasticizer>

P-1 trimethylol propane tribenzoate P-2 ethylphthalethyl glycolate P-3 triphenyl phosphate

EXAMPLE 1

<<Manufacturing the Optical Film>>
<Optical Film A-101>

| <(Solution casting method (manufacturing method-A)) | |
|---|---|
| Cellulose acetate propionate C-1 | 100 parts by mass |
| Methylene chloride | 380 parts by mass |
| Ethanol | 70 parts by mass |
| Plasticizer: trimethylol propane tribenzoate P-1 | 10 parts by mass |
| Ultraviolet absorber: TINUVIN 109 (Ciba Specialty Chemicals K.K) | 0.5 parts by mass |
| Ultraviolet absorber: TINUVIN 171 (Ciba Specialty Chemicals K.K) | 0.5 parts by mass |
| Grains: AEROSIL-R972V of Nippon Aerosil Co., Ltd. (primary grain diameter: 16 nm) | 20 parts by mass |

The aforementioned substances were stirred and mixed in a dissolver for 30 minutes and were put into a container. After they were completely dissolved, they were left to stand for eight hours for removal of gas bubble. This solution was heated up to 35° C., and was cast uniformly over a stainless band support member using a belt casting apparatus at a temperature of 35° C. and a width of 1800 mm. Solvent was evaporated on a stainless band support member until the amount of the remaining solvent was 100%. After that, the web was separated from the stainless band support member. Solvent was evaporated at 55° C. from the web having been separated, and was slit to a width of 1650 mm. After that, the web was stretched to 110 percent by a tenter in the direction of TD (direction perpendicular to the conveying direction of the film) at 130° C. In this case, the amount of the remaining solvent when stretching was started by the tenter was 18%. After that, the drying zone having a temperature of 120° C. and 110° C. was conveyed by a great number of rolls and the process of drying terminated. The web was slit to a width of 1400 mm, and both ends of the film were subjected to knurling to a width of 15 mm and a height of 10 μm. The web was then wound on the core, whereby a the optical film A-101 was produced. The amount of the remaining solvent of the optical film A-101 was 0.1%, and the film thickness was 80 μm. The number of turns amounted to 1500 m.

Next, similar to the optical film A-101, the optical films A-102 to A-105 were prepared with the constitutions shown in Table 1.

However, in this table, "T109/T171" indicates that the use of the agent is common to both. The same is true hereafter.

TABLE 1

| Optical film | Resin | Parts of mass | Plasticizer | Weight parts | UV Absorber | Parts of mass | Grains | Grain diameter (nm) | Parts of mass |
|---|---|---|---|---|---|---|---|---|---|
| A-101 | C-1 | 100 | P-1 | 10 | T109/T171 | 0.5/0.5 | R972V | 16 | 20 |
| A-102 | C-2 | 100 | P-1 | 10 | T109/T171 | 0.5/0.5 | R972V | 16 | 20 |
| A-103 | C-3 | 100 | P-1 | 10 | T109/T171 | 0.5/0.5 | R972V | 16 | 20 |
| A-104 | C-4 | 100 | P-1 | 10 | T109/T171 | 0.5/0.5 | R972V | 16 | 20 |
| A-105 | C-1 | 100 | P-1 | 10 | T109/T171 | 0.5/0.5 | R972V | 16 | 1 |

<Optical Film B-201>

| (Solution casting method (manufacturing method-B)) | |
|---|---|
| Cellulose acetate propionate C-1 | 100 parts by mass |
| Methylene chloride | 380 parts by mass |
| Ethanol | 70 parts by mass |
| Plasticizer: trimethylol propane tribenzoate P-1 | 10 parts by mass |
| Ultraviolet absorber: TINUVIN 109 (Ciba Specialty Chemicals K.K) | 0.5 parts by mass |
| Ultraviolet absorber: TINUVIN 171 (Ciba Specialty Chemicals K.K) | 0.5 parts by mass |

The aforementioned substances were stirred and mixed in a dissolver for 30 minutes and were put into a container. After they were completely dissolved, the following grains dispersion A was added to this solution.

| (Preparing the grain dispersion A) | |
|---|---|
| Ethanol: | 180 parts by mass |
| Grains: AEROSIL R972V of Nippon Aerosil Co., Ltd. (primary grainsize: 16 nm) | 20 parts by mass |

The aforementioned materials were put into a predetermined container and were stirred. After they were stirred for 30 minutes at a speed of 500 rpm, they were dispersed by a Manton-Gaulin high-pressure homogenizer at a pressure of 2.45×10$^7$ Pa. The dispersion was diluted by 27 parts by mass of methylene chloride, whereby grains dispersion A was produced.

After adding the grain dispersed liquid A and mixed by stirring for 30 minutes using a dissolver, it was left aside for 8 hours in order to remove the bubbles. These solutions were heated to 35° C., and cast uniformly on a stainless steel band supporting body with a width of 1800 mm and temperature of 35° C. using a belt solution casting apparatus. In the stainless steel supporting body, the solution was evaporated until the residual amount of solvent became 100%, and the film was peeled off from the stainless steel band supporting body. The solvent in the peeled web was evaporated at 55° C., slit to a width of 1650 mm, and thereafter, and rolled to 1.1 times at 130° C. in the TD direction (a direction at right angles to the direction of conveying the film) using a tentering machine. At this time, the residual amount of solvent at the time of stretching by the tentering machine was 18%. After that, the drying was completed by conveying using multiple rollers through the 120° C. and 110° C. drying zones, cut to a width of 1400 mm, knurling operation was made at both edges of the film with a width of 15 mm and a height of 10 µm, reeled up over a core reel, thereby obtaining the optical film B-201. The residual amount of solvent in the optical film B-201 was 0.1%, the film thickness was 80 µm, and the length of the roll was 1500 m.

<Optical Film B-202>
(Preparing the Grains Dispersion B)

The optical film B-202 was produced in the same procedure as that used to produce the optical film B-201 except that one part by mass of the following nonionic surface active agent was added to the grains dispersion A to produce the dispersion, which was then used.

Nonionic surface active agent (HO—(CH$_2$CH$_2$O)n[CH(CH$_3$)CH$_2$]$_{17}$—(CH$_2$CH$_2$O) mH (n+m=5 through 7)) 1 part by mass <Optical Film C-301>

| (Preparing the heated and melted materials 1 (manufacturing method-C/a)) | |
|---|---|
| Cellulose acetate propionate C-1 | 30 parts by mass |
| Plasticizer: trimethylol propane tribenzoate P-1 | 10 parts by mass |
| Additive 1: HP-136 (Ciba Specialty Chemicals K.K) | 0.15 parts by mass |
| Additive 2 (Sumirizer GS (Sumitomo Chemical Co., Ltd.)) | 0.3 parts by mass |
| Additive 3 (Irganox-1010 (Ciba Specialty Chemicals K.K)) | 0.15 parts by mass |
| Grains: AEROSIL-R972V of AEROSIL (Aerosil Japan Co., Ltd. (primary grainsize: 16 nm) | 20 parts by mass |

The aforementioned materials were mixed by a Henschel mixer and were melt-extruded by an extruder at a temperature of Table 3. They were then formed into pellets in combination with a strand die at an outlet temperature of the heated and melted materials amounting to Tg –5° C., whereby a heated and melted material 1 was produced. The pellet was a cube measured 10 mm×10 mm×10 mm.

Next, with the constitution shown in Table 2, the heated and melted materials 2 to 9 were prepared in a manner similar to that of the heated an melted material 1.

However, the compounds used were the following.

Chem. 37:

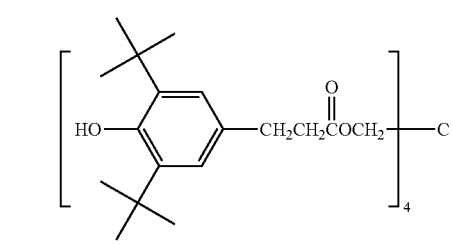

IRGANOX-1010

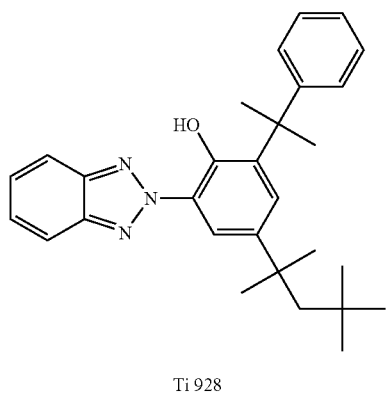

Ti 928

200V: AEROSIL-200V manufactured by Aerosil Japan Co., Ltd. (primary grain diameter: 12 nm)

RX200: AEROSIL-RX200 manufactured by Aerosil Japan Co., Ltd. (primary grain diameter: 12 nm)

General equation (3) Example compound A-20: Phenyl ester benzoate compound

Measurement of Tg2: The measurement of the glass transition temperature Tg2 of the heated and melted material was made by enclosing 10 mg of the heated and melted material sample in an aluminum sample pan, drying it in vacuum for 24 hours, thereafter, raising the temperature at 20° C./min in a differential scanning calorimeter (DSC) (Model DSC8230 manufactured by Rigaku Co., Ltd.), and obtaining the extrapolated glass transition starting temperature obtained by the DSC curve as the glass transition temperature.

| (Solution casting method (manufacturing method-C/b)) | |
|---|---|
| Cellulose acetate propionate C-1 | 70 parts by mass |
| Methylene chloride | 380 parts by mass |
| Ethanol | 70 parts by mass |
| TINUVIN 109 (Ciba Specialty Chemicals K.K) | 0.5 parts by mass |
| TINUVIN 171 (Ciba Specialty Chemicals K.K) | 0.5 parts by mass |

The materials other than the aforementioned pellet were stirred and mixed in a dissolver for 15 minutes and were then put into a container. After they were completely dissolved, the pellets manufactured according to the aforementioned manufacturing method-C/a in the amount equivalent to parts by mass shown in Table 3 were added to this solution, and the solution was stirred and mixed in a dissolver for further 15 minutes until it was completely dissolved. The solution was left to stand for eight hours for removal of gas bubble. This solution was heated up to 35° C., and was cast uniformly over a stainless band support member using a belt casting apparatus at a temperature of 35° C. and a width of 1800 mm. Solvent was evaporated on a stainless band support member until the amount of the remaining solvent was 100%. After that, the web was separated from the stainless band support member. Solvent was evaporated at 55° C. from the web having been separated, and was slit to a width of 1650 mm. After that, the web was stretched to 110 percent by a tenter in the direction of TD (direction perpendicular to the conveying direction of the film) at 130° C. In this case, the amount of the remaining solvent when stretching was started by the tenter was 18%. After that, the drying zone having a temperature of 120° C. and 110° C. was conveyed by a great number of rolls and the process of drying was terminated. The web was slit to

TABLE 2

| a1 | a2 | a3 | a4 | a3 | a5 | a3 | a6 | a7 (nm) | a3 | a8 1 | a3 | a8 2 | a3 | a8 3 | a3 | Tg2 (° C.) | a9 (° C.) |
|---|---|---|---|---|---|---|---|---|---|---|---|---|---|---|---|---|---|
| 1 | C-1 | 30 | P-1 | 10 | — | — | R972V | 16 | 20 | HP-136 | 0.15 | Sumilizer GS | 0.3 | Irganox 1010 | 0.15 | 115 | 175 |
| 2 | C-2 | 30 | P-1 | 10 | — | — | R972V | 16 | 20 | HP-136 | 0.15 | Sumilizer GS | 0.3 | Irganox 1010 | 0.15 | 113 | 175 |
| 3 | C-3 | 30 | P-1 | 10 | — | — | R972V | 16 | 20 | HP-136 | 0.15 | Sumilizer GS | 0.3 | Irganox 1010 | 0.15 | 108 | 165 |
| 4 | C-4 | 30 | P-1 | 10 | — | — | R972V | 16 | 20 | HP-136 | 0.15 | Sumilizer GS | 0.3 | Irganox 1010 | 0.15 | 105 | 165 |
| 5 | C-1 | 30 | P-1 | 10 | T928 | 1.5 | R972V | 16 | 1 | HP-136 | 0.15 | Sumilizer GS | 0.3 | Irganox 1010 | 0.15 | 119 | 175 |
| 6 | C-1 | 10 | P-1 | 10 | — | — | 200V/ R972V | 12/ 16 | 2/8 | HP-136 | 0.05 | Sumilizer GS | 0.1 | Irganox 1010 | 0.05 | 102 | 150 |
| 7 | C-3 | 10 | P-2/ P-3 | 3/7 | — | — | RX200 | 12 | 10 | — | — | — | — | Irganox 1010 | 0.05 | 100 | 145 |
| 8 | C-1 | 15 | P-1 | 5 | — | — | R972V | 16 | 5 | — | — | b1 | 0.3 | Irganox 1010 | 0.1 | 113 | 165 |
| 9 | C-1 | 50 | P-1 | 5 | — | — | R972V | 16 | 10 | — | — | — | — | Irganox 1010 | 0.1 | 150 | 200 | a1 Heated and melted material No.
a2 Plastic
a3 Parts by mass
a4 Plasticizer
a5 UV Absorber
a6 Grains
a7 Grain size (nm)
a8 Stabilizer
a9 Extrusion temperature (° C.)
b1 General formula (3)
Example compound A-20

Using the pellets so obtained, the optical films C-301 to C-309 were prepared using the following solution casting method.

a width of 1400 mm, and both ends of the film were subjected to knurling to a width of 15 mm and a height of 10 μm. The web was then wound on the core, whereby the optical film C-301 was produced. The amount of the remaining solvent of the optical film C-301 was 0.1%, and the film thickness was 80 μm. The number of turns amounted to 1500 m.

Next, the optical films C-302 to C-309 were obtained similar to the optical film C-301 excepting that the constitutions were changed to those shown in Table 3.

TABLE 3

| Optical film No. | Heated and melted material No. | Heated and melted material parts of mass | Resin | Parts of mass | Plasticizer | Parts of mass | UV Absorber | Parts of mass | Tg1 (° C.) |
|---|---|---|---|---|---|---|---|---|---|
| C-301 | 1 | 60.6 | C-1 | 70 | — | — | T109/T171 | 0.5/0.5 | 145 |
| C-302 | 2 | 60.6 | C-2 | 70 | — | — | T109/T171 | 0.5/0.5 | 128 |
| C-303 | 3 | 60.6 | C-3 | 70 | — | — | T109/T171 | 0.5/0.5 | 117 |
| C-304 | 4 | 60.6 | C-4 | 70 | — | — | T109/T171 | 0.5/0.5 | 109 |
| C-305 | 5 | 43.1 | C-1 | 70 | — | — | — | — | 146 |
| C-306 | 6 | 30.2 | C-1 | 90 | — | — | — | — | 146 |
| C-307 | 7 | 30.1 | C-1/C-3 | 80/10 | — | — | — | — | 138 |
| C-308 | 8 | 25.1 | C-1 | 85 | P-1 | 5 | T109/T171 | 0.5/0.5 | 150 |
| C-309 | 9 | 65.1 | C-1 | 50 | P-1 | 5 | — | — | 145 |

Evaluation:

The following evaluations were made using the obtained optical films A-101 to A-105, B-201, B-202, C-301 to C-309.

Measurement of Tg1: The measurement of the glass transition temperature Tg1 of optical films was made by enclosing 10 mg of the film sample in an aluminum sample pan, drying it in vacuum for 24 hours, thereafter, raising the temperature at 20° C./min in a differential scanning calorimeter (DSC) (Model DSC8230 manufactured by Rigaku Co., Ltd.), and obtaining the extrapolated glass transition starting temperature obtained by the DSC curve as the glass transition temperature.

The evaluation methods described earlier were used for the coefficient of elasticity, rupture elongation, and haze. (Humidity and heat durability: High temperature and high humidity resistance test)

The optical film was processed in a constant temperature chamber that can maintain heat and humidity conditions for 500 hours at 60° C. and 90% RH. The optical film after this processing was left for 24 hours at 23° C. and 55% RH, and thereafter the optical film was observed from the front of the optical film with the configuration of—the optical film to be observed/polarizing plate/back light, and the evaluation was made using the following standards.

A: Good with no changes from before processing.

B: Although a slight amount of whitened solid shaped and oil shaped matter has solved out, but this is at a level at which there is no problem in practical use.

C: Precipitates (white turbid matter or oil shaped matter) can be seen on the surface, and this film cannot be used as an optical film.

Dimensional Stability:

The dimensional stability is expressed by the thermal contraction ratio. Three sheets of test sample pieces of dimensions of 30 mm width×120 mm length are taken from the film samples in the vertical (conveying) direction and the horizontal (width) direction. At both edges of the test samples, holes of 6 mm diameter are punched at intervals of 100 mm. These are humidity conditioned for 3 hours or more in a room with a temperature of 23±3° C. and a relative humidity of 65±5% RH. Using an automatic pin gauge (manufactured by Shinto Kagaku Co., Ltd.), the original dimensions (L1) of the punch hole intervals are measured up to minimum graduations/1000 mm. Next, the test sample pieces are suspended in a constant temperature chamber and heat treated for 3 hours at 80±1° C., and then, after humidity conditioning for 3 hours or more in a room with a temperature of 23±3° C. and a relative humidity of 65±5% RH, the dimensions (L2) of the punch hole intervals after heat treatment are measured using an automatic pin gauge. Next, the thermal contraction ratio is calculated from the following equation.

Thermal contraction ratio (%)=$(L1-L2)/L1 \times 100$

Bright point/high temperature and high humidity test: The following evaluation was made after the optical films were processed under the following environment in a constant temperature chamber in which the temperature and humidity environment can be maintained. The environment in which the processing was made was 60° C., 90% RH, and 500 hours.

After the optical film that has been processed is left for 24 hours at room temperature of 23° C. and 55% RH, said optical film is placed between two polarization plates in the crossed Nicol condition, said optical film is held between another polarization plate with respect to the polarization plate on the light source side, then the diameter and number of bright points were measured when viewed under a microscope in the vertical position.

In the present invention, if bright points are present that can be recognized in the polarization crossed Nicol condition, it is not desirable in the displayed image in a liquid crystal display device. In the present invention, bright points of an optical film are those that are observed when two polarization plates are placed at right angles to each other (the Crossed Nicol condition) and the cellulose ester optical film is placed in between them. Since such bright spots, in the polarized crossed Nicol condition, in a dark field of view, are observed only with the bright spots being shining, it is possible to identify their number and size easily.

For all the samples, the total number of bright spots exceeding 50 μm per 250 mm² was 0. The number of bright spots of 5 to 50 μm was judged according to the following grade.

A: Less than 100 spots, but can not be detected by the naked eye.

B: 100 spots or more, but less than 300 spots, can barely be detected by the naked eye, but there is no problem in practical use.

C: More than 300 spots, and cannot be used as an optical film in the area where there is effect on the displayed image.

The results of these evaluations are summarized in Table 4.

TABLE 4

| Optical film No. | Elasticity Gpa | Rupture elongation (%) | Haze (%) | Heat and humidity resistance | Dimensional change | Bright spots | Remarks |
|---|---|---|---|---|---|---|---|
| A-101 | 2.8 | 15 | 6.0 | C | 0.15 | C | Comparison example |
| A-102 | 2.3 | 18 | 7.0 | C | 0.19 | C | Comparison example |
| A-103 | 1.4 | 22 | 7.0 | C | 0.23 | C | Comparison example |
| A-104 | 1.4 | 19 | 12.0 | C | 0.21 | C | Comparison example |
| A-105 | 2.9 | 27 | 1.8 | C | 0.17 | C | Comparison example |
| B-201 | 2.8 | 17 | 5.0 | C | 0.19 | C | Comparison example |
| B-202 | 2.9 | 19 | 2.5 | C | 0.15 | C | Comparison example |
| C-301 | 3.2 | 41 | 0.9 | A | 0.03 | A | This invention |
| C-302 | 2.8 | 48 | 1.0 | A | 0.04 | A | This invention |
| C-303 | 2.2 | 58 | 1.1 | A | 0.04 | B | This invention |
| C-304 | 1.6 | 59 | 1.1 | A | 0.05 | B | This invention |
| C-305 | 3.3 | 41 | 1.0 | A | 0.04 | B | This invention |
| C-306 | 3.1 | 41 | 1.0 | A | 0.03 | A | This invention |
| C-307 | 3.1 | 42 | 1.0 | A | 0.05 | A | This invention |
| C-308 | 3.0 | 42 | 0.8 | A | 0.07 | A | This invention |
| C-309 | 2.9 | 34 | 1.1 | B | 0.08 | B | This invention |

The comparison optical films A-101 to A-105 indicate the results of evaluation of the films prepared by the solution casting method according to Method A. These have a lower rupture point elongation than the samples C-301 to C-309 of the present invention and also have a higher haze. Further, even in the evaluation of heat and humidity resistance and dimensional characteristics, these are inferior to the samples of the present invention. Even the bright spots are at levels that make these films not usable.

Even the optical films B-201 and B-202 prepared by the method B are inferior to the samples of the present invention in the above characteristics. From this it is considered that the films that have been manufactured by directly adding the grains to the doping liquid or by adding a dispersed liquid having grains are inferior in the dispersion characteristics of grains, and as result, even the quality of the films has deteriorated. In particular, the optical film B-202, in the evaluation of heat and humidity resistance, was at a level that it cannot be used because it has sticky material solved out on its surface. Bubbles were detected when this sample was washed with water, when the solved out material was analyzed for its chemical structure by proton—NMR measurement after separating it into molecules, it was found that the solved out material was a surfactant.

Further, in the case of the optical film 201 and the optical film 202, since the dispersed liquid of grains was prepared in a separate process and the manufacturing was done by bringing that dispersed liquid to the solution casting film production factory, the concentration of ethanol increased relatively in the solution casting film production process which was not good from the environmental aspect.

In addition, film preparation was made similar to that of the optical film A-101 and compared after the dispersed liquid A was kept still for 10 days at room temperature. While the haze value was 6.0 in the optical film A-101, the haze value using the same method of evaluation increased to 7.2 for the optical film manufactured using the dispersed liquid that was kept still for 10 days. Similarly, even in the case of the other samples A-102 to A-105, the haze value increased by 0.5 or more in each comparison when optical films were prepared using the dispersed liquid A that was kept still for 10 days.

On the other hand, in the samples C-301 to C-308 of the present invention, when optical films were prepared using the pellets that were kept still for 10 days at a temperature of 23° C. and a relative humidity of 50%, the haze value was the same for all samples at the levels that were found for the samples that were prepared using pellets before storing them.

In addition, the sample C-309 is satisfying the relation Tg1<Tg2, and since the heated and melted material was obtained by mixing and kneading at a high temperature, it was within the usable range but with slight coloration. Among the samples according to the present invention, the quality was slightly deteriorated, and in order to improve the physical characteristics of the film and to make mixing and kneading of the heated and melted material possible at a low temperature, it became clear that it is more desirable for achieving the purpose of the present invention to satisfy the relationship Tg1>Tg2.

From these facts, in order to compound grains in an optical film, the methods of manufacture of directly adding the grains or of adding as a dispersed liquid are inferior in quality compared to the method of manufacture according to the present invention. It is clearly evident that the method of manufacturing optical films according to the present invention of using pellets of the heated and melted material having resin and grains and stored at less than the glass transition temperature is superior in terms of the quality of optical films and can also contribute to the stabilization of production.

EXAMPLE 2

<Optical Film D-401: Comparative Example>

| Solution casting method (manufacturing method-A) | |
|---|---|
| Polystyrene: number average molecular weight 20000 | 100 parts by mass |
| Methylene chloride | 400 parts by mass |
| Plasticizer: triphenyl phosphate P-3 | 5 parts by mass |
| Grains: AEROSIL-R972V of Aerosil Japan Co., Ltd. (primary grainsize: 16 nm) | 5 parts by mass |

The aforementioned materials were stirred and mixed in a dissolver for 30 minutes and were then put into a container. After the solution was completely dissolved, it was left to stand for eight hours for removal of gas bubble. This solution was heated up to 30° C., and was cast uniformly over a stainless band support member using a belt casting apparatus on a glass plate at a temperature of 30° C. and a width of 110 mm. Solvent was evaporated on a stainless band support member until the amount of the remaining solvent was 5%. After that, the web was separated from the stainless band support member. The separated film was fixed on a wooden frame and was dried by an oven dryer at 60° C. for 30 minutes, whereby a sample D-401 with a thickness of 80 μm was produced.

The glass transition temperature of the obtained film was 101° C.

The haze value of the sample D-401 measured in a manner similar to that of the preferred embodiment 1 was 5.2%, and the judgment was "X" for bright spots when observed between two polarizing plates in the cross Nicol placement and the sample was gripped between the two polarizing plates. Optical film D-402: Present invention Next, an optical film D-402 was prepared using the following method.

| (Manufacturing the heated and melted materials 10 (manufacturing method-C/a)) | |
|---|---|
| Polystyrene: number average molecular weight 20000 | 30 parts by mass |
| Plasticizer: triphenyl phosphate P-3 | 5 parts by mass |
| Grains: AEROSIL-R972V of Aerosil Japan Co., Ltd. (primary grainsize: 16 nm) | 5 parts by mass |

The aforementioned materials were mixed by a Henschel mixer and were melt-extruded by an extruder at a temperature of 95° C. for ten minutes. They were then formed into pellets in combination with a strand die in the output wherein the heated and melted materials has a temperature of Tg −5° C. In this case, the glass transfer temperature Tg2 of the heated and melted materials was 70° C.

| (Solution casting method (manufacturing method-C/b)) | |
|---|---|
| Polystyrene: number average molecular weight 20000 | 70 parts by mass |
| Methylene chloride | 400 parts by mass |

The materials other than the pellets according to the manufacturing method-C/b were stirred and mixed in a dissolver for 15 minutes and were then put into a container. After they were completely dissolved, 40 parts by mass of the pellets manufactured according to the aforementioned manufacturing method-C/a were added to this solution, and the solution was stirred and mixed in a dissolver for further 15 minutes until it was completely dissolved. The solution was left to stand for eight hours for removal of gas bubble. This solution was heated up to 30° C., and was cast uniformly over a stainless band support member using a belt casting apparatus on a glass plate at a temperature of 30° C. and a width of 110 mm. Solvent was evaporated on a stainless band support member until the amount of the remaining solvent was 5%. After that, the web was separated from the stainless band support member. The separated film was fixed on a wooden frame and was dried by an oven dryer at 60° C. for 30 minutes, whereby a sample D-402 with a thickness of 80 μm was produced. In this case, the glass transfer temperature of this film was 103° C.

Using the optical film D-402 prepared as above, the haze value measured in a manner similar to that of the preferred embodiment 1 was 1.1%, and the judgment result for bright spots was "◯".

From this it was clear that excellent optical films could be obtained using the method of manufacture of optical films according to the present invention.

Preferred Embodiment 3

Preparation of polarizing plates −1:

Using the prepared films A-101 to A-105, B-201, B-202, and C-301 to C-309 as protective films for polarizing plates, we prepared the respective polarizing plates according to the following method.

A polarizing film was obtained by extending to 4 times a polyvinyl alcohol film with a thickness of 120 μm after immersing it in an aqueous solution having 1 weight part of iodine, 2 weight parts of potassium iodide, and 4 weight parts of boric acid.

Using the steps (1) to (5) below, a polarizing plate was prepared by adhering together a polarizing film and the above optical film, and a Konica-Minolta tack KC8UCR-5 (manufactured by Konica-Minolta Opto Co., Ltd.) which is a phase shift film on the opposite side.

Method of preparing polarizing plate:

(1) The optical film and KC8UCR-5 are immersed for 2 minutes in a 2 mol/l solution of sodium hydroxide at 60° C., after which they were washed in water and dried.

(2) The above polarizing film is immersed for 1 to 2 seconds in a solid component density 2% of polyvinyl alcohol adhesive tank.

(3) The excess adhesive adhered to the above polarizing film of (2) above is wiped off lightly, and the optical film processed in (1) above, the polarizing film, and KC8UCR-5 are superimposed over each other in sequence.

(4) Using a handler, after applying pressure to the superimposed stack of the polarizing film and optical film, and KC8UCR-5 superimposed in (3) above to make them contact each other closely, excessive adhesive and air bubbles are removed from the edges of the superimposed stack, and bonding them is completed. A stress of 20 to 30N/cm$^2$ is applied using a handler, and the roller speed was about 2 m/min.

(5) The sample obtained in (4) is left for 2 minutes in an 80° C. dryer. Preparation of polarizing plates—2:

A PVA film with a thickness of 75 μm (Kuraray Vinylon #7500) is mounted on a chuck, and immersed for 240 seconds in an aqueous solution at 30° C. having 0.2 g/l of iodine and 60 g/l of potassium iodide, and next it was not only immersed in an aqueous solution having 70 g/l of boric acid and 30 g/l of potassium iodide, but also at the same time stretched along a single axis to 6.0 times thereby carrying out boric acid treatment for 5 minutes. Finally, it was dried at room temperature for 24 hours and a polarizer was prepared. The degree of polarization was 99.995%.

A polarizing plate was obtained by adhering the prepared optical films D-401 and D-402 to the two sides of the polarizer via an acrylic based adhesive ("DP-8005 Clear" manufactured by Sumitomo 3M Company).

Preparation of a liquid crystal display device:

Next, the respective liquid crystal display devices were prepared using the polarizing plate prepared as above.

The liquid crystal display panels were prepared as follows, and the characteristics as a liquid crystal display device were evaluated.

The double-sided polarizing plate affixed beforehand to a 15-inch display VL-1530S manufactured by Fujitsu Limited was peeled off, and the polarizing plate prepared above was affixed to the glass surfaces of the respective liquid crystal cells.

At that time, the orientation of affixing the polarizing plates was so that the surface having the phase difference film KC8UCR-5 is on the side of the liquid crystal cell when using a polarizing plate with the optical films A-101 to A-105, B-201, B-202, and C-301 to C-309, and also, all the polarizing plates were made to have their axes of absorption in the same direction as the polarizing plate that has already been affixed, thereby preparing the liquid crystal display device.

Evaluation of visibility of liquid crystal display device:

When the visibility was evaluated for each of the liquid crystal display devices, the liquid crystal display devices employing the optical films C-301 to C-309 and D-402 according to the present invention had no striations in the images, nor were there any foreign matter defects such as bright spots, etc, and were display devices having excellent visibility.

What is claimed is:

1. A method of producing an optical film containing a predetermined total amount of a first resin and a second resin, comprising the steps of:

mixing the first resin and grains which are used to improve the quality of the optical film and have a grain size of 10 nm to 500 nm, heating a mixture of the first resin and the grains and kneading the heated melted mixture, thereby preparing a mixture material of the first resin and the grains;

dissolving the mixture material and the second resin in a solvent, thereby preparing a resin solution; and casting the resin solution so as to form the optical film, wherein the optical film contains the grains in an amount of 0.1 to 50 percent by mass.

2. The method described in claim 1, wherein when Tg1 represents a glass transition temperature (° C.) of the optical film and Tg2 represents a glass transition temperature (° C.) of the mixture material, the following relationship is satisfied
Tg1>Tg2.

3. The method described in claim 1, wherein the first resin is a cellulose resin and the second resin is a cellulose resin.

4. The method described in claim 1, wherein the resin solution contains a plasticizer.

5. The method described in claim 4, wherein when Tg1 represents a glass transition temperature (° C.) of the optical film and Tg2 represents a glass transition temperature (° C.) of the mixture material, the plasticizer is added such that the following relationship is satisfied
Tg1>Tg2.

6. The method described in claim 4, wherein the mixture material is shaped in a pellet having a size of from (1mm×1 mm×1 mm) to (20 mm×20 mm×20 mm).

7. The method described in claim 1, wherein the mixture material contains a compound represented by Formula (1):

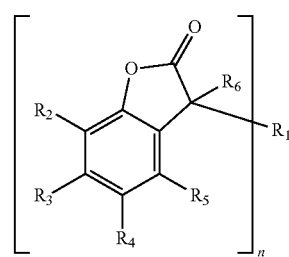

Formula (1)

wherein $R_2$ through $R_5$ independently represent a hydrogen atom or a substituent; $R_6$ represents a hydrogen atom or a substituent; and n is 1 or 2, when n is 1, $R_1$ represents a substituent, and when n is 2, $R_1$ represents a divalent linkage group.

8. The method described in claim 1, wherein the mixture material contains a compound represented by Formula (2) and including a acrylate group or a methacrylate group and a phenolic hydroxyl group in the same molecule,

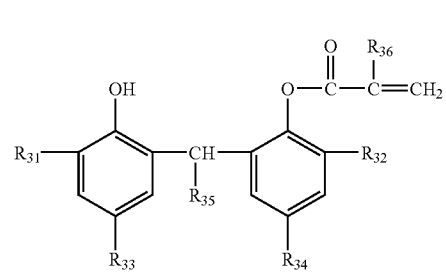

Formula (2)

where $R_{31}$ to $R_{35}$ are the same to or different from each other, and a hydrogen atom or an alkyl group having a carbon number of 1 to 10.

9. The method described in claim 3, wherein the first resin and the second resin is the same cellulose resin.

* * * * *